US011983157B2

(12) United States Patent
Soon-Shiong et al.

(10) Patent No.: US 11,983,157 B2
(45) Date of Patent: *May 14, 2024

(54) EFFICIENT COMPUTER-BASED INDEXING VIA DIGITAL TOKENS, SYSTEMS, METHODS, AND APPARATUS

(71) Applicant: Nant Holdings IP, LLC, Culver City, CA (US)

(72) Inventors: Patrick Soon-Shiong, Los Angeles, CA (US); John Wiacek, Los Angeles, CA (US); Nicholas J. Witchey, Laguna Hills, CA (US); Jake Fyfe, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,829

(22) Filed: Aug. 24, 2023

(65) Prior Publication Data

US 2024/0086384 A1 Mar. 14, 2024

Related U.S. Application Data

(63) Continuation-in-part of application No. 17/971,244, filed on Oct. 21, 2022.
(Continued)

(51) Int. Cl.
*G06F 16/22* (2019.01)
*G06F 16/24* (2019.01)
(Continued)

(52) U.S. Cl.
CPC .......... *G06F 16/2255* (2019.01); *G06F 16/27* (2019.01); *G06F 16/22* (2019.01);
(Continued)

(58) Field of Classification Search
CPC ...... G06F 16/2255; G06F 16/27; G06F 16/22; G06F 16/24; G06F 16/41; G06F 16/43
See application file for complete search history.

(56) References Cited

U.S. PATENT DOCUMENTS

| 2023/0004970 A1* | 1/2023 | Jakobsson | ............ G06Q 20/407 |
| 2023/0043095 A1* | 2/2023 | Milam | ....................... H04L 9/30 |
| 2023/0198762 A1* | 6/2023 | Bramlet | ............... G06Q 50/205 |
| | | | 713/168 |

FOREIGN PATENT DOCUMENTS

WO  WO-2022140803 A2 * 6/2022

OTHER PUBLICATIONS

Galligan, NFTs are not just the art—they're also the certificate of authenticity, pp. Mar. 1-6, 12 (Year: 2021).*
(Continued)

*Primary Examiner* — Albert M Phillips, III
(74) *Attorney, Agent, or Firm* — Kilpatrick Townsend & Stockton LLP

(57) ABSTRACT

Systems, apparatus, and methods of managing the lifecycle of a digital token are described. In an example, while the digital token is being generated, the digital token or the underlying digital asset can be compared to other digital tokens and/or digital assets to determine similarity thereto. Based on the similarity, a program code interface (e.g., smart contract, an application programming interface—API, RPC, etc.) can be determined and an API call can be made to execute a program code. The execution can indicate whether the digital token creation process can be completed. If so, the digital token is recorded. Thereafter, its use or the use of the underlying digital asset can be monitored, whereby this monitoring can apply similarity processing. If a use thereof is determined or if a use of a similar digital token or similar digital asset is determined, notifications can be generated and sent.

20 Claims, 13 Drawing Sheets

Related U.S. Application Data

(60) Provisional application No. 63/421,927, filed on Nov. 2, 2022, provisional application No. 63/404,855, filed on Sep. 8, 2022.

(51) Int. Cl.
*G06F 16/27* (2019.01)
*G06F 16/41* (2019.01)
*G06F 16/43* (2019.01)

(52) U.S. Cl.
CPC .............. *G06F 16/24* (2019.01); *G06F 16/41* (2019.01); *G06F 16/43* (2019.01)

(56) References Cited

OTHER PUBLICATIONS

Kalita, Top 10 Applications of NFT, pp. 1-7 July 235 (Year: 2022).*
Poth, NFT in Edu: What Does the Future Hold? pp. 1-8, Feb. 18, 2022.*

* cited by examiner

Storing indexed information related to digital tokens including distinguishing features of the digital tokens, wherein digital tokens are at least partially indexed by the distinguishing features 1202

Generating a set of token distinguishing features via execution of a set of recognition algorithm implementations on the test digital token 1204

Obtaining a token result set via querying the digital token database based on the set of token distinguishing features 1206

Deriving at least one token similarity score based on the token result set and the set of distinguishing features 1208

Invoking a smart contract interface associated to the test digital token and associated with a notarized ledger based on the at least one token similarity score 1210

Facilitating management action 1212

Figure 12

EFFICIENT COMPUTER-BASED INDEXING VIA DIGITAL TOKENS, SYSTEMS, METHODS, AND APPARATUS

CROSS-REFERENCE TO RELATED APPLICATION

This application is a continuation-in-part of U.S. patent application Ser. No. 17/971,244, filed on Oct. 21, 2022, which claims benefit of U.S. Provisional Application No. 63/404,855, filed Sep. 8, 2022, the entire contents of such applications being incorporated herein by reference in their entirety.

FIELD OF THE INVENTION

The field of the invention generally relates to efficient computer-based indexing via digital tokens and associated technology.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

Digital tokens can be used for different computer and network-based services. For instance, a non-fungible token (NFT) is an example of a digital token that can include data stored in or on a blockchain. Given the non-fungible aspect of this type of digital tokens and the blockchain or corresponding notarized ledger implementation, the NFT can be a unique digital asset within a computer network environment or a corresponding metaverse.

Different technologies exist for creating a digital token, including an NFT. However, existing technologies are limited vis-à-vis management of multiple digital tokens, especially in preventing data replication across digital tokens or in managing such digital tokens. For instance, existing technologies may allow the creation of a first NFT that includes data representing a digital asset. A second NFT may subsequently be also created representing the same or similar digital asset. Although the two NFTs are unique on their own, the existing technologies may not prevent the second NFT from including the same or similar data as the first NFT. Existing known notarized ledger technology and their NFT capabilities fail to provide for restricting or other managing digital tokens that are similar, which could give rise to significant problems in the market space (e.g., copyright violation, digital piracy, digital fraud, etc.).

All publications identified herein are incorporated by reference in entirety to the same extent as if each individual publication or patent application were specifically and individually indicated to be incorporated by reference. In some instances, publications are identified, but no statement of incorporation is provided for brevity and clarity. Still, such publications are also incorporated by reference in their entirety. Where a definition or use of a term in an incorporated reference is inconsistent or contrary to the definition of that term provided herein, the definition of that term provided herein applies and the definition of that term in the reference does not apply.

In some embodiments, the numbers expressing quantities or units of, for example, data used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be understood that many of the foundational technical features provided in the following specification are presented to enable compact examination of the disclosed inventive subject matter. While some of the foundational technical features described herein may seem obscure, in many cases such features may be considered within the scope of understanding of one skilled in the art. Thus, presentation of such background technologies should not be considered limiting.

SUMMARY

The inventive subject matter provides apparatus, systems and methods for a token management platform (TMP). The TMP provides various computer-based management services related to the lifecycle of a digital token. For instance, before a digital token is generated, the TMP can assess the digital token's similarity (e.g., the similarity of the data that this digital token would include or represent, etc.) to existing or known digital tokens. A similarity score can be generated and used to support data alteration or prevent data alteration beyond allowed limits, restriction, permissions, or other criteria. Further, the TMP can invoke various program codes (e.g., via API calls to smart contracts in the case of NFTs, remote procedure calls, query to monitoring services, etc.) associated with a similar, existing digital token(s), or can invoke program codes supporting management of one or more new digital tokens. The execution of the program codes can set parameters for generating the new digital token, and the TMP can use these parameters accordingly. Once the digital token is generated (e.g., minted, instantiated, etc.), the TMP can enable monitoring services (e.g., registered listeners, executing monitoring code, etc.) to assess subsequently generated digital tokens for similarity, assess the use of data that the digital token represents, invoke program codes associated with the digital token, or send similarity/use notifications to relevant user devices. These and other functionalities of the TMP are further described in connection with the next figures.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 12 illustrates an example of a flow implemented by a TMP for managing at least an aspect of a digital token lifecycle, according to embodiments of the present disclosure.

DETAILED DESCRIPTION

Figure 1:
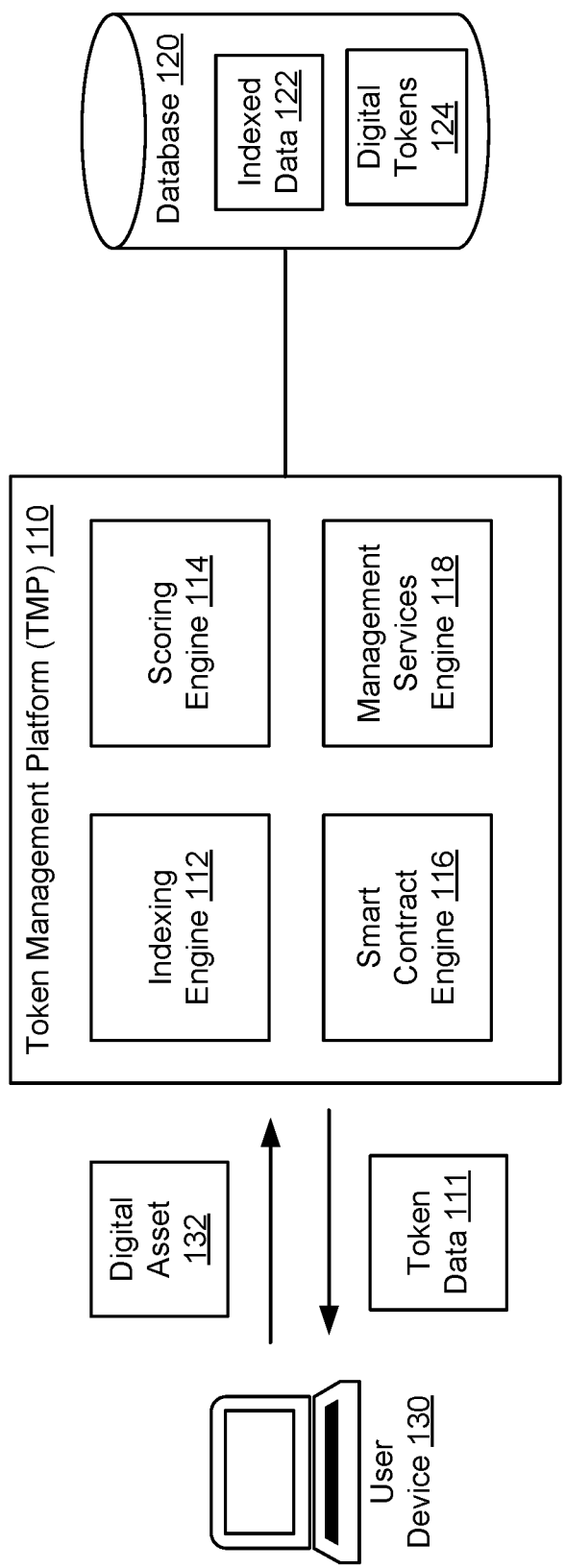
FIG. 1 illustrates an example of a token management platform (TMP) managing the generation of a digital token based on a digital asset input, according to embodiments of the present disclosure.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise at least one processor configured to execute software instructions stored on a tangible, non-transitory computer readable storage medium (e.g., hard drive, FPGA, PLA, solid state drive, RAM, flash, ROM, etc.). The software instructions or suite of software instruction configure or program the computing device or their processors to provide the roles, responsibilities, or other functionality as discussed below with respect to the disclosed apparatus or systems. Further, the disclosed technologies can be embodied as a computer program product that includes a non-transitory computer readable medium storing the software instructions or a suite of software instructions that cause one or more processors to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, TCP, UDP, FTP, SNMP, IP, AES, public-private key exchanges, web service or RESTful APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network, wired or wireless.

As used in the description herein and throughout the claims that follow, when a system, engine, server, agent, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory. It should be appreciated the combination of software and hardware working in concert create a dedicated set of physical, real-world structures that provide utility to one or more users that would not exist outside the scope of the physical, real-world assets.

One should appreciate that the disclosed techniques provide many advantageous technical effects including preventing, restricting, or otherwise managing the creation of digital tokens stored in one or more computer readable memories and that protect the same or similar data by at least determining digital token similarities or invoking the execution of program codes associated with one or more digital tokens. This is achieved by the disclosed technology's for implementing a computing device-based token management platform (TMP) that includes, for instance, an indexing engine, a scoring engine, a smart contract engine, a management services engine, or other computer-based capabilities.

The focus of the disclosed inventive subject matter is to enable construction or configuration of a computing system to operate on vast quantities of digital data, beyond the capabilities of a human. The digital data described herein represent various real-world and virtual world elements. By instantiating the relevant data structures, digital tokens, smart contracts, and/or other digital constructs in one or more memories of the computing system, the computing system can manage the vast amounts of digital data or models in a manner that provides utility to a user of a computing device that the user would lack without such a tool.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Various embodiments of this disclosure are described herein. Variations of those embodiments may become apparent to a person having skill in in the art upon reading the foregoing description. Accordingly, this disclosure includes all modifications and equivalents of the subject matter recited in the claims appended hereto.

Furthermore, all references cited herein are hereby incorporated by reference to the same extent as if each reference were individually and specifically indicated to be incorporated by reference and were set forth in its entirety herein.

In various embodiments disclosed herein, a digital token can be implemented to protect an asset (e.g., virtual assets, physical or real-world assets, digital assets, asset rights, property, real-estate, artwork, etc.). The asset can represent digital data, such as an image, a graphic, an audio file, a video file, a trademark, a copyright work, intellectual property right, a program code, a program code package (e.g., a program code update, a video game character, a video game skin, a texture for a video game skin, a patch on a video game character's outfit, a video game object, etc.), a domain name (e.g., a .NFT domain, etc.), a personal record (e.g., a medical or health record, taxes, etc.), models (e.g., game models, healthcare models, traffic simulation models, biological models, chemical models, etc.), artificial intelligence (AI) data (e.g., training data, trained models, large language models (LLMs), AI personal assistants, etc.), a relationship/interaction data for different type of object interactions, a digital trading card, a smart contract, etc. In some examples, AI data can relate to controlling the behavior of non-player character (NPC) in a video game, predicting future behaviors of objects (e.g., a player, an NPC, etc.), simulation object data (e.g., a driver's behavior in a simulation model, a simulated system, etc.), etc. In other examples, AI data can include AI training data, trained models (e.g., RNN, CNN, ANN, GANs, etc.), latent space in a trained model, AI outputs, healthcare models, traffic or simulation models, chemical or biological models, LLMs (e.g., ChatGPT, Microsoft® CoPilot™ or Bing™, Google® Bard™, etc.), AI content generators (e.g., GANs, NightCafe art, Midjourney art, etc.), or other quantifiable aspects of machine learning. In some examples, data representing relationships between objects can relate to a state machine, including the history of previous interaction between different players. Such data be used for games or for automated AI services for assisting game players, bank clients, cellphone provider clients, etc. As such, the digital data can have utility (e.g., rather than artwork only NFT, a utility-based NFT can be created, functional NFTs, trusted NFTs, etc.). The asset can also represent a physical asset, such as a tangible property (e.g., a product, a real-estate property, physical work of art, a building, a vehicle, rare materials, etc.), a non-tangible item (e.g., a transaction that involves a tangible property, mineral rights, intellectual property such as trademarks, trade secrets, copyrights, trade dress, design patents, etc.), and the like. In the interest of clarity of explanation, a non-fungible token (NFT) is described as an example of the digital token. However, the embodiments are not limited as such. Instead, the embodiments similarly apply to any other type of digital tokens. Generally, the digital token represents a data structure that stores, represents, or indicates the asset and an ownership or rights to the asset. The digital token can also store or indicate a set of program codes executable to control the use of the digital token and/or the digital asset and/or to control the ownership. Any transactions with or changes to the digital token, such as to the ownership, can be tracked. An example of this tracking involves the use of a blockchain or notarized ledger technology, whereas the digital token can be stored as a block or associated with a block in a blockchain, and a change thereto can be indicated via a transaction recorded in the blockchain.

A brief introduction to NFTs may be of use. The inventive subject matter, in some embodiments, leverages a decentralized web technology (e.g., Web3, etc.) called NFTs. NFT technologies are built on similar technologies as cryptocurrency distributed or notarized ledgers (e.g., Bitcoin, DogeCoin, Ethereum, Solana, Polygon, Cardano, Polkadot, Cosmos, Avalanche, Hyperledger, Hash Graph, etc.). Where cryptocurrencies like Bitcoin represent fungible tokens that are equivalent to each other, NFTs represent single tokens that maybe unique. NFTs have been used as a digital asset that represent artwork and have been bought and sold. For example, an NFT representing artwork by the artist known as Beeple was sold for $69,000,000 in March 2021. As can be appreciated, use of NFTs to digitally represent artwork can be lucrative. However, NFTs are often misunderstood to be the artwork itself. Rather, NFTs typically represent a transaction related to the artwork rather than the artwork itself. Thus, NFTs can be considered, in many cases, an indirect representation of the artwork. Still, digital data associated with an NFT (e.g., an image of artwork, music, sound video, performance, etc.) may be stored off a ledger to be accessed by the owner of the NFT. Additional information associated with NFTs can be found here at the following URL: en.wikipedia.org/wiki/Non-fungible token.

NFTs can be created (i.e., typically called "minting"), bought, sold, auctioned, burned, or otherwise managed as digital objects with respect to one or more corresponding notarized ledgers. Management of NFTs can be achieved through use of corresponding existing smart contracts that may follow token standards such as via Ethereum smart contract standards. The Ethereum smart contract ecosystem has multiple standards by which tokens may be managed including ERC-20, which represents fungible tokens; cryptocurrency coins for example. ERC-721 defines interfaces by which one may manage NFTs via smart contracts. According to ERC-721 transactions relating to an NFT (e.g., minting, transfers, burning, etc.) are recorded on the Ethereum blockchain to retain a ledger of all desired actions or transactions associated with the NFT. Further ERC-998 defines interfaces for creating tokens comprising sub tokens and vice versa. Yet further, ERC-1155 defines interfaces by which one can create token sets. As individuals interact with Ethereum tokens via one or more transactions, the transactions are recorded on the Ethereum blockchain thereby forming an immutable ledger of the existence of such tokens. While Ethereum is referenced for illustrative purposes, the inventive subject matter is not so limited. Each notarized ledger technology may have their standardized interfaces through which tokens are managed. Other standards are possible and NFTs or ledger tokens used in embodiments of the present disclosure can abide to such standards including any or a combination of NEO standards (NEP5, NEP11, etc.), TREZOS standards (TZIP7, TZIP12, etc.), EOS standards, FLOW standards, or other existing standards and those yet to be created. It should be appreciated that terms such as "tokens," "digital tokens," "NFTs," and are with reference to their corresponding underlying notarized ledger technology and are not limited to Ethereum standards.

Various embodiments of the present disclosure levant the NFT infrastructure for purposes beyond buying and selling artwork. The inventive subject matter presented below leverages NFTs (or, more generally, digital tokens) in a novel, new, and useful way. More specifically, a digital token can still be used to protect a digital asset or corresponding real-world asset (e.g., in the case of NFT, the NFT can protect the ownership of the digital asset by indicating the ownership and allowing the verification or authentication thereof, etc.). Nonetheless, the lifecycle of the digital token can depend on other digital tokens. For instance, during the process of generating a digital token (e.g., minting an NFT, instantiating an NFT, etc.), a similarity of the to-be-generated digital token to other existing digital tokens or creation criteria can be assessed. Depending on the similarity (or lack thereof) and program codes (e.g., smart contracts in the NFT case, APIs, RPCs, etc.) associated with a similar, existing token(s) and/or the to-be-generated token, alterations may be made to the digital asset, or a permission may be made to use the unaltered digital asset. Such cross-token management does not stop at the creation stage. Further, it can be extended all the way through the token's lifecycle until the digital token is removed (e.g., the NFT is burned, deleted, deconstructed, etc.). Additional details regarding use of cross-token lifecycle management will be discussed in the context of the inventive subject matter below.

FIG. 1 illustrates an example of a computer-based token management platform (TMP) 110 managing the generation or lifecycle of a digital token based on a digital asset input, according to embodiments of the present disclosure. In this illustration, the TMP 110 may maintain data in a database 120 to facilitate the management. A user device 130 can send a digital asset 132 (or a network identifier thereof, such as a uniform resource locator (URL), a uniform resource identifier (URI), a global unique identifier (GUID), digital or document object identifier (DOI), a healthcare object identifier (HOI; see U.S. Pat. No. 11,017,897), etc.) to the TMP 110. In response, the TMP 110 can process the digital asset 132 and send token data 111 to the user device 130. The processing can involve determining one or more similarity of the digital asset with digital data, such as with other digital assets or tokens that may or may not be already protected by digital tokens. The processing can also involve using the similarity to invoke the execution of the relevant program codes on a computing device that control the protection of the similar digital data and/or the digital asset 132. Depending on the execution, the token data 111 can be generated. For instance, the token data 111 can indicate that a digital token protecting the digital asset 132 is generated. In another case, the token data 111 can include a similarity score and indicate that an alteration to the digital asset 132 is needed before the digital token can be generated. Still further, token data 111 can include a similarity score indicating restrictions placed on the digital token. One should appreciate that similarity scores provide for a broad spectrum of control over or management of digital tokens, including new tokens, tokens that change over time, or existing tokens.

In an illustration, consider the following use case for an image data modality. Of course, embodiments of the present disclosure similarly and equivalently apply to other digital modalities, such as to a text modality, an audio modality, a video modality, an XML modality, a JSON modality, a metadata modality, a watermark modality, a healthcare sensor data modality, a tactile modality, programmatic modalities, etc. In the illustrative use case, the user device 130 can send an image (e.g., a PNG file, a JPG, file, a bitmap, an SVG file, a URL thereof, etc.) and an ownership identifier for minting an NFT that associates the image with the ownership identifier, possibly a crypto wallet address. The TMP 110 can compare the image (or its distinguishing features) to other images (or their distinguishing features) or token generation criteria, which may or may not be protected by other NFTs. If no similar image is determined or found, an NFT can be created for the image. If a similar image is determined or found (although, it may be possible that multiple similar images are found), the TMP 110 also determines an interface to a smart contract, or other executable code associated with similar tokens. The smart contract may be associated with the similar image, for example. A direct association is possible, whereby the similar image may already be protected with an NFT. Here, the smart contract associated with the NFT is determined. Otherwise, the image may be associated, albeit indirectly, with an entity (e.g., an organization, an institution, decentralized autonomous organization (DAO), etc.) that, in turn, is associated with a smart contract (e.g., the organization have set-up a default smart contract for the use of its images or tokens, etc.). If no existing smart contract association (direct or indirect) is determined, the TMP 100 may provide the capability to generate a new set of smart contracts, possibly based on one or more smart contract templates. This capability can be offered to any of the user device 130 or another user device associated with the entity or the owner of the NFT (in case where this NFT already exists). The entity's smart contract is then determined and used. Thereafter, the TMP 110 can invoke the execution of the smart contract by, for instance, causing an API call to the smart contract or interaction with an oracle. The API may be hosted by the TMP 110, a remote computer, or even on a distributed ledger node. An API response can be received indicating that the NFT minting is authorized. In turn, the TMP 110 generates an NFT that associated with the image with the ownership identifier and sends the token data 111 to the user device 130 indicating this action. Other use cases are likewise possible and are further described hereinafter.

In another illustration, also consider the following image modality use case. A new image is generated by a first user (e.g., an author, an owner, an artist, a publisher, an editor, a photographer, a game designer, etc.). A similar image already exists and is protected by a contract, such as by a smart contract possibly representing a copyright. In this illustrative use case, the similar image is associated with a second user different from the first user (e.g., another author, another owner, another publisher, etc.). Such a situation can occur in multiple contexts, such as when the two users may generate images of a same event, but are members of different organizations, say different newspapers. The TMP 110 may allow the first user to mint an NFT for their image based on a number of factors. For example, the two images may have similar metadata, watermarks, features, or attributes in terms of timing, geographical location, etc. where such metadata can be associated with a public event. The TMP 110 may store rules allowing the minting of images of public events based on a context (e.g., conditions, criteria, requirements, etc.) determined from the metadata or other data associated with the images. Because the NFT is minted and the similar image exists (and, possibly, protected), the TMP 110 can send a notification to a user account of the second user about the minting of the NFT. This notification can indicate the image, the NFT, parts of the metadata, the first user, the similar image, attributes in common, etc. Further, the notification can include information about how to proceed next with the image. For example, the notification can include suggestions on possible smart contracts to engage, default smart contracts that are available, points of conflict associated with the image relative to other images (e.g., point of view conflicts, perspective conflicts, angle conflicts, time of day, copyrights, location, etc.).

The user device 130 can include one or more processors and one or memory storing instructions that, upon execution by the one or more processors, configure the user device 130 to perform user devices operations described herein. The user device 130 can be any suitable device operable by a user. For example, the user device can be a mobile phone, a gaming console, an appliance, manufacturing device, a set top box, a router, a switch, a tablet, a laptop, a desktop, a camera, a wearable device (e.g., a smart watch, a wearable display device, etc.), an Internet of Things (IoT) device, a vehicle (e.g., a self-driving or a flying car, a truck, a robot, a drone, a delivery bot, etc.), a medical device (e.g., a healthcare sensor, a blood pressure device, a heart rate device, an EKG device, CT scan device, MRI device, X-ray device, etc.), a hardware wallet (e.g., a device from LEDGR, TREZOR, etc.), a security device (e.g., a security gate, a security scanner, a passport scanner, camera, motion sensors, baggage X-ray etc.), a sensor device (e.g., a camera, a motion sensor, a temperature sensor, a g-sensor, a microphone, an accelerometer, a magnetometer, a LIDAR sensor, a RADAR sensor, a galvanometer, etc.), a home automation device, or other type of computing device. While inventive subject matter is presented from the perspective of a user device, the inventive concepts are not so limited and could include any type of practical computing device (e.g., cloud systems, servers, workstations, automobiles, etc.).

In an example, the user device 130 can execute an application or other set of software instructions (e.g., compiled codes, scripts, byte codes, etc.) that receives or generates the digital asset 132. Thereafter, the digital asset 132, or a pointer to digital asset 132 (e.g., URL, URI, HOI, DOI, etc.), can be sent to the TMP 110 along with a creation request to generate or otherwise manage a digital token or an evaluation request to evaluate whether a digital token can be created based on the uniqueness of the digital token representing digital assets 132. Such information can be received by the TMP 110 via a web interface, an API, a remote procedure call (RPC), a smart contract, RESTful API, file transfer, etc.

In another example, the application can include a plug-in that can initiate a session with the TMP 110 (e.g., via a web interface, an API, an RPC, etc.). In real-time or near real-time while the digital asset 132 is being created via the application, the plug-in can send information to the TMP 110 about the digital asset 132 and can receive and present at a UI of the application evaluation information (e.g., a similarity score or an indication of how unique a digital token would be, etc.). For instance, the digital asset 132 can relate to a video game. The plug-in can be a game engine plug-in for a game engine (e.g., Unreal, Unity, Godot, etc.). In another illustration, the digital asset 132 can relate to an authored document. The plug-in can be an authoring plug-in in an authoring application (e.g., WORD, Adobe Illustrator, GIMP, Fire Alpaca, Premiere Pro, Avid, iMovie, Pinnacle Studio, Blackmagic, Final Cut Pro, Roblox studio, Unity, Unreal, Adobe Photoshop, Subversion, Maya, 3d Max, Blender, Audacity, Reason, Logic Pro, Perforce, Git, Stash, Xcode, Android Studio, Visual Studio, Clip Studio Paint, Power Point, Inkscape, OpenShot, Visio, etc.), In yet another illustration, the digital asset 132 can relate to a program code. The plug-in can be a version control plug-in part of a version control system (e.g., Git, Subversion, CVS, Mercurial, Perforce, etc.). Generally, the plug-in can be available with any type of software used for creation of any type of assets, including storage systems for assets, game engines, editor, film, audio, a compiler, etc. Such plug-ins may operate under user direction or possibly automatically as digital content flows through the application.

In the examples above (e.g., before creation, post creation, real-time creation, during development, etc.), the TMP 110 can send information (e.g., as part of the token data 111, etc.) to the device 130 for presentation at the UI. This information can indicate the similar features and, possibly, a recommendation to alter the digital asset 132 such that to reduce or minimize the similarity (e.g., such that the digital asset 132 is unique, the digital asset 132 unlikely infringes on a copyrighted material, etc.), or even in some cases to enhance similarity (e.g., such that the digital asset 132 is similar to another digital asset authored and/or owned by the same entity, the digital asset 132 aligned with copyrighted work or trademarked logo of the entity in case the digital asset 132 is also authored and/or owned by the entity, etc.). The TMP 110 can also indicate the similar features (e.g., images having same colors and showing same objects, except for one minor modification, etc.) and the culprit of the similarity, such as the creator (individual, company, bot, camera, location, etc.) This way the similarity can be used to detect copyright violation, and not a creator creating very similar NFTs images.

To illustrate and referring to an image use case, the token data 111 can indicate that a dominant color or a shape in the created image are similar to those of an existing image associated with an NFT. Given the smart contract of the NFT preventing such similarity, the token data 111 can also recommend changes to the dominant color or shapes, whereby such changes reduce the similarity to a point allowable by the smart contract. Other parameters may also be used beyond shape and color including text information, textures, audio parameters (e.g., amplitude, volume, frequency, phase, etc.), spoken utterances, namespace or ontology metadata, tempo, facial features, descriptors, or other types of digital-based recognition features. Such analyses can be achieved through the use of implementations of recognitions or analysis algorithms, possibly including those offered by OpenCV for image data (see URL opencv.org). Different data modalities may leverage other implementations of recognition algorithms. For example, audio data may leverage natural language processing algorithms, time domain analysis, frequency domain analysis, discrete Fourier transform analysis, or other implementations of algorithms. One should appreciate that implementations of recognition or feature detection algorithms generate numerical values or data structures that are representative of the data under analysis, often called descriptors in image analysis. For an example generating image descriptors and using descriptors to identify similar images and imaged objects see U.S. Pat. No. 6,711,293 to Lowe titled "Method and Apparatus for Identifying Scale Invariant Features in an Image and Use of Same for Locating an Object in an Image," filed Mar. 6, 2000. Thus, these numerical values or data structures can be used to identify other data having similar values by treating such numerical values or data structures as indices into a database (e.g., file system, SQL, look-up table, KNN search, trees, etc.).

Different recommendation techniques can be used to indicate a recommended alteration to the digital asset 132. In an example, a neural network (e.g., a generative adversarial network (GAN), etc.) can be trained for a specific type of the digital asset 132 (e.g., image, 3D model, game scene, game level, audio, video, text, program code, digital objects, etc.). The training can use similarity scores generated by the TMP 110 as ground truth labels and a loss function that uses similarity scores. The training can be iterative, whereby the loss function is minimized such that the neural network learns distinguishing features (e.g., recognized objects, descriptors, edges, lines, textures, etc.) that reduce the similarity score. In an example, the specific digital asset type used in the training can be an undesired type, such as one corresponding to offensive subject matter. In this case, the training allows the neural network to learn features that indicate the undesired type or its corresponding features, and this type of learning can be used to prevent construction or minting of the digital assets of the undesired type, such as offensive digital assets. Once the neural network is trained, the digital asset 132 and one or more similar, existing digital assets can be input to such a neural network. The output thereof can indicate modification to features of the digital asset 132 such that they are distinguishable and can reduce the similarity if used. Other recommendation techniques are possible and include, for instance, genetic algorithms to vary the digital asset 132 within bounds and/or procedural generation (e.g., in the case of images or graphics, use of wave function collapse algorithms, etc.). The advantage of such approaches is clear. First, TMP 110 may allow for creating similar images that align with a specific style of an artist or other entity creating or otherwise authoring the work. Second, TMP 110 may restrict others from encroaching on the creating entities rights or styles. Still further, TMP 110 can allow creating entities to define a "boundary" around their work(s) possibly to enforce their rights. Such boundaries may be monetized according to fee schedule where, in exchange for a defined fee, TMP 110 will enforce the boundary. This can be achieved through the similarity score's metric, through the similarity criteria requirements, through management of AI generator latent space, or other techniques. As an example, such techniques may be useful when protecting intellectual property rights such as copyrights or trade dress. Thus, the inventive subject matter is considered to include providing quantified similarity boundaries around protected works and managing creation of additional, possibly derivative works, based on the quantified similarity boundaries.

Although a user device 130 is illustrated as accessing the functionalities of the TMP 110, the embodiments of the present disclosure are not limited to user devices only. For instance, servers, online services, and the like can similarly access the functionalities. Generally, the access can involve at least two components: a network and an account. The network can include a wide range of networking infrastructures, possibly combined together. For instance, the network includes at least the Internet leveraging known communication protocols (e.g., HTTP, HTTPS, TLS, SSL, SSH, FTP, SFTP, SMTP, ICMP, SNMP, TCP, UDP, IPv4, IPv6, etc.). The network can also or alternatively include other types of networks including local area networks, wide area networks, personal area networks, virtual private networks, private networks, public networks, wireless networks, and the like. The account can be an account with the TMP 110, such as a cryptographic wallet (e.g., MetaMask, CoinBase, Trezor, Ledger, Exodus, BitGo, UberPay, Jaxx, CryptX, ZenGo, SimpleHold, Trust, NGrave, BitBox, KeepKey, Keevo, SecuX STONE, etc.). The account can be associated with a set of cryptographic keys (e.g., a private key and a public key, referred to also as a private address and a public address, etc.). The user device 130 can encrypt the digital asset 132 (or other information sent about this digital asset 132) with one of the cryptographic keys, whereas the TMP 110 can perform decryption using the other key (e.g., the private key, etc.).

The TMP 110 can be implemented as specialized hardware forming a set of servers or software executing on a set of servers (e.g., as a set of virtualized servers hosted in one or more data centers and providing a cloud-based service, Azure, AWS, etc.). The TMP 110 can include different components, such as an indexing engine 112, a scoring engine 114, a smart contract engine 116, and a management services engine 118, all of which may be combined together or remain as individual, interconnect engines. Each of these components is further described hereinafter. Briefly, the indexing engine 112 is configured to process digital assets (that may or may not be protected with digital tokens and corresponding smart contracts, and that may exist on one or more platforms) and/or digital tokens (that may exist on one or more platforms including the TMP 110) to determine distinguishing features of each digital asset and/or digital token and store indexed data 122 in the database 120 based on such features. In other words, the indexing engine 112 can be implemented as an online, cross-platform search engine that indexes not only digital assets (e.g., images, graphics, videos, audio, text, etc.) but may also index corresponding digital tokens (e.g., NFTs, ledger tokens, collectible tokens, composable tokens, etc.). The scoring engine 114 is configured to compare a digital asset for a to-be-generated digital token and/or an already generated token (including the digital asset associated therewith) to other digital assets and digital tokens that have been indexed. Further the digital token to be generated may be compared to instantiation criteria that may be defined based on digital features (e.g., colors, text, audio, edges, curves, textures, fractals, rules, etc.). The comparison can span multiple dimensions and modalities (e.g., text, audio, video, images, natural language, metadata, program code instructions, digital watermarks, etc.), etc. depending on the digital asset type and can return a similarity score (which can be single-valued or multi-valued). The similarity score can be defined as one or more metrics according to a desired use case. The comparison can also cover different types of media to check different types of similarities even cross modality similarities (e.g., audio voice for spoken content, words and beats for music, audio and images for films, utterances in audio to written text, etc.). The comparison can also check royalty free list, intonation criteria, or database. Based on a similarity score (i.e., satisfying similarity criteria, not satisfying similarity criteria, etc.), the smart contract engine 116 is configured to determine a set of program codes (e.g., smart contracts in the NFT use case, APIs, RPCs, etc.) to be executed for controlling the creation or management of a digital token. The program code(s) can be associated with an existing, similar digital asset (if not protected by an existing digital token, this association can be with an entity that owns or manages the existing digital asset), with an existing, similar digital token, and/or with the entity attempting to create the digital token (e.g., an employer of a user operating the user device 130, etc.). Based on the execution of the program code(s), the management services engine 118 is configured to determine a set of parameters defined by the execution and execute operations according to the parameter(s). For instance, one operation can be to create the digital token. Another operation can be to forgo the creation of the digital token, indicate the similarity score and/or a recommendation for a digital asset alteration, and re-trigger the scoring upon receiving a change to the digital asset. The similarity score metric or metrics may be defined in many different ways. A score or metric might be defined according to a normalized scale, say 0 to 1 or 0 to 100. In some cases, scores closer to 0 might indicate similarity while in other scenarios scores closer to 1 or 100 may indicate similarity. In other embodiments, the similarity score might be a Euclidean or Hamming distance from the digital token to be created to the nearest similar existing token or to a target instantiation criteria.

In an example of a server implementing the TMP 110, the service can include a web-based computing platform that this accessible via a network. For example, the services provided by the server could be built on Amazon Web Services, Google Cloud, IBM Watson or cloud services, Microsoft Azure, or other similar services. Still, in some examples, the server can include a proprietary computing system that includes one or more processors and one or more memory. While the server can operate as a cloud-base service, it may also function on a single computing device. The memory stores one or more sets of software instruction, which provide the services described herein when executed by processor(s). The server can be provisioned with one or more APIs (e.g., RPCs, RESTful APIs, proprietary protocols, etc.) through which the user device 130 can interact with the server.

The database 120 can store the indexed data 122. In addition, the database 120 can store digital tokens 124 generated via and/or imported to the TWIT 110. The database 120 can include any practical form of indexed datastore with an underlying index schema. Example datastores that can include relational databases, SQL database, file systems, look-up tables, hash tables, indexed data structures, trees (e.g., nearest neighbor search, KNN, etc.), machine learning classifiers (e.g., SVMs, K-means clustering, decision trees, random forests, etc.) or other forms or indexing techniques that may be used for accessing data structures. Suitable commercial databases can include Microsoft Access, MySQL, PostgreSQL, MongoDB, MariaDB, CockroachDB, or Neo4j, just to name a few. Example machine learning classifiers, and other implementations of machine learning techniques, can include those offered from Sci-Kit Learn (see URL scikit-learn.org).

It should be appreciated that a digital token can be generated in many ways. In an example, the digital token should be generated, instantiated, or instantized in a manner consistent with use of a target notarized ledger represented by notarized ledger. While there are many possible types of notarized ledgers, it should be further appreciated the core digital token features described herein can be generalized across the spectrum of notarized ledger technologies.

Generally, a notarized ledger is considered immutable in a manner where external or third-party entities can validate or verify when attempts are made to alter the ledger. Some existing ledgers achieve this by distributing a copy of the complete of the ledger on participating computing nodes.

In an example, the notarized ledger can be a blockchain ledger for discussion purposes. In this example, the notarized ledger includes a series of blocks where an existing block is linked to a current block, which in turn will be linked to a yet to be created new block. The blocks in blockchains are typically "linked" via hash values. Thus, a block incorporates a hash value of the block into its own data structure. Then, when created, the next block incorporates a hash value of the previous block into its own data structure.

Of course, the notarized ledger can include other types of ledgers beyond a blockchain including smart contract ledgers (e.g., Ethereum, Solana, Polygon, Bitcoin, Tezos, Cardano, WAX, NEO, Waves, Polkadot, Ergo, Alogorand, Wax, etc.), hashgraphs, directed acyclic graphs, cryptocurrency blockchains (e.g., Bitcoin, Dogecoin, Litecoin, etc.), or other forms of notarized ledgers. Still further, crypto exchanges may be leveraged for creating marketplaces or exchanges (e.g., operate as private data exchange server 120, etc.) for the digital token. Example marketplaces include Binance, CoinBase, Larva Labs, Nifty Gateway, Mintable, OpenSea, Rarible, SuperRare, TopShots, FLOW, or Foundation just to name a few.

The digital token can be integrated with the notarized ledger according to various techniques. In some embodiments, the digital token could be stored directly in or on a block as shown. This approach has the advantage of the digital token being directly accessible in the corresponding block chronicling the creation or other transactions associated with the digital token. However, in view of many existing ledger technologies necessitating all nodes to store a complete copy of the ledger, storing the digital token in the ledger could be costly or inefficient as more and more digital tokens are stored across all nodes, thereby growing without limit. In other more storage efficient embodiments, the digital token can be stored off ledger in a different data store, which reduces the overall global storage requirements and eases the pressure of growing the ledger too fast or too large. Off ledger storage can be achieved by storing the digital token or its individual parts in a database (e.g., the database 120, etc.), on a web server, in file system, on cloud storage array, on a NAS, on a SAN, or other computing device having an indexed storage schema. Still, recording generation or other transactions of the digital token on the notarized ledger can include a link to where the digital token is stored. For example, a token identifier can be used and can include the link where the link is the token identifier or where the link is part of the token identifier data structure. Example links can include URLs, uniform resource identifiers (URIs), digital object identifiers (DOIs), healthcare object identifiers (HOIs), file names, or even hash values. Example techniques for leveraging one or more HOIs can be found in U.S. Pat.

No. 11,017,897 to Soon-Shiong titled "Healthcare Management Objects," filed on Jan. 3, 2014, the content of which is incorporated herein by reference. For example, an object identifier may be incorporated into a block on the ledger. A prefix of an object identifier might point to a specific data store (e.g., server, etc.) and the suffix of the object identify might point to the specific data associated with the digital token. The reverse perspective may also be valid where off-ledger data for a digital token may include a block identifier representing at least one transaction recorded on the notarized ledger. The prefix of the block identifier may represent a specific ledger and the suffix may represent the specific block or transaction in the ledger associated with the digital token. Such approaches are specifically contemplated for healthcare use cases, which provides for the technical advantage of permitting patients to control their own healthcare data directly without necessarily going through multiple third-party servers.

In view that the digital token could be stored off ledger, it is possible links pointing to the digital token could become stale in the sense the link may no longer become valid. Further, to mitigate the risk of the digital token becoming lost or becoming no longer available, a permanent data store can be used. For example, the digital token and links to the digital token can be made more permanent through the use of a distributed file system (which the database 120 can be part of or can implement). Example distributed file systems include the Inter-Planetary File System (see URL ipfs.io), torrent-based file systems (e.g., BitTorrent, etc.), CEPH file system (see URL docs.ceph.com/en/pacific/cephfs/index-.html), or other such file systems supporting more permanent records. Further, the digital token could also be stored on notarized ledger file systems where the notarized ledger itself supports a file system, possibly including Chia Networks (see URL www.chia.net) or Filecoin (see URL www-.filecoin.io) both of which support decentralized storage. Yet further, the digital token could be stored in a hybrid system where blocks in a ledger are stored according to a hash-based protocol. Rather than needing all nodes to store the complete ledger, each node only stores some blocks and other nodes store other blocks. For example, rather than all nodes storing a single block, say five distinct nodes or other practical number of nodes would store duplicates of the single block. Thus, all nodes in aggregate would be able to provide access to the complete ledger, but no single node has the complete ledger, which reduces storage needs. Example techniques that can be adapted for constructing such a distributed ledger can be found in U.S. Patent Application Publication 2019/0267119 to Witchey titled "Healthcare Transaction Validation via Blockchain Proof-of-Work, Systems and Methods", filed on May 13, 2019, the content of which is incorporated herein by reference in its entirety. More specifically, such a distributed ledger provides for tracking transactions as well as for storing the digital token or other types of tokens (e.g., NFTs, bearer tokens, tokens from a multi-token set, etc.) in a more efficient manner. Yet another technique can include storing the token on storage nodes, possibly in a peer-to-peer network, that have storage addresses that adhere to the same address space as the token identifier. For example, tokens and/or their information may be stored according to torrent protocol operating on torrent nodes. An example torrent protocol includes those implemented by BitTorrent (see URL en.wikipedia.org/wiki/Bit-Torrent).

Additional notarized ledger technologies that could be used include IOTA tangle (see URL www.iota.org), *Hedera* hashgraph (see URL *hedera*.com), Hyper Ledger Project blockchain (see URL www.hyperledger.org), IBM Watson® Blockchain services, Kaledio blockchain, Stellar blockchain, and so on. More preferred notarized ledgers include those supporting smart contracts, or more specifically NFTs, including Ethereum (see URL ethereum.org), Cardano (see URL cardano.org), Tezos (see URL tezos.com), Solana (see URL solana.com), FLOW (see URL onflow.org), Polygon, or EOS.IO (see URL eos.io) just to name a few. Each of these and others include infrastructure for supporting minting, transferring, or otherwise managing digital tokens on their corresponding ledgers. Many of these notarized ledgers support test nets for creating and testing custom smart contract. For the purposes of the following discussion, Ethereum will be used as a non-limiting example. However, it should be appreciated that digital tokens are often bound to a specific notarized ledger. Still, cross ledger digital tokens are also contemplated.

Figure 2:
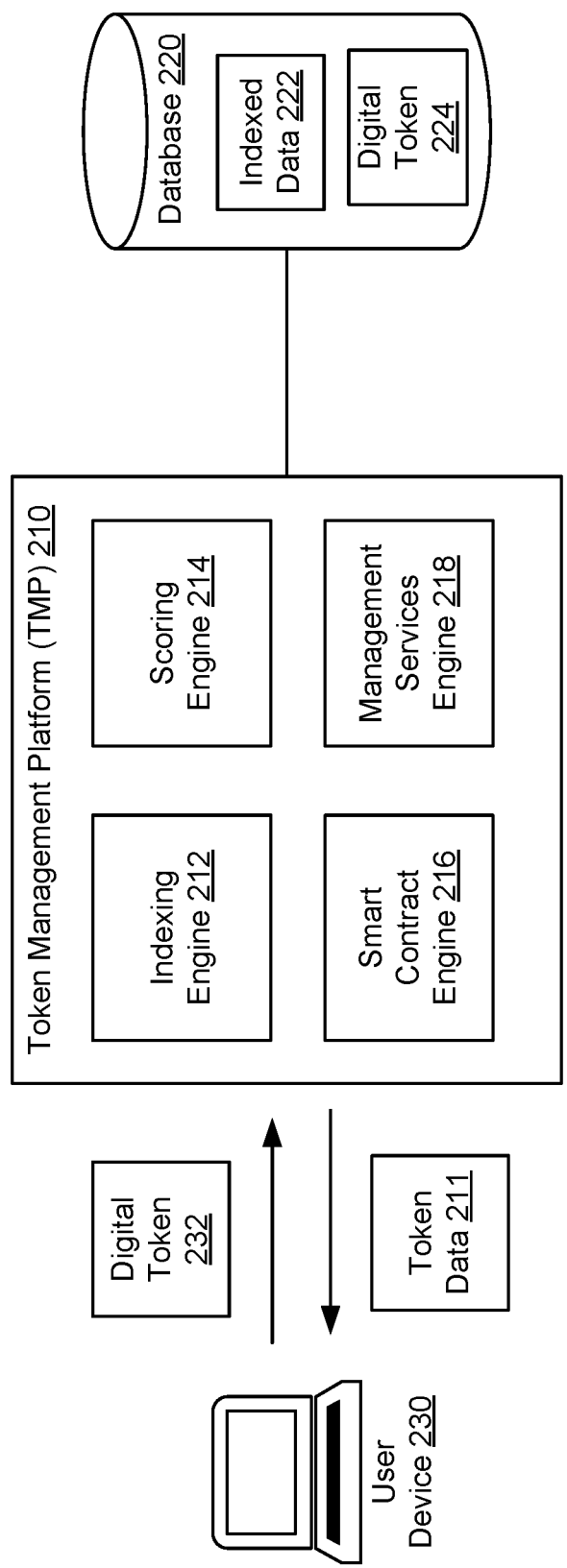
FIG. 2 illustrates an example of a TMP managing the generation of a digital token based on a digital token input, according to embodiments of the present disclosure.

FIG. 2 illustrates an example of a TMP 210 managing the generation of a digital token based on a digital token input, according to embodiments of the present disclosure. The TMP 210 is similar to the TMP 110 of FIG. 1 and can use a database 220 similar to the database 120 of FIG. 1. In particular, the TMP 210 includes an indexing engine 212, a scoring engine 214, a smart contract engine 216, and a management services engine 218. The database 220 includes indexed data 222. The digital token input can be received from a user device 230, which is similar to the user device 130 of FIG. 1. In the interest of brevity of explanation, the similarities between the two figures are not repeated herein and are assumed to be equally applicable to FIG. 2. Instead, the description of FIG. 2 focuses on the additional embodiments.

Rather than sending a digital asset (or information about the digital asset), the user device 230 can send an already created digital token 232 (or information about the digital token 232, such as a network address or pointer thereof). In one example, the user device 230 receives the digital token 232 (or the information) from another remote system (e.g., from an NFT platform other than TMP 210, a gaming platform, a marketplace platform, source control platform, etc.), a second user (e.g., from the wallet of the second user), or generates the digital token 232 by accessing such remote system. In another example, the user device 230 can be configured to generate the digital token 232. In other words, the user device 230 (or an operator thereof) corresponds to a provenance of the digital token 232. For instance, the user device 230 can store or have access to a cryptographic key associated with an account (e.g., a cryptographic wallet, etc.) and can, possibly, be configured as a blockchain node. When a digital asset (or information about it) is received or generated by the user device 230, the cryptographic key can be used to generate or instantiate the digital token 232, whereby the digital token 232 includes, among other things, the digital asset (or the information), an ownership identifier, and metadata about the digital asset and its provenance, and is signed with the cryptographic key. The metadata can include information, such as a timestamp of when the digital asset was created, an author of the digital asset, a location of the user device 230, a geolocation where the token was instantiated, watermark data, or the like. If configured as a blockchain node, the user device can generate a block of a blockchain, where the block corresponds to the digital token 232. Otherwise, the user device 230 can send the digital token to the TMP 210 (or another platform) to generate the block. Of particular note, the provenance or other actions taken during creation or management of digital token 232 can also be tracked via generating blocks recording such transactions on the corresponding notarized ledger. Tracked transaction information can include originating machine identifier (e.g., IP address, MAC address, UUID, GUID, etc.), author identifier, application version number or identifier, actions taken, or other information that may be useful for tracking or auditing. Such techniques are advantageous because it provides for digital techniques to prove provenance of a digital token or to prevent fraud.

In an illustrative use case, the user device 230 can be a camera device that stores the cryptographic key or be paired with another device (e.g., over a peer-to-peer network that uses a wireless communication protocol, such as BLUETOOTH, 802.11, wireless-USB, etc.) that stores the cryptographic key. Upon generating an image, the camera device can automatically generate a digital token that associates the image with an owner (e.g., the operator of the camera device, etc.) and the metadata (e.g., the time and place where the image was generated, creator identifier, size, histogram, firmware version number, digital watermarks, etc.).

Regardless, the TMP 210 receives the digital token 232 (or the information about the digital token 232) and can evaluate it for similarity (or, equivalently, for uniqueness or lack thereof). The similarity can be used as a negative filter, such as the higher the similarity is, the less unique the digital token 232 is and the less likely the digital token 232 can be instantiated or minted. The similarity can be used as a positive filter, such as the higher the similarity is, the less unique the digital token 232 is and the more likely the digital token 232 can be instantiated or minted. For instance, the digital token 232 and/or the digital asset associated therewith (e.g., the image in the camera device illustrative use case, etc.) are processed by the scoring engine 214 to determine a similarity score or metric to one or more of other digital tokens and/or other digital assets, or to establish instantiation criteria. Based on the similarity score and/or similarity criteria, the smart contract engine 216 can invoke one or more program codes. Based execution of the program code(s), the management services engine 218 can initiate one or more operations.

In one example, the digital token 232 may be unique (e.g., its similarity score indicates there are no other similar known NFTs yet, etc.). In this example, the management services engine 218 can send token data 211 to the user device indicating the uniqueness (and, possibly, the similarity score or satisfied one or more criterion). Further, the management services engine 218 can determine a value of the digital token 232. Generally, the value can be a function of (e.g., proportion to, correlated to, etc.) the uniqueness (or a function of the similarity score (e.g., inversely proportional thereto, proportional thereto, survey data, rarity, etc.)).

In certain use cases, a digital token 232 may need to have unique features while also having similar features to other digital tokens or assets. For example, in a video game context, a video game token may need to have at least one item that is visually unique while also having similar or the same state for certain properties of items. This may be used for merging items together to build new items (e.g., for equipping a player's character, and/or upgrading/crafting an item such as a sword, a mace, etc.). In engineering/mechanical environments, backward compatibility may be desired. As such, a new item may have a new part, while also including other parts that are found in previous designs or products. Thus, in some embodiments a digital asset may represent a 3D real-world item, possibly including a 3D printed item or its digital file. In electronics, systems may all have to be 12V or 24V, 110V, a threshold of power user, etc. or use a common set of features (e.g., driving voltages, antenna gains, etc.). In these use cases, the similarity score can be a function of the uniqueness and the similarity. For example, the estimated value of the digital token 232 can increase when it includes the unique feature while also including the other necessary similar features.

The value and/or similarity score can be included in the digital token data 111 and presented at a UI of the user device 230. Further, the management services engine 218 may store the digital token 232 as a digital token 224 in the database 220. As needed, the TMP 210 can generate a block in a blockchain for the digital token 224 and cause other blockchain nodes to do the same and can include in the digital token 224 a set of program codes (e.g., smart contracts in the NFT use case, APIs, method calls, library calls, etc.) or a link to such program code(s). The TMP 210 can also publish information about the digital token 224 (including its value and/or similarity score) in a digital token marketplace and can facilitate the transfer of the digital token 224 to a new owner (e.g., based on the set of program codes, etc.).

In another example, the digital token 232 may not be unique or may be restricted (e.g., its similarity score indicates it is similar to known NFTs, known restricted instantiation criteria, indicates it is similar to known or defined restrictions, etc.). In this example, one or more program codes can be executed to control the operations of the management services engine 218. The execution may allow the digital token 232 to exist (e.g., because it is owned by the same owner as a similar digital token, because token creator has a license to the subject matter, etc.). For example, similar tokens may have the same owner ID (e.g., GUID, UUID, wallet address, public or private key, etc.) as that of the proposed new token. Similar operations to the ones described above can be performed in this situation. In a further situation, the execution can indicate that the digital token 232 is to be added to a collection of digital tokens (e.g., the collection being generated by a same author but possibly owned by different owners, ERC 998 token, ERC 1155 token set, etc.). Similar operations to the ones described in the previous paragraph can be performed in this situation, in addition to adding the digital token 232 to the collection (e.g., the digital token 232, the collection of other digital tokens, and the collection associations therebetween can be stored in the database 220, etc.). In an additional situation, the execution can limit the use of the digital token 232 (e.g., the digital asset, etc.) associated therewith can be used, but the usage can be limited to a particular number of times, particular domains (e.g., web sites, etc.), personal use, commercial use, and the like, possibly as governed according to a corresponding smart contract. Here also, similar operations to the ones described above can be performed in this situation, in addition to indicating the limited use in the token data 211. In yet another situation, the execution may prevent co-existence of the digital token 232 with at least one other similar, already existing digital token 232 (e.g., because the digital asset is the same or substantially similar across both digital tokens while the ownership is different, etc.). In this case, the digital token 232 may be expired or burned (e.g., by sending the digital token 232 to a NULL address via the corresponding smart contract burn ( ) interface, etc.). In a further situation, the execution may necessitate additional services to be invoked. For instance, when the digital token 232 is for a copyrightable work, a copyright service can be invoked (e.g., a copyright cease and desist letter can be generated and/or the owner of the relevant copyright can be notified, etc.). In comparison, when the digital token 232 is for a real-estate property (e.g., recording a deed thereof, etc.), a real-estate service can be invoked (e.g., a property dispute complaint can be generated and/or the owner of the legal representative of the relevant real-estate property can be notified, etc.). Thus, the disclosed inventive subject matter can be used for intangible rights enforcement based on a token's similarity score or satisfaction (or lack thereof) of similarity criteria. Further, the similarity scores or similarity criteria may be used to restrict creation or minting of NFTs. For example, if an NFT is found to satisfy offensive or repugnant criteria, the subject matter of the NFTs may be prevents from being minted or instantiated in the first place.

Figure 3:
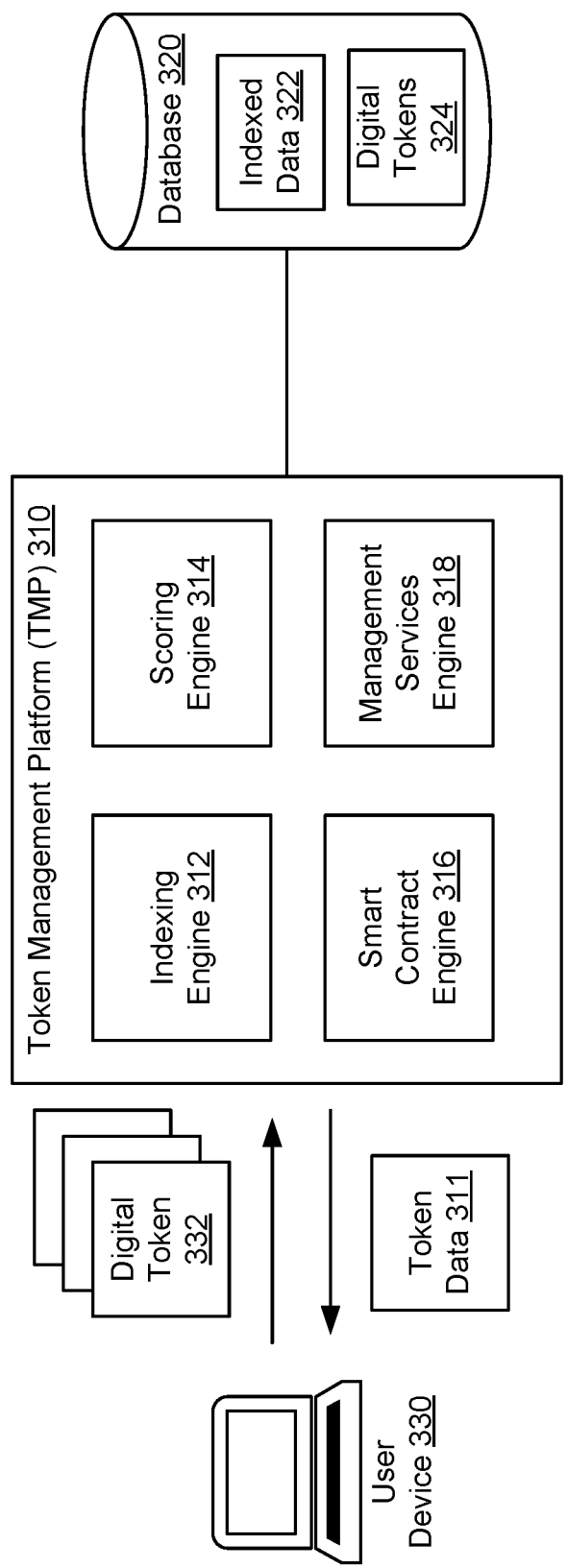
FIG. 3 illustrates an example of a TMP managing the generation of a digital token based on a multi-digital token input, according to embodiments of the present disclosure.

FIG. 3 illustrates an example of a TMP 310 managing the generation of a digital token based on a multi-digital token input, according to embodiments of the present disclosure. The TMP 310 is similar to the TMP 110 of FIG. 1 and can use a database 320 similar to the database 120 of FIG. 1. In particular, the TMP 310 includes an indexing engine 312, a scoring engine 314, a smart contract engine 316, and a management services engine 318. The database 320 includes indexed data 322 and digital tokens 324. The digital token input can be received from a user device 330, which is similar to the user device 130 of FIG. 1, and token data 311 can be sent back in response to such input. In the interest of brevity of explanation, the similarities between the two figures are not repeated herein and are assumed to be equally applicable to FIG. 3. Instead, the description of FIG. 3 focuses on the additional embodiments.

As illustrated in FIG. 3, the multi-digital token input can include multiple digital tokens 332 (or information about such digital tokens). The TMP 310 can provide multi-token management and transactions functionalities. For instance, the TMP 310 can generate a set of program codes (e.g., a smart contract in the case of multiple NFTs, etc.) that control the use of the multiple digital tokens 332. In other words, rather than having to input each of the digital tokens 332 separately to the TMP 110, a single input can be received and the TMP 310 can process the multiple digital tokens 332 to then generate or execute the relevant program codes. Referring to the NFT use case, the multi-token management and transactions functionalities can be compliant with, for instance, the ERC-1155 standard for the Ethereum blockchain infrastructure or equivalent for other ledger systems.

In an example, each one of the digital tokens 332 can be processed individually. Similar to the above description of FIGS. 1 and 2, the processing can include a similarity comparison, the invocation of the relevant program codes (e.g., smart contracts, etc.), and the execution of a set of one or more operations (e.g., block creation, block prevention, valuation, alteration recommendation, addition to collection, limiting use, restricting, expiring or burning, transfer, sell, etc.). If a block creation is applicable to more than two digital tokens, the same set of program codes can be created and associated with such digital tokens (e.g., per the ERC-1155 standard, etc.).

In another example, each one of the digital tokens 332 can be processed individually for similarity comparison, but the execution of the program codes can be collectively across the digital tokens 332 as a group, possibly via a multi-threaded system. If a single digital token of this group is similar to an existing digital token (or is associated with a digital asset that is similar to another digital asset), the relevant program code(s) is invoked, and the execution result is applied to the entire group. For instance, if the execution prevents a block from being created for the single digital token, creating blocks for the remaining digital tokens of the group can also be prevented. If multiple digital tokens of the group are similar to one or more existing digital tokens (or are associated with digital assets that are similar to one or more digital assets), the relevant program code(s) is invoked, and the execution results are applied to the entire group. If conflicts exist between the execution results, a conflict resolution procedure can be executed. For instance, say that the execution is for two program codes that correspond to two digital tokens of the group. The first program execution indicates that one digital token is valid and the other digital token is invalid, whereas the second program execution indicates that both digital tokens are valid. In this case, first program execution can have a higher hierarchy and can invalidate the digital tokens 332. In another illustration, the first program execution indicates an alteration recommendation is made to the first digital token whereas the second program execution indicates addition to collection. In this case, the digital tokens 332 are added to the collection after the alteration is made to the first digital token. Management of invocation of a smart contract may be governed by similar criteria defined based on the attributes of the corresponding tokens. Such attributes may adhere to an a priori defined namespace, ontology, or custom attribute space. Further each attribute could include a corresponding value, which gives rise to the generated metadata for the tokens as an N-tuple of attribute-value pairs that may then be used for comparing similarities more easily in the computer-based implementation. Further, such attributes spaces may be updated as time passes. Yet further, the attribute spaces may comprise many dimensions of relevance, possibly aligned with the various data modalities of the corresponding digital or real-world asset.

In yet another example, the digital tokens 332 can be processed as a group. In particular, the similarity of each digital tokens 332 is determined and a similarity of the group is derived therefrom (e.g., as a weighted or average sum of the individual similarity scores, standard deviation of the values, etc.). A similarity score can be single valued or multi-valued (average, standard deviation, etc.). Further, the similarity score could have one or more dimensions: a text similarity, an image similarity, an audio similarity, etc. Said differently, the similarity score can have multiple dimensions, possibly based on the token's modalities as referenced above. Depending on the group's similarity score, then relevant program codes can be invoked. For example, the similarity score may be calculated as an Euclidian distance between the values of existing digital token with respect to the multiple dimensions and the values of the new tokens as a group or individually with respect to the same multiple dimensions. In an embodiment where a similarity score is calculated using multiple dimensions, each dimension may be assigned a weight so that its effect on the overall similarity score is greater or less than other dimensions. If a block creation is determined based on the similarity score(s) (e.g., Euclidean distances, Hamming distances, similarity criteria satisfaction, etc.), the same set of program codes can be created and associated with the digital tokens 332 (e.g., per the ERC-1155 standard, per the ERC-998 standard, or new standards yet to be created, etc.).

Figure 4:
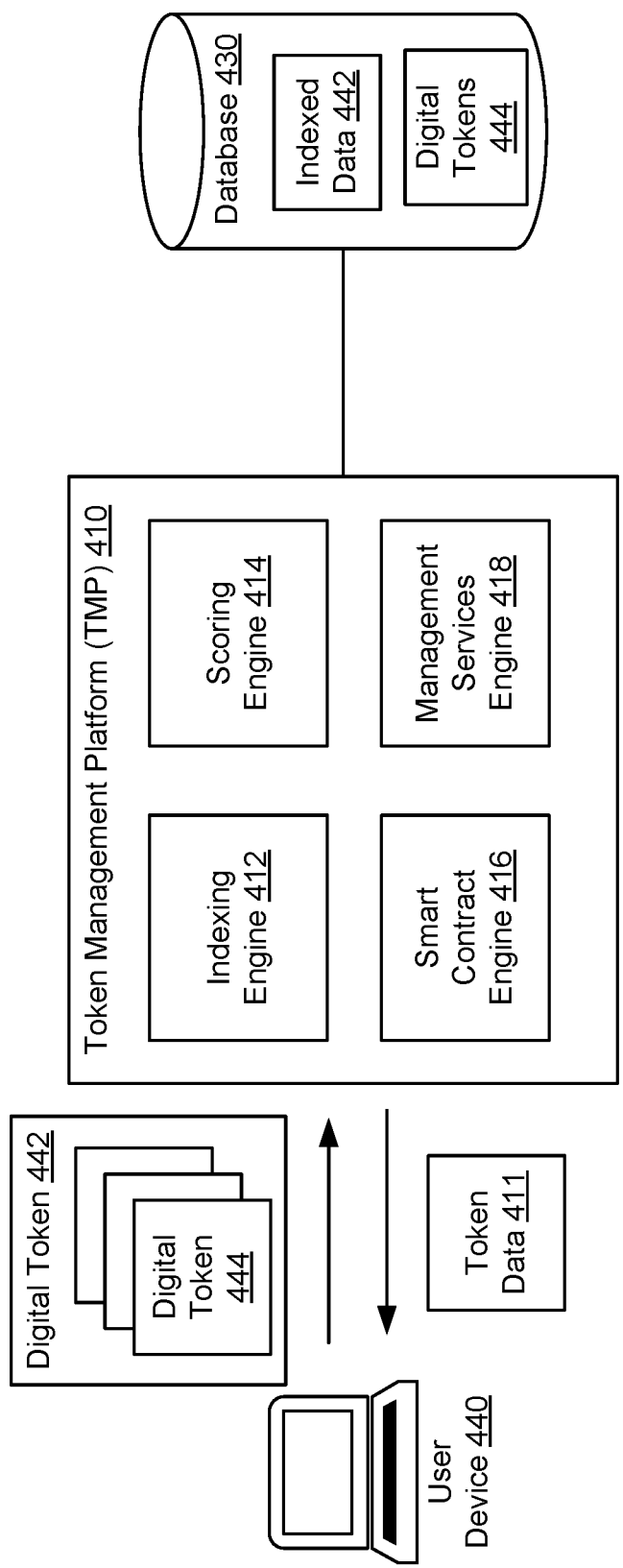
FIG. 4 illustrates an example of a TMP managing the generation of a digital token based on a digital token input composed of multiple digital tokens, according to embodiments of the present disclosure.

FIG. 4 illustrates an example of a TMP 410 managing the generation of a digital token based on a digital token input composed of multiple digital tokens, according to embodiments of the present disclosure. The TMP 410 is similar to the TMP 310 of FIG. 3 and can use a database 420 similar to the database 320 of FIG. 3. In particular, the TMP 410 includes an indexing engine 412, a scoring engine 414, a smart contract engine 416, and a management services engine 418. The database 420 includes indexed data 422 and digital tokens 424. The digital token input can be received from a user device 430, which is similar to the user device 330 of FIG. 3, and token data 411 can be sent back in response to such input. In the interest of brevity of explanation, the similarities between the two figures are not repeated herein and are assumed to be equally applicable to FIG. 4. Instead, the description of FIG. 4 focuses on the additional embodiments.

As illustrated in FIG. 4, the multi-digital token input can include a single digital token 442 that is composed of multiple digital tokens 444 (or information about such digital tokens). For instance, each digital token 444 may be associated with a digital asset, and the composition of such digital assets is associated with the digital token 442. Referring to the NFT use case, the digital token 442 corresponds to an NFT generated according to the ERC-998 standard and composed of multiple NFTs. Such techniques may be leveraged to create in-game content for video games, possibly including a player character (a composable token) that has various skins, weapons, armor, spells, or other items that may all be represented by NFTs. Another example could include a composable token representing a deck of collectible cards where each individual card in the deck may be represented by an NFT. Another example could include a composable token representing an intellectual property portfolio with one or more intellectual property assets (e.g., copyrights, trademarks, design patents, etc.) each represented by an NFT.

While reference is made ERCs (Ethereum), the embodiments of the present disclosure are not limited as such. Generally, the embodiments similarly and equivalently apply to ledger tokens, fungible ledger tokens, non-fungible ledger tokens, collection ledger tokens, composable ledger tokens, expandable tokens, chained tokens, or other types of tokens. A ledger token can be a digital token instantiated on a corresponding notarized ledger. A fungible ledger token can be cryptocurrency managed by the corresponding notarized ledger, such as by blockchain. A non-fungible ledger token can be a unique digital token on the corresponding ledger, such as ERC-721 tokens. A collection ledger token can be a set of digital tokens associated with a same set of smart contracts, such as ERC-1155 tokens. A composable ledger tokens can be a digital token that includes directly or indirectly (e.g., such as being including URLs, URIs, GUIDs, etc.) other digital tokens, such as ERC-998 tokens. An expandable token can be a set or a digital token that increases in scope as time passes and is considered part of the inventive subject matter. For example, a genesis token may be minted, which points to an off-chain location, which intern points to additional tokens created as part of the same set. As time passes, the complete set can be compiled from walking from the pointer in the genesis token through the pointers to new tokens on the ledger. A chained token can be a digital token linked to another token, such as for version control where each digital token corresponds to a version, and where the digital tokens are linked. Chained tokens are also considered part of the inventive subject matter. For example, tokens may point back to a previous token in the same set. Such an approach is advantageous for construction time-series data such as electronic medical or health records of an individual. Yet another time of token can comprise a cross-ledger token, where a single token can be represented on more than one notarized ledger. From an NFT perspective, this can be achieved by minting one ledger-specific NFT for each notarized ledger, where each ledger-specific NFT minting transaction record points to a common off-ledger digital asset. Additionally, cross-ledger support for NFTs can be achieved by burning an existing NFT on a first ledger, then creating a new NFT representing the same digital or real-world asset on a second ledger.

Here also, the TMP 410 can provide multi-token management and transactions functionalities. For instance, the TMP 410 can generate a set of program codes (e.g., a smart contract in the case of multiple NFTs, an ensemble of smart contracts, etc.) that control the use of the digital token 442 and the individual use of each digital token 444. To do so, different processing techniques are possible.

In one example processing technique, the digital tokens 444 have been previously assessed and are unique enough as determined by their similarity score, metrics, values, criteria, or other measure. However, the arrangement of the digital tokens 444 together corresponds to a new digital asset that has not been assessed yet. Accordingly, the new digital asset (or, equivalently, the digital token 442) is processed for similarity scoring, program code invocation, and manager services operations.

In another example processing technique, none of the digital tokens 444 and the digital token 442 have been previously assessed. Here, two approaches can be followed. In a forward approach, the digital token 442 is assessed first. If unique or distinctive enough, each of the digital tokens 444 is assessed next. If none of the digital tokens 444 and the digital token 442 is unique enough, creating a block for the digital token 442 and for each digital token 444 and the related program code(s) can be prevented until alterations are made. In a reverse approach, the digital tokens 444 are assessed first. If unique enough, then digital token 442 is assessed next. Here also, if none of the digital tokens 444 and the digital token 442 is unique enough, creating a block for the digital token 442 and for each digital token 444 and the related program code(s) can be prevented until alterations are made. In embodiments that leverage automated content creation tools, such as Generative Adversarial Networks (GANs), genetic algorithms or even procedural generation tools (e.g., custom procedural generation tools, wave function collapse tools, random or pseudorandom generation tools, etc.); the creation tools can automatically iterate content creation until a desired similarity score is achieved or desired similarity criteria are satisfied (or not satisfied). Example tools that may be used to automatically generate content based on text prompts NightCafe (see URL creator-.nightcafe.studio) or DALL-E 2 from OpenAI (see URL openai.com/dall-e-2), just to name a few. Thus, one approach may include automatically generating text prompts for an AI tool and varying the prompt then submitting the prompts to the tools until a desired similarity satisfaction level is achieved for the generated content.

To illustrate, consider an example of a video game character as a first digital asset in a first video game. A video game sword of the video game can be added to the video game character as a second digital asset. The combination of the video game character and the sword can correspond to or form a third digital asset. Here, the digital token 442 represents the combination, whereas one digital token 444 represents the video game character, and another digital token 444 represents the sword. In this illustration, say that the video game character is unique, the sword is unique, but their combination is similar enough to another combination in a second video game. As such, the combination may not be minted as an NFT unless, for instance, an alternation is made to the video game character (e.g., name, skins, characteristics, attributes, etc.) such that the combination becomes different enough. Thus, this example further is illustrative of enforcing or otherwise managing intellectual property; copyright in this case, across content platforms, genres, data modalities, rights, or other arenas.

In another illustration, the comparison may be between the two assets, making sure they are compatible, or are similar enough. The similarity may need to be very high (e.g., over a threshold value, achieve a desired satisfaction level or levels, or meet a certain set of criteria, etc.) for the two to be compatible. In the context of mechanical components (e.g., two meshed gears, standardized components, etc.), two items may need to fit together. The more similar the items, the more likely they can fit. In this use case, if a digital token is used to protect one of the mechanical items, its similarity score, minting it, or valuing it can depend on how good the fit is to the other item. This approach can be achieved through use of suitable metadata or attributes assigned to the digital assets as well as the nature of their corresponding digital tokens.

In yet another illustration, the comparison can use rules that prohibit combinations of assets even when the resulting combination is unique. In such a situation, a digital token to protect a prohibited combination may not be minted or its value can be made low. For example, in the context of a video game, a video game character can represent human, and a video game object can be a sword for giants. Although the character-object combination is unique, it may be prohibited or restricted. As such, no NFT could be minted for it. Still, in other embodiments, such an NFT might be permitted to be minted or created, subject to overriding conditions, say in exchange for a suitable fee. Thus, the inventive subject matter is considered into include a fee schedule for monetizing overriding restrictions where the fee may be scaled based on the similarity score, license fees, or other factors. Such fee schedules may operate based a look up table, hash table, database scheme, or other techniques. Fee schedules may be bound to the NFTs or corresponding smart contracts. For example, an NFT's digital assets may include the fee schedule, a pointer to a fee schedule, or other type of coupling. All or a portion of the suitable fees may be paid to an owner and/or creator of an existing similar NFT. In certain embodiments, at least a portion of the fees may be paid to the TMP 410

Figure 5:
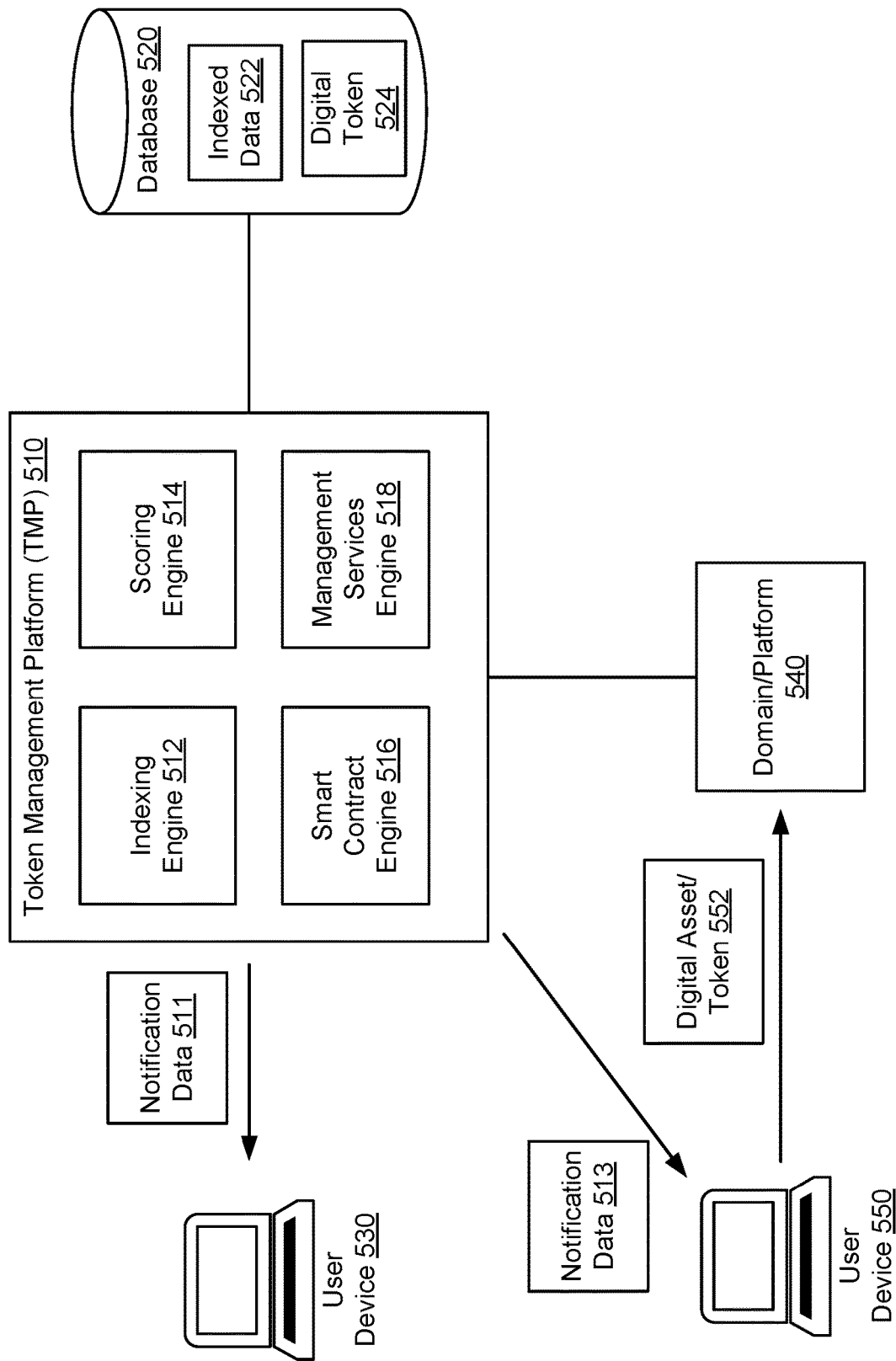
FIG. 5 illustrates an example of a TMP monitoring the use of a digital asset associated with a digital token, according to embodiments of the present disclosure.

FIG. 5 illustrates an example of a TMP 510 monitoring the use of a digital asset associated with a digital token, according to embodiments of the present disclosure. The TMP 510 is similar to any of the previously described TMPs and includes an indexing engine 512, a scoring engine 514, a smart contract engine 516, and a management services engine 518.

In the illustration of FIG. 5, assume that a user device 530 is operated by a user who has an account with the TMP 510, possibly where the account is coupled with one or more digital wallets. A digital token 524 has already been generated for the user (e.g., identifying the user as an owner of a digital asset, etc.) and stored in a database 520 (which is similar to any of the previously described databases). The storing can include actual storage of the digital token 524 and/or attributes (e.g., known descriptors, features, metadata, characteristics, watermarks, parameters used to generate digital token 524, etc.) thereof with a set of pointers to actual token data. The attributes can be used for the similarity comparison. The database 520 may be constructed different ways for fast comparisons (e.g., search trees, hash tables, KNN search trees, etc.) and the construction can depend on the indexing technology. The user may have signed up (e.g., via an account setting, etc.) for a monitoring service of the TMP 510. This monitoring service of the TMP 510 can be at multiple levels and can be cross-platform, such as a digital asset level and a digital local level across multiple domains and systems.

As far as the digital asset level, the TMP 510 can track the use of the digital asset and/or the use of similar digital assets (shown in FIG. 5 as "digital asset/token 552" used on a "domain/platform" 540"). For instance, the account setting can indicate target domains (e.g., web sites, domain databases, social media communities, gaming platforms, etc.) that the TMP 510 monitors. In this case, the TMP 510 can retrieve and index digital assets used by these domains and add the resulting indexed data 522 to the databases 520. Additionally, or alternatively, absent of such account setting indication, the TMP 510 can use web crawlers, or other techniques, to index multiple domains. The indexed data 522 can be used for similarity comparison with the digital asset. In some embodiments, the domain/platform may be instrumented with one or more widgets that couple to TMP 510 over the network or Internet to thereby leverage its services.

As far as the digital token asset level, the TMP 510 can track the use of the digital asset and/or the use of similar digital assets per above. The TMP 510 can also use another digital token that is associated with the digital asset or with another similar digital asset (also shown in FIG. 5 as "digital asset/token 552" used on a "domain/platform" 540"). For instance, if a new digital token is being generated or added to the TMP 510, the TMP 510 compares it to the digital token 524. Similarly, the TMP 510 can be a node in a blockchain or notarized ledger network and can generate a block for another digital token that is defined via another platform. In this case, this other digital token is also compared to the digital token 524. Note that a block may indicate a transaction related to the digital token and/or it may also indicate other non-token related transactions associated with the blockchain. In yet another example, the TMP 510 can make API calls to other platforms (e.g., NFT marketplaces, social media, gaming applications, etc.) to retrieve and index the digital tokens that they manage and add the resulting and add the resulting indexed data 522 to the databases 520. The indexed data 522 can be used for similarity comparison with the digital token 524.

Depending on the outcome of the similarity comparison, the TMP's 510 management services engine 518 can execute a notification operation. For instance, if the digital asset is being used, a similar digital asset is being used, or a similar digital token is being used (e.g., including the same digital asset or a similar digital asset and indicating a different owner, etc.), the TMP 510 can send notification data 511 to the user device 530. The notification data 511 can indicate, as applicable, the digital token 552, the similar digital asset, the domain/platform 540 where digital asset or the similar digital asset exists or is being used, or the content is excluded from being used to create a token, the user of the digital asset or the similar digital asset, the similar digital token, the domain/platform 540 where the similar digital token was created, and/or the owner of the similar digital token. In addition, the TMP 510 can send notification data 513 to a user device 550 associated with the similar use. The notification data 513 can indicate the digital token 524, the digital asset, and the owner of the digital token 552. The notification data 513 can also request the similar use to stop or payment for it. The content of each of the notification data 511 and 513 can be defined in a program code associated with the digital token 524 and that the smart contract engine 516 invokes upon the similarity determination.

Figure 6:
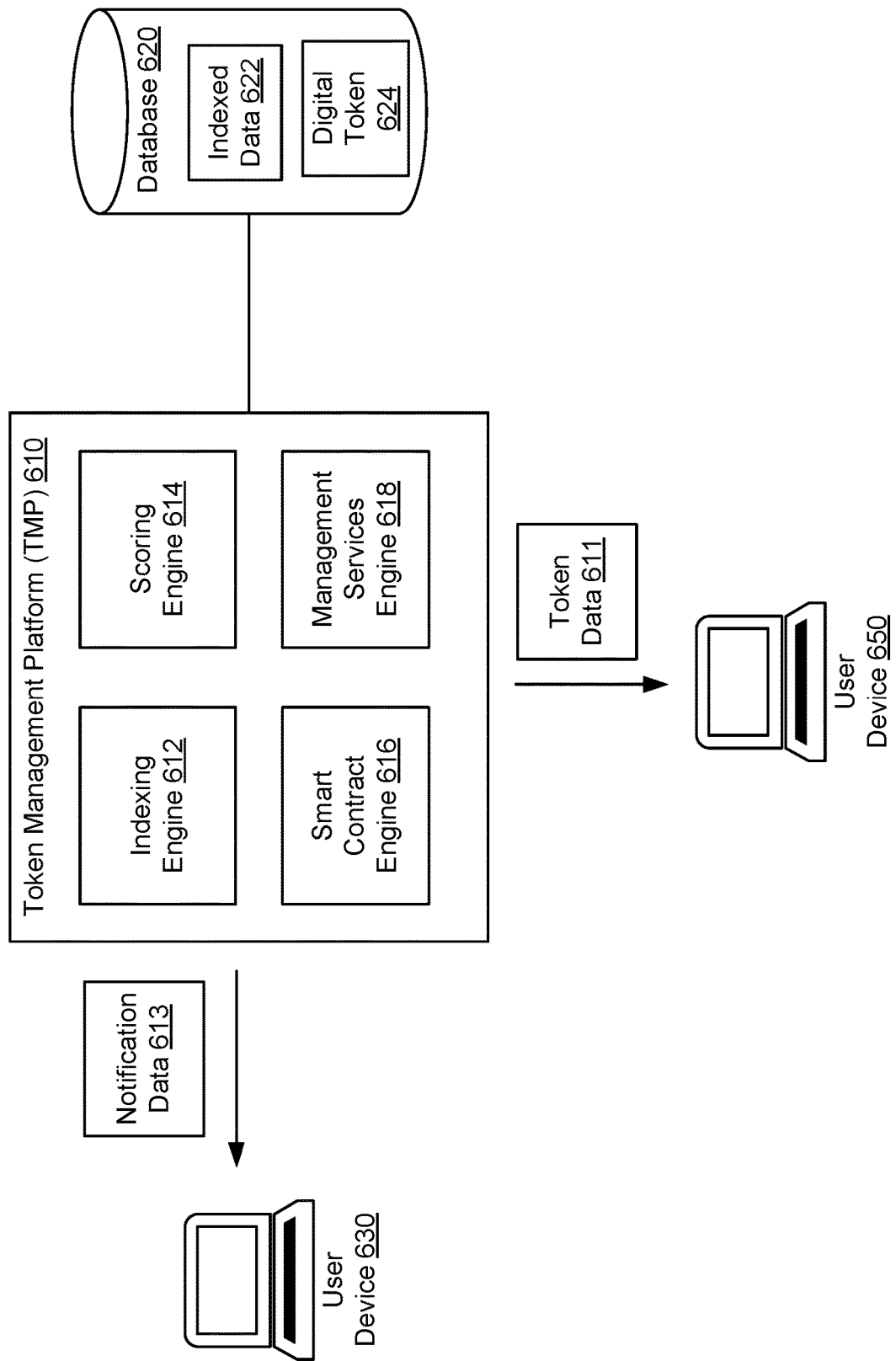
FIG. 6 illustrates an example of a TMP managing the transfer of a digital token, according to embodiments of the present disclosure.

FIG. 6 illustrates an example of a TMP 610 managing the transfer of a digital token, according to embodiments of the present disclosure. The TMP 610 is similar to any of the described TMPs hereinabove. In the illustration of FIG. 6, assume that the TMP 610 stores a digital token 624 in a database 620 for an owner of the digital token 624, where the owner operates a user device 630. The owner can be an individual or an entity (e.g., an agency, an organization, publisher, newspaper, magazine, hospital, gaming company, etc.) and has an account with the TMP 610 (e.g., a cryptographic wallet, such as MetaMask, Math Wallet, AlphaWallet, Trust Wallet, Coinbase Wallet, etc.).

The TMP 610 can include an indexing engine 612 that generates indexed data 622 for digital assets and/or digital tokens. The indexed data 622 can be stored in the database 620. The TMP 610 also includes a scoring engine 614 and a smart contract engine 616 for determining the uniqueness and creation of the digital token 624 based on the indexed data 622 and a set of smart contracts. The TMP 610 further includes a management services engine 618 usable for many digital token post-creation services.

One example of the digital token post-creation services includes enabling the browsing or searching of digital tokens via the TMP 610. For instance, a user device 650 can connect to the TMP 610 over a network (not shown). An application (e.g., a web browser, etc.) executing on the user device 650 can request (e.g., through browsing or searching, etc.) and present token data 611 at a GUI of the user device 650 about digital tokens. Referring to the digital token 624, the token data 611 can indicate the digital asset associate therewith, the provenance of the digital token 624 (e.g., the owner, the date and/or location of creation of the digital asset and/or the digital token 624, parameters used to generate digital token 624, etc.), and/or information about steps associated with creating the digital token 624. Further, given that a similarity score is available for the digital token 624 based on the indexed data 622, the token data 611 can indicate the similarity of the digital token 624 and/or digital asset to other ones (or, equivalently, the uniqueness). For instance, the similarity score can be included in the token data 611 for presentation at the GUI. Additionally, or alternatively, similar digital assets and/or digital tokens can be indicated in the token data 611 (e.g., for presentation as a similar collection, etc.). The management services engine 618 can also generate a value of the digital token 624 (e.g., generally, the smaller the similarity score is, the larger the value becomes, etc.). The token data 611 can also indicate this value. For browse or search functionalities, the management services engine 618 can enable filters based on any of the type of digital asset, the provenance, the uniqueness, and/or the value.

Another example of the digital token post-creation services includes ownership transfer. For instance, assume that the TMP 610 receive a request from the user device 650 to acquire the digital token 624. In this case, the management services engine 618 can pass information about the request to the smart contract engine 616 for this acquisition. This information can indicate the digital token 624 (e.g., token identifier, unique identifier for NFTs, token address, address where the token and/or its data is stored, etc.), the current owner (e.g., the public address of their cryptographic wallet, etc.), the next owner (e.g., the operator of the user device 650 indicated by public address of their cryptographic wallet, etc.). Upon execution of the relevant smart contact(s), the management services engine 618 can update the ownership of the digital token 624. For instance, a transaction is recorded in or on a block of a blockchain or notarized ledger associated with the digital token 624. The management service engine 618 can send token data 611 to the user device 650 and notification data 613 to the user device 630 to indicate the ownership transfer. If this transfer necessitates a communication exchange between the accounts (e.g., an exchange email communication, etc.), the management service engine 618 can facilitate the relevant communications. Further, if necessary or desirable, the corresponding digital assets may be updated with any new information. For example, if the digital asset represents a painting, the painting's digital data stored off-ledger can be updated to reflect the name of the new owner. Thus, the inventive subject matter is considered to include using the similarity score or value to trigger a chain or series of machine actions including updating remote data off-ledger according to the requirements determined from the similarity comparison.

Yet another example of the digital token post-creation services includes temporary co-ownership. For instance, consider the following use case related to the TMP 610 supporting a job dashboard. The TMP receives from the user device 630 information for a job to be performed (e.g., the type, timing, location, description, pay of the job, etc.) and generates the digital token 624 for the job. Here, the digital asset represents the job to be performed and the digital token 624 associates this job with the operator of the user device 630 (e.g., referred to as "owner A" in this illustrative use case, etc.). Based on job searching or browsing, the user device 650 presents a job dashboard of available jobs. The job is selected, whereby the operator of the user device 650 (e.g., referred to as "owner B" in this illustrative use case, etc.) agrees to performing the job. As such, the management service engine 618 can update the digital token 624 (e.g., by creating a block in the blockchain, etc.) to indicate co-ownership of the job (that the digital token 624 is owned by both owner A and owner B). Based on the co-ownership indication, the management service engine 618 can remove the job from available jobs that can be presented in the job dashboard or can update the job's status on the job dashboard (e.g., indicate that the job is co-owned or that the job has been accepted, etc.). Further, the management service engine 618 can invoke the relevant smart contract(s). Upon execution of the smart contract(s), the management service engine 618 can further update the digital token 624 from having co-ownership to sole ownership again. For instance, if the execution indicates that the job has been performed or that owner A has made a payment to owner B in return for the job performance (or, whatever set of operations are performed per the smart contract(s)), the management service engine 618 can update the digital token 624 to indicate that this digital token 624 is now owned only by owner B. In comparison, if the execution indicates that the job was not performed, the management service engine 618 can update the digital token 624 to indicate that this digital token 624 is now owned again only by owner A. The management service engine 618 can also allow auditing of jobs. For instance, digital tokens associated with jobs and owned (permanently or temporarily) by a particular owner (e.g., owner B in this illustrative use case, etc.) can be retrieved and the status of each job and related information (e.g., time of performance, pay, etc.) can be determined. The job use case is provided herein for illustrative purposes only.

The embodiments of the present disclosure similarly and equivalently cover other digital assets that can be co-owned. For instance, a digital asset representing digital data (e.g., digital artwork to be leased to an art exhibit, a digital movie rental, a digital video game rental, etc.) or a physical asset (e.g., a physical artwork to be leased to the art exhibit, a lease of a physical property, lease to a physical asset, etc.) can be associated with a digital token and the TMP 610 can facilitate the temporary co-ownership of such digital token.

Further, co-owned assets can include licensed properties, loans, intellectual property rights (e.g., a license to patent rights, a license to copyrights, etc.), or other form of intangibles. Still further, co-ownership can be represented via a primary owner, say a landlord of a house, and a secondary owner, say a renter of the house. Thus, such ownership can include any practical number of or levels of owners and sub-owners, or even lease related relationships subject to restrictions of agreements or smart contract restrictions. Other assets that can be exchanged for a limited time can include a game object (e.g., two players could swap specific weapons that may be needed for a quest, etc.), rights to access specific area both real and virtual, rights to accessing a virtually created area in a video game, rights to access particular data or computing service, rights to access a computer network, a real estate rental, a vehicle rental, etc.

Figure 7:
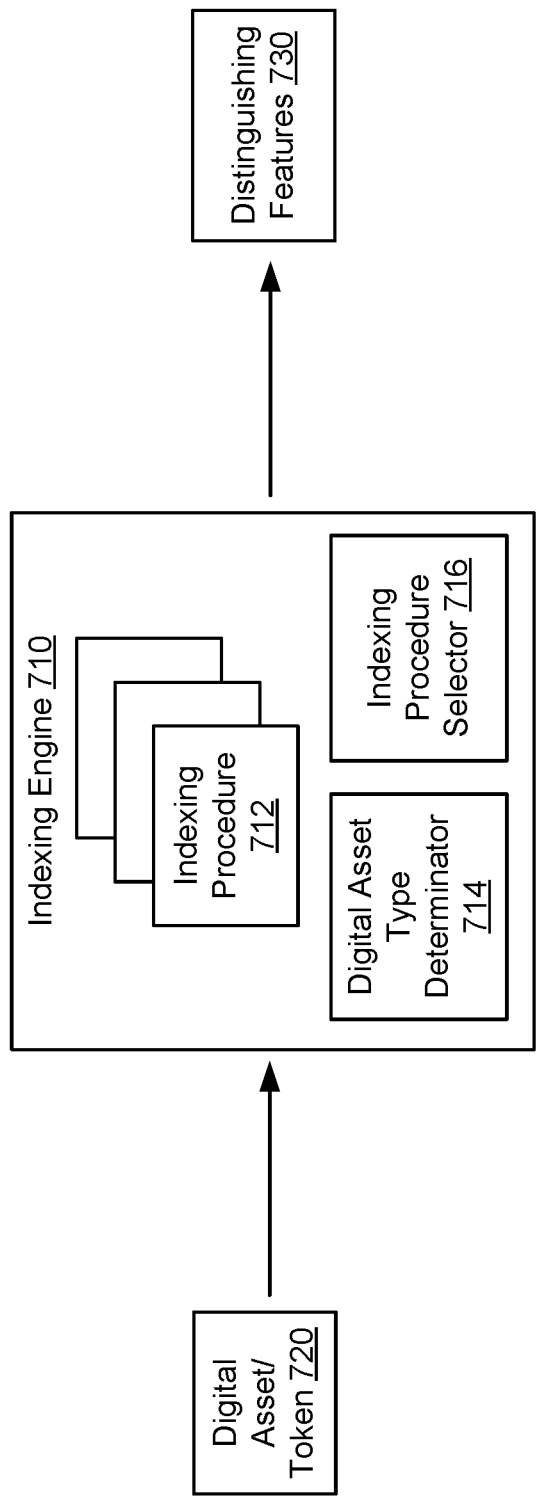
FIG. 7 illustrates an example of an indexing engine of a TMP, according to embodiments of the present disclosure.

FIG. 7 illustrates an example of an indexing engine 710 of a TMP, according to embodiments of the present disclosure. The indexing engine 710 can receive and process a digital asset and/or digital token 720 to output distinguishing features 730 of such digital asset and/or digital token 720. The distinguishing features 730 can then be used as indexing data of the digital asset and/or digital token 720.

In the interest of clarity of explanation, the indexing of a digital asset is described herein next. The embodiments similarly and equivalently apply to the indexing of a digital token. In particular, the digital token can include or indicate a digital asset (e.g., by including its URL, a pointer, a HOI, a DOI, GUID, UUID, etc.). The digital token can also include other data (e.g., ownership data, transaction data, metadata, digital watermark, etc.). As such, indexing the digital token can include indexing the digital asset and, optionally, indexing the other data. The indexing of the other data can depend on its type (e.g., text, image, etc.) and can use the same indexing procedure(s) applicable to a digital asset of that type. For example, digital assets may be indexed by a file name and stored in a file system, by a hash address and stored in a hash stable or torrent-based storage system, In an example, the indexing engine 710 includes multiple indexing procedures 712. Each indexing procedure 712 can be implemented as executable program code that represents a set of algorithms and can be associated with a type of digital assets (e.g., edge detection and color histogram can be associated with images, whereas word embedding can be associated with a text, etc.). Examples of the indexing procedures 712 include optical character recognition (OCR), object detection, word embedding, edge detection, color histogram generation, audio fingerprinting, video fingerprinting, machine learning algorithms, a scan, investigate, filter, and target (SIFT) algorithm, a speeded up robust features (SURF) algorithm, DAISY, Sobel features, FAST, HOG, a Canny edge detector, OpenCV algorithms (see URL opencv.org), or other digital features obtainable via implementations of feature detection algorithms. More specifically each implementation of an algorithm generates numerical values that can then be used as indices for the corresponding digital assets. Of particular interest, multiple implementations of different algorithms provide for multiple types or dimensions of indices, which provide for greater capability of finding digital assets that are similar to each other. This is especially true with respect to digital assets having multiple data modalities such as video, animations, waveforms (e.g., EKGs, etc.), annotated imaged, or other types of digital media having two or more modalities.

Some of the indexing procedures 712 can be specific to NFTs. Herein next, a set of such indexing procedures 712 is described in connection with references. The subject matter of each identified reference can be adapted for use with the embodiments of the present disclosure. One example indexing procedure 712 includes robust features detection to determine features of an NFT that are most useful to tracking/monitoring purposes as described in U.S. Pat. No. 10,719,731 "Robust feature identification for image-based object recognition," which is incorporated herein by reference in its entirety. In this case, detected features of an NFT can be set as distinguishing features for indexing purposes and stored in a database. Another example indexing procedure 712 includes edge vector detection to use as a descriptor for identifying visual NFTs as described in U.S. Pat. No. 11,210,550 "Image-based feature detection using edge vectors," which is incorporated herein by reference in its entirety and which can be adapted for use with the inventive subject matter. In this case, edge vectors determined for a digital asset (e.g., for an image, a video frame, etc.) can be set as distinguishing features for indexing purposes and stored in a database. Another example indexing procedure 712 includes unique action detection in the context of a healthcare block chain recording events usable to store NFTs as described in U.S. Pat. No. 10,340,038 "Healthcare transaction validation via blockchain, systems and methods," which is incorporated herein by reference in its entirety. In this case, healthcare events, healthcare data, and/or access rights to such events and/or data can be set as distinguishing features for indexing purposes and stored in a database. Another example indexing procedure 712 includes feature density detection to find descriptors for identifying text based or other forms of NFTs as described in U.S. Pat. No. 10,671,879 "Feature density object classification, systems and methods," which is incorporated herein by reference in its entirety. In this case, identified text data can be set as distinguishing features for indexing purposes and stored in a database. Another example indexing procedure 712 includes global signature detection of NFTs as described in U.S. Pat. No. 10,796,196 "Large scale image recognition using global signatures and local feature information," which is incorporated herein by reference in its entirety, and as described in U.S. Pat. No. 10,565,759 "Global signatures for large-scale image recognition," which is also incorporated herein by reference in its entirety. In this case, detected features of an image, which can represent a global signature, can be set as distinguishing features for indexing purposes and stored in a database. Another example indexing procedure 712 includes content activation by juxtaposition of NFTs or juxtaposition of objects, real or virtual, relative to NFTs as described in U.S. Pat. No. 10,841,292 "Content activation via interaction-based authentication, systems and method," which is incorporated herein by reference in its entirety. In this case, features of the content and/or features detected for the juxtaposition can be set as distinguishing features for indexing purposes and stored in a database. Another example indexing procedure 712 includes event archiving via NFTs bound to specific memento objects or NFTs operating as memento objects as described in U.S. Pat. Pub. No. 2020/0151138 "Event archiving, systems and methods," which is incorporated herein by reference in its entirety. In this case, features of an event and/or archiving data can be set as distinguishing features for indexing purposes and stored in a database. Another example indexing procedure 712 includes tracking unique items as described in U.S. Pat. No. 10,923,215 "Sample tracking via sample tracking chains, systems and methods," which is incorporated herein by reference in its entirety. In this case, detected features of an item can be set as distinguishing features for indexing purposes and stored in a database.

Another example indexing procedure 712 includes event storing for state-based NFTs as described in U.S. Pat. No. 11,020,668 "Distributed ledger tracking of event data," which is incorporated herein by reference in its entirety. In this case, the event data can be set as distinguishing features for indexing purposes and stored in a database. Another example indexing procedure 712 includes artwork tracking as described in U.S. Pat. No. 11,210,383 "Content authentication and validation via multi-factor digital tokens, systems, and methods," which is incorporated herein by reference in its entirety. In this case, detected features of an artwork can be set as distinguishing features for indexing purposes and stored in a database. Another example indexing procedure 712 includes virtual and real-world content processing as described in U.S. Pat. Pub. No. 2021/0052976 "Virtual and real-world content creation, apparatus, systems, and methods," which is incorporated herein by reference in its entirety. In this case, detected features of content can be set as distinguishing features for indexing purposes and stored in a database. Another example indexing procedure 712 includes healthcare access rights processing as described in U.S. patent application Ser. No. 17/590,291 "Token-based digital private data exchange systems, methods, and apparatus," which is incorporated herein by reference in its entirety. In this case, access rights and/or fields of digital tokens controlling such access rights can be set as distinguishing features for indexing purposes and stored in a database. The above discussion illustrates the breadth of possible dimensions of relevance by which digital tokens or their corresponding digital assets may be manipulated, indexed, controlled, created, enhanced, or otherwise managed.

The indexing engine 710 can also include a digital asset type determinator 714 and an indexing procedure selector 716. The digital asset type determinator 714 can determine a type of a digital asset based on, for instance, metadata, digital watermark data, a property, and/or a file extension of the digital asset. Based on the digital asset type and indexing procedure-digital asset type associations, the indexing procedure selector 716 can select the relevant indexing procedure(s) to apply for the indexing of the digital asset. Of course, a digital token can be associated with multiple digital asset types (e.g., text, images, video, audio, voice, etc.). In this case, the indexing procedure selector 716 can select multiple indexing procedures 712 for the indexing of the digital token. For example, each indexing procedure could be coupled to a data modality or coupled with the implementation of the corresponding recognition algorithm, or combinations thereof.

The distinguishing features 730 of a digital asset represent a set of features that can help to identify the digital asset (e.g., in the image case, this set can include edges, color histogram, and/or detected objects, etc.). The features can be recognizable to a human user and/or can be only machine recognizable (e.g., an embedding vector generated by a machine learning model, descriptors, digital features, etc.).

Figure 8:
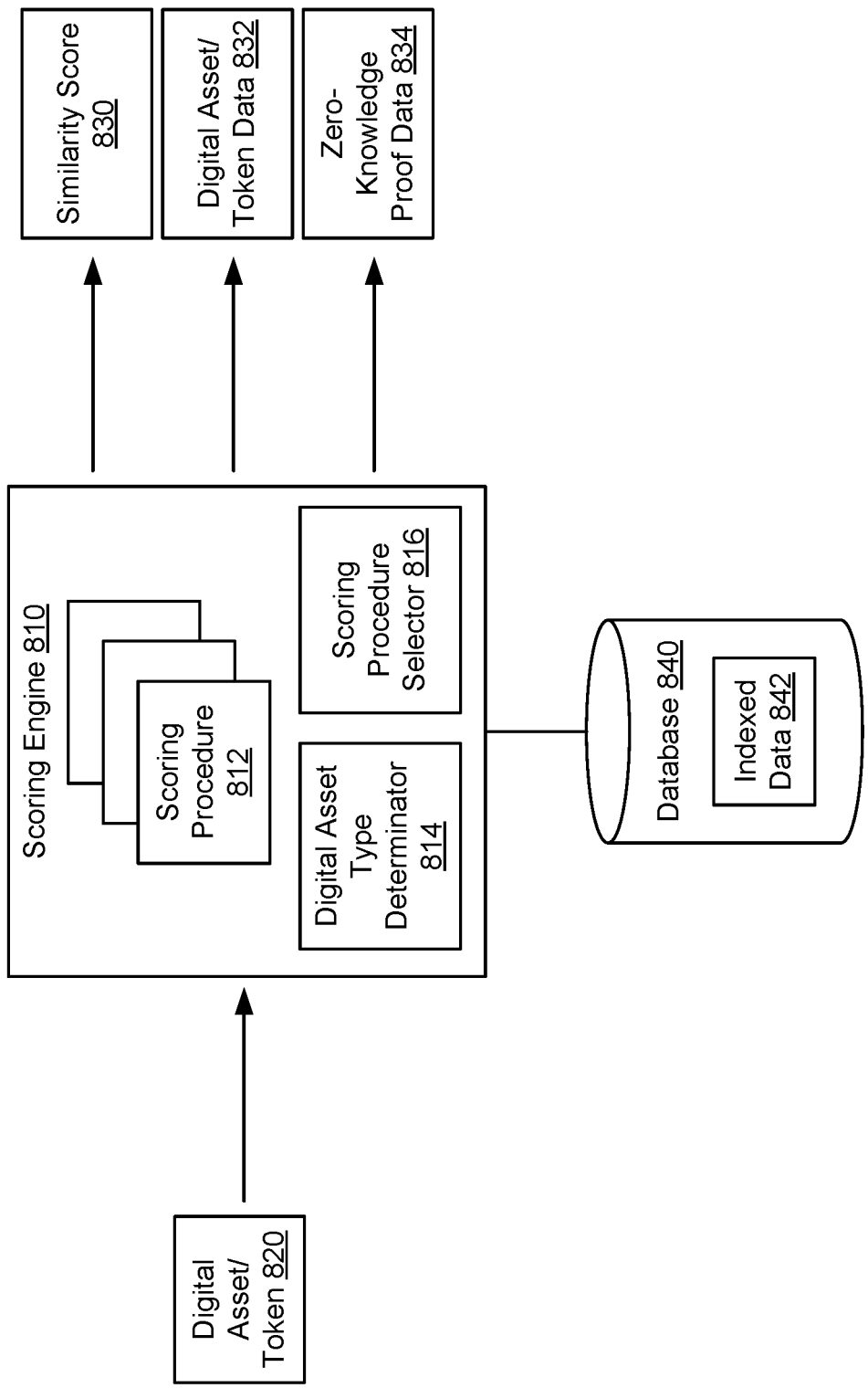
FIG. 8 illustrates an example of a scoring engine of a TMP, according to embodiments of the present disclosure.

FIG. 8 illustrates an example of a scoring engine 810 of a TMP, according to embodiments of the present disclosure. The scoring engine 810 can receive and process a digital asset and/or digital token 820 to generate, based on indexed data 842 stored in a database 840, a set of outputs about the digital asset and/or digital token 820. The set of outputs can include any or a combination of a similarity score 830, digital asset/digital token data 832, or zero-knowledge proof (ZKP) data 834. The similarity score 830 can indicate a similarity to one or more digital assets and/or digital tokens. The digital asset/digital token data 832 can identify such digital assets and/or digital tokens. The zero-knowledge proof (ZKP) data 834 may be used instead of the digital asset/digital token data 832 as a way to validate that similar digital assets and/or digital tokens exist without identifying them. Such techniques are advantageous when digital tokens may represent private data (e.g., healthcare data, financial data, military data, etc.) so that two individuals can compare digital tokens without revealing what they are, but have certainty the tokens exist and are in fact similar. Thus, the inventive subject matter is considered to include a ZKP protocols based on the similarity information generated from scoring engine 810 or other information related to the digital tokens or assets (e.g., privacy setting, security level, etc.).

In the interest of clarity of explanation, scoring of a digital asset is described herein next. The scoring is described as including a similarity score indicating a similarity to one or more other digital assets. Such digital assets may or may not be associated with digital tokens. Nonetheless, the scoring can be against digital tokens that may be associated with digital assets. The embodiments similarly and equivalently apply to the scoring of a digital token. The digital token can be scored against indexed data related to digital assets and/or digital tokens that may be associated with digital assets. In particular, the digital token can include or indicate a digital asset (e.g., by including its URL, pointer, file name, etc.). The digital token can also include other data (e.g., ownership data, transaction data, etc.). As such, scoring the digital token can include scoring the digital asset and, optionally, scoring the other data. The scoring of the other data can depend on its type or modality (e.g., text, image, audio, video, etc.) and can use the same scoring procedure(s) applicable to a digital asset of that type.

In an example, the scoring engine 810 includes multiple scoring procedures 812. Each indexing procedure 812 can be implemented as executable program code that represents a set of algorithms and can be associated with a type or modality of digital assets. Examples of the scoring procedures 812 include computation of a similarity between the representations of digital assets (e.g., between vectors or between features embedded in an embedding space, each representing a digital asset along one or more dimensions or modalities, etc.), machine learning algorithms, and the like. The similarity can be a distance measurement determining as be Euclidean value, a Hamming value, a vector projection, etc. Non-distance based measurements are also possible, such as a count of criteria that are satisfied, a frequency of a feature occurrence, a relevance or weight of a feature, etc. The similarity score 830 can also include or be associated with a confidence level, or a p-value. Other examples of the scoring procedures 812 exist and may not relate to a similarity measure between digital asset representations. Instead, such scoring procedures 812 can relate to the number of similar digital assets. For instance, assume that a digital asset is compared to indexed data and K similar digital assets are found that have features satisfying similarity criteria to the query token. In this case, an example scoring procedure 812 can generate a similarity score that is a function of K. Generally, the larger K is, the larger the similarity score becomes proportional to a number of similar assets found. More specifically, a similarity score 830 can be a quantified vector adjusted by the number K of similar digital assets. To illustrate, consider an example of N features. Each i feature of the N features is found $K_i$ number of times in other digital assets. A similarity vector of N dimensions can be defined (each dimension can correspond to a feature). Each dimension can be associated with an individual score, such as a feature frequency-inverse digital asset frequency (FF-IDAF), where the feature frequency corresponds to the number Ki specific for that dimension, and the inverse digital asset frequency corresponds to the total number of the other digital assets across all dimensions.

The similarity score 830 can be specific to one similar digital asset (e.g., an individual similarity score, etc.). For instance, say that K similar digital assets are determined, K similarity scores 830 are generated, each corresponding to one of the K similar digital assets. Alternatively, the similarity score 830 can be common to all similar digital assets (e.g., a group similarity score, etc.). In the case of K similar digital assets, the similarity score 830 can be a function of all the individual similarity scores (e.g., an average thereof or using a vector representation as described herein above, etc.).

Yet, further, similarity score 830 may be a measure of how many features, F, are similar between two or more digital tokens and/or assets. For example, consider a case where there exists an NFT having an image of a wizard. According to an implementation of an image analysis algorithm, say SIFT, the existing NFT may have about 1,000 SIFT descriptors, which is a typical number for a photograph. At a future time, someone wishes to create a new NFT having an image of a similar wizard. The new NFT may also have about 1,000 SIFT descriptors. However, the two sets are not necessarily similar nor identical. Thus, similarity score 803 may represent the number of descriptors, F, that are sufficiently close to each in the SIFT descriptor space and according to matching criteria. If F is large, then the two NFTs can be considered similar. Conversely, if F is small, then the two NFTs can be considered dissimilar. In either case, a corresponding smart contract may be invoked. Still, one should appreciate the final similarity score may depend on other factors beyond F. While this example leverages image analysis via SIFT, the inventive subject matter is not so limited and could use may other implementation of recognition algorithms or data modality analyses.

Further, the similarity score 830 can be single-valued or multi-valued depending on, for instance, the type of the digital asset and/or the indexing features. For instance, the digital asset is a music file. This music file can be represented along two dimensions: text data and audio data. The text can correspond to lyrics of the music file, whereas the audio data can correspond to the audio of the music file. In this case, the similarity score 830 can indicate text similarity and audio similarity (e.g., is multi-valued, etc.) or jointly the text similarity and audio similarity (e.g., is single-valued, etc.). Of course, text and audio are only two dimensions from multiple possible dimensions. For instance, in the case of an image, the dimensions can include color, edges, objects, textures, relative object distances, descriptors, and/or other usable and quantifiable features. Thus, similarity score 830 may have values for each dimension of relevance. Further, the final similarity determination may be made based on criteria defined according to the values or features for each individual dimension of relevance.

For a digital token, the similarity score 830 can also be based on the type of the digital tokens. For collection ledger digital tokens (e.g., per the ERC-1155 standard, etc.), composable ledger tokens (e.g., per the ERC-998 standard, etc.), expandable tokens, chained tokens the similarity score 830 can be adjusted to account the collective use of such digital tokens. For instance, a first digital token can have a first type indicating that it is unique (e.g., generated per the ERC-721 standard, etc.). A second digital token can have a second type indicating that it is not unique (e.g., generated by the ERC-1155 standard such that it is part of a collection, etc.).

The first digital token can be scored for similarity against the second digital token. Given the second type (e.g., the fact that the second digital token is part of a collection, etc.), the first digital token can be similarly matched to other digital tokens of the collection, which may drive its similarity score to be high (and its uniqueness to be low). However, the similarity scoring can be adjusted given the second type. In particular, a single similarity score can be generated for the collection. In other words, rather than counting each of the possibly matched digital tokens of the collection as part of the K total matched digital tokens, the entire collection is counted once, or the collection's core distinguishing features may be used.

A similarity score 830 of a digital token can be compared to an expected similarity score for a decision related to the digital token (e.g., to mint the digital token, to modify the underlying asset, to initiate a transfer, to burn the token, to initiate a legal action, etc.). Upper and lower bounds that may define a range for the expected similarity score may be used to authenticate a token's digital asset or flag the digital asset. This can be used for detecting fake data or information, faults or problems in objects (e.g., vehicles, networks, and other mechanical systems), problems in a patient, etc. The bounds and ranges, or other conditional requirements, may be based on a number of factors, such as time, location, event, etc. For example, a location could be used to detect modification or alterations in pictures of the location to detect fakes or prompt owners and creators to adjust some of the data (e.g., request the user to enter the correct data and time, the correct location, ask the user if the data was modified for censorship, etc.)

The digital asset/digital token data 832 can indicate similar digital assets exist. Each similar digital asset can be an asset having a similarity score that satisfies a set of criteria. The digital asset/digital token data 832 can rank the similar digital assets (e.g., in a descending order, etc.) depending on their similarity scores. In addition to identifying a similar digital asset, the digital asset/digital token data 832 can identify an author of the similar digital asset, an owner of the similar digital asset (e.g., in the case where the digital asset is associated with a digital token and the owner is different from the author, etc.), and/or metadata about the digital asset (e.g., timing and location of creating this digital asset and/or of creating the digital token associated therewith as applicable, etc.). The ZKP data 834 can validate that a similar digital asset exists without identifying it, that a digital token is associated therewith, and/or data related thereto (e.g., the author, the owner, etc.). The ZKP data 834 can be generated by the scoring engine 810 (or another component of the TMP) a ZKP procedure by which the TMP has secret information about the similar digital asset usable to prove that this similar digital asset exists without revealing additional information (beyond, for instance, the similarity score). An example of ZKP procedure could include using homomorphic encryption, possibly adapted from those techniques described in U.S. Pat. No. 11,050,720 "Homomorphic encryption in a data processing network environment, system and methods," the content of which is incorporated herein by reference in its entirety. Another example of ZKP procedures includes the use of elliptic curve cryptography (e.g., by the TMP and the requesting user device, etc.). Elliptic curve cryptography-based ZKP is described in "Elliptic curve based zero knowledge proofs and their applicability on resource constrained devices" to Chatzigiannakis et al., Jul. 8, 2011, arXiv: 1107.1626, the content of which is incorporated herein by reference in its entirety. In these and other examples, the similar digital asset can be associated with an account that has a public address and a private address (e.g., a set of keys that may be a public-private key pair, elliptic curve keys, etc.). For example, the keys may be generated based on key distinguishing features of a corresponding digital asset; a hash for example where the hash function generates the appropriate sized key(s). The TMP can receive unique information from a verifier operating a device, such as a user attempting an operation on the digital asset/digital token data 832 (e.g., to instantiate, mint a digital token, value, transfer ownership, etc.) and can generate protected information from the unique information based on the private address, such as by protecting the unique information with the relevant cryptographic key, generating a hash of the unique information and protecting the hash with the relevant cryptographic information, etc. This protected information can then be sent to the device that, in turn, can use the public address to retrieve the unique information or the hash, as the case may be, and determine that the retrieved information corresponds to the original unique information.

The scoring engine 810 can also include a digital asset type determinator 814 and a scoring procedure selector 816. The digital asset type determinator 814 can determine a type of a digital asset based on, for instance, metadata, a property, a file name, and/or a file extension of the digital asset. Based on the digital asset type and scoring procedure-digital asset type associations, the scoring procedure selector 816 can select the scoring indexing procedure(s) 812 to apply for the scoring of digital asset(s). For example, the input digital asset is indexed, by an indexing engine, to generate features thereof. A selected scoring procedure can compare some or all these features to the indexed data 842 (e.g., to features of other digital assets, etc.) to then generate a similarity score. Of course, a digital token can be associated with multiple digital asset types (e.g., text, images, video, audio, etc.). In this case, the scoring procedure selector 816 can select multiple scoring procedures 812 for scoring the digital token.

Many uses of a similarity score 830 are possible, beyond the triggering of a set of program codes (e.g., smart contracts, APIs, RPCs, etc.). One use is the valuation of a digital asset. For instance, referring to an NFT marketplace, a unique NFT may be desired and, thus, may have high value. Its similarity score 830 (which might be low indicating distinctiveness) can be used as a factor in the valuation. Other factors can be based on cryptocurrencies, market values of similar NFTs (adjusted by the similarity score 830). The similarity score 830 can also be used to generate a kick-back or royalty based on the NFT's potential in the marketplace according to an underlying smart contract. This valuation can be adjusted in real-time as the market evolves or new NFTs appear. The value can be increased if the entity that generated this digital asset took more risk up front and the potential proved to be high, possibly based on a royalty table, percentage, or other scale. Conversely, the value can be adjusted down if the risk was minimal or the potential provided to be low. The value of a royalty can be increased based on a similarity score. The adjustment can be set in a smart contract and can be logged in support of auditing. On the flip side, the similarity score 830 (e.g., when indicating distinctiveness, etc.) can be used as an evidence-based indication that the NFT is free from encumbrances to some degree so it can be newly minted or used. An entity can invest, through the TMP, in the potential of the NFT in the marketplace. The similarity score 830 (e.g., when indicating distinctiveness, etc.) can also indicate that the NFT or the underlying digital asset could be trademarked, can become a logo marketable to others for use, licenses, copyrighted, etc.

Figure 9:
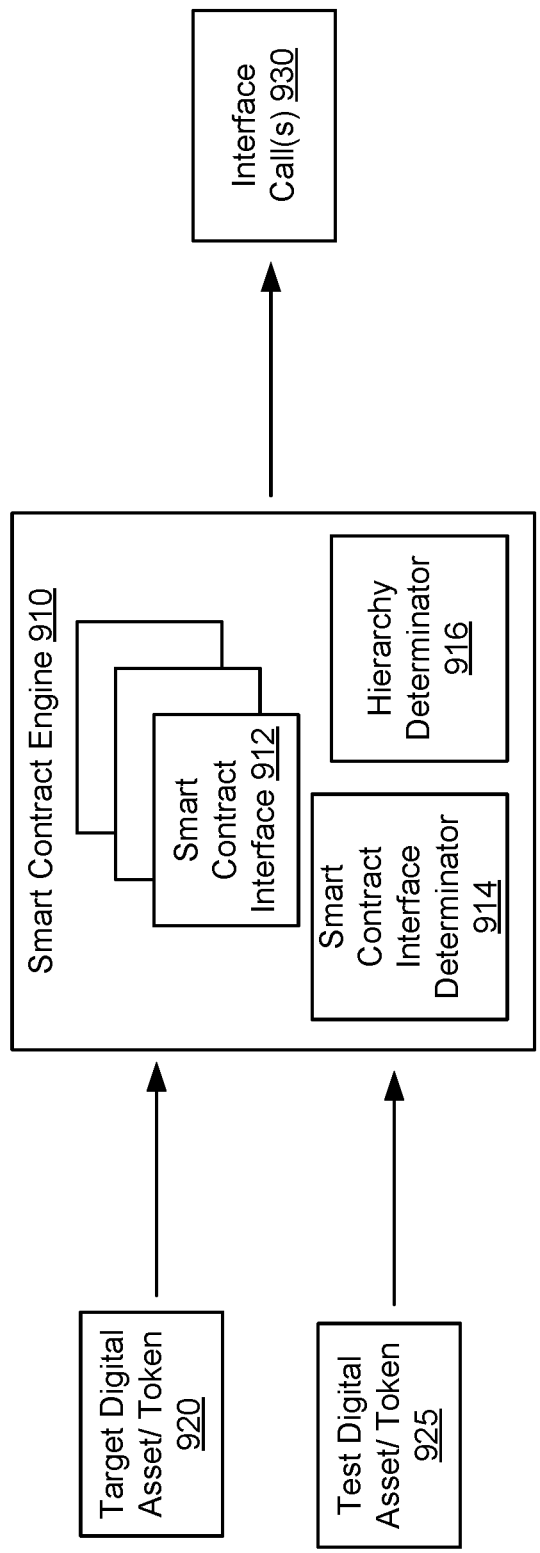
FIG. 9 illustrates an example of a smart contract engine of a TMP, according to embodiments of the present disclosure.

FIG. 9 illustrates an example of a smart contract engine 910 of a TMP, according to embodiments of the present disclosure. The smart contract engine 910 can receive and process a target digital asset and/or digital token 920 and/or a test digital asset and/or digital token 925 to make interface call(s) 930. One should appreciate the "test digital asset" represents a digital construct to be tested during use of the inventive subject matter as deployed in the field. The target digital asset and/or digital token 920 can be referred to as a first or new digital asset and/or a first or new digital token that is being processed via the TMP and for which the TMP may have generated a similarity score. The test digital asset and/or digital token 925 can be referred to as a second or existing digital asset and/or a second or existing digital token that the TMP has already indexed or a set of token instantiation criteria and has used to generate the similarity score. An interface call can be an API call to a program code (e.g., a smart contract in the NFT use case, etc.) that causes the execution of the program code. This interface call can indicate the target digital asset and/or digital token 920 and/or information related thereto (e.g., the author, owner, etc.), the test digital asset and/or digital token 925 and/or information related thereto (e.g., the owner, etc.), and/or the similarity score. The result of the execution can indicate how use of the target digital asset and/or digital token 920. Typically, test digital token 925 does not yet exist as a minted NFT, but may be converted to an NFT once similarity measures have been determined.

In the interest of clarity of explanation, the smart contract engine 910 is described in connection with a test digital asset associated with a program code (e.g., a smart contract, etc.). The test digital asset may be associated with a test digital token or may not be associated with the test digital token (e.g., by being associated with similar token, with token management platform, with an entity, etc.). If associated with a test digital token, this token can include the program code itself or a network address thereof by which the program code can be invoked. If unassociated with a test digital token, the test digital asset may include, in its metadata for instance, the program code itself or the network address where the program could be accessed. Alternatively, or additionally, the test digital asset may be authored or owned by an entity (e.g., a user, an agency, an organization, etc.) that has an account with the TMP and this account may be associated with a default program code (e.g., a default smart contract, a smart contract template to be fleshed out, etc.) to use in the absence of a digital token. The embodiments similarly and equivalently apply to a test digital token. Further, the embodiments similarly and equivalently apply to a target digital asset that may or may not be associated with a target digital token and/or to a target digital token. Smart contract management rules may exist and may govern which smart contract(s) API should be called. For example, known NFTs can be bound to existing smart contract. Available smart contracts may be indexed by descriptors/features/types of tokens/digital tokens, etc. where the system recommends a smart contract. If none are found, then the TMP can offer a default smart contract template to be created.

In an example, the smart contract engine 910 includes multiple smart contract interfaces 912 (or, more generally, program code interfaces). Each smart contract interface 912 can be implemented as an API to a corresponding program code or executable library. The smart contract engine 910 can also include a smart contract interface determination 914 to determine a set of smart contract interfaces 912 to use. For instance, given a test digital asset, the smart contract interface determination 914 can determine a particular smart contract interface 912 based on its metadata, pointers, URLs, and/or an account of the entity that authored or owns the test digital asset. The smart contract engine 910 can then make an interface call 930 (e.g., an API call, RESTful API, RPC, etc.) to the relevant program code by using the smart contract interface 912. This interface call 930 can indicate the test digital asset and/or, as applicable, a test digital token, a target digital asset, a target digital token, an author of the test digital asset, an owner of the test digital asset, an owner of the test digital token, an author of the target digital asset, an owner of the target digital asset, an owner of the target digital token, and/or a similarity score.

In certain situations, the smart contract interface determinator 914 can indicate, for a test digital asset or for a combination of two or more of a test digital asset, a test digital token, a target digital asset, and/or a target digital token, multiple smart contract interfaces 912. Interface calls 930 using such smart contract interfaces 912 can trigger the execution of multiple program codes, typically on or associated with a node of the corresponding notarized ledger infrastructure. The result of the program code executions can indicate different outcomes that control the use of the target digital asset and/or target digital token. For instance, the execution of one smart contract can allow the creation of an NFT for the target digital asset, whereas the execution of another smart contract can prohibit the NFT creation. To deal with such possible execution results, the smart contract engine 910 can include a hierarchy determinator 916.

The hierarchy determinator 916 can indicate a hierarchy of the execution results such as whether the execution result of one program code has a higher priority or trumps the execution result of another program code. Such hierarchy information can be pre-coded in the hierarchy determinator 916 as a set of rules. Additionally, or alternatively, each program code can include a priority and such priority can be indicated in the execution result and used by the hierarchy determinator 916. Priorities may be established based the nature of the digital assets, digital tokens, metadata, or other factors. For example, a controlling entity, possibly identified based on a digital watermark, may pay more for high priority service for their NFTs, in which case when ownership or provenance indicates an association with the entity, the NFTs are processed before lower priority NFTs. Still further, priority may be established based on target use cases; say healthcare NFTs are given high priority than gaming use cases. Priority processing may be achieved in numerous ways. In some embodiments, all higher priority tokens or assets may be processed before lower priority assets. In other embodiments, priority processing may be determined by time slices. Higher priority assets or tokens may have larger time slides, while lower priority items may have shorter time slides. Such an approach is considered advantageous because all priorities are processed to some degree. Said differently, lower priority items will not be blocked from processing. Still further, in some embodiments, higher priority items may be assigned to processing nodes with lower latency and/or high capacity, while lower priority items may be assigned to processing nodes that have higher latency. Still further, from a similarity score perspective, if cases where a similarity score indicates an asset or token could infringe another entity's rights, the infringing item might be given higher priority for full processing so that the infringed party can be informed or otherwise notified as soon as possible. Thus, the inventive subject matter is considered to include processing of digital tokens or their corresponding digital assets according to priorities established based on similarity scores, measures, or triggering criteria.

In an example, invoking a program code via a smart contract interface 912 can depend on a similarity score, a plurality of similarity scores, similarity criteria, etc. For instance, if a test digital asset is similar to a target digital asset and/or a target digital token, the program code of the test digital asset can be invoked depending on the similarity score. If the similarity score is larger (or lower) than a threshold score, or otherwise satisfies call triggering criteria, an interface call 930 is made. Further, multiple interface calls 930 can be made resulting in the use of the hierarchy determinator 916 as needed. The threshold score and/or the hierarchy can be set based on user input to the TMP and/or accounts at the TMP and/or can be included in the program codes.

A program code (e.g., a smart contract, etc.) can be created by the entity via the TMP. The program code can set parameters for using a digital asset and/or a digital token. The parameters can indicate permitted uses, type of use, number of uses, fair use exceptions, whether an authorization or management is needed prior to use including prior to minting an NFT, free use before royalties, royalties, a threshold score to trigger an action (e.g., to prohibit the minting, to trigger a legal action, to send notifications to users, etc.), features to use for similarity scoring (e.g., for an image, whether to use color histograms, object detection, edge detection, etc.), hierarchical information (e.g., the priority of the smart contract relative to another applicable smart contract, etc.), and/or other parameters that may impact the similarity scoring and/or actions that can be triggered based on a similarity score. The TMP can provide smart contract templates. User input can be received to customize a TMP contract for use with one or more digital assets and/or one or more digital tokens.

Additional functionalities of the TMP are possible. In an example, a voting or decentralized autonomous organization (DAO) function is possible. In particular, tokens can be can represent rights (e.g., voting stock, controlling interest, ownership, benefits, utility, etc.) or evaluated based on rights that are granted to the tokens via corresponding DAO smart contracts. Some of the rights relate to combining tokens for creating new rights and voting levels, addressing voting weights, voting frequency and voting weights, voting restriction based on number and types of tokens that an owner has (e.g., for controlling someone with influence taking control and encouraging diversity of NFTs and projects, etc.), etc. Thus, when one or more DAO tokens are processed by the TMP and a proper similarity score triggering criteria is satisfied, the corresponding DAO smart contracts (e.g., voting API, etc.) may be invoked. In additional to, or alternatively, a user interface may be instantiated to permit the user to select available actions (e.g., vote for a direction of the DAO, vote for board of directors, vote for gaming content, etc.), which may include invocation of specific DAO smart contract interface calls.

Another example functionality relates to API access for users and owners to the TMP. Some access can be account-based, platform-based, application-based, etc. Any third party platform, plug-in for tools, or systems (e.g., medical systems, vaccination record, medical record, education record, manufacturing (e.g., warranties, new real object with NTF tracking, etc.), supply chain tracking (e.g., food source tracking), etc.) may rely on API calls to access functionalities of the TMP.

Figure 10:
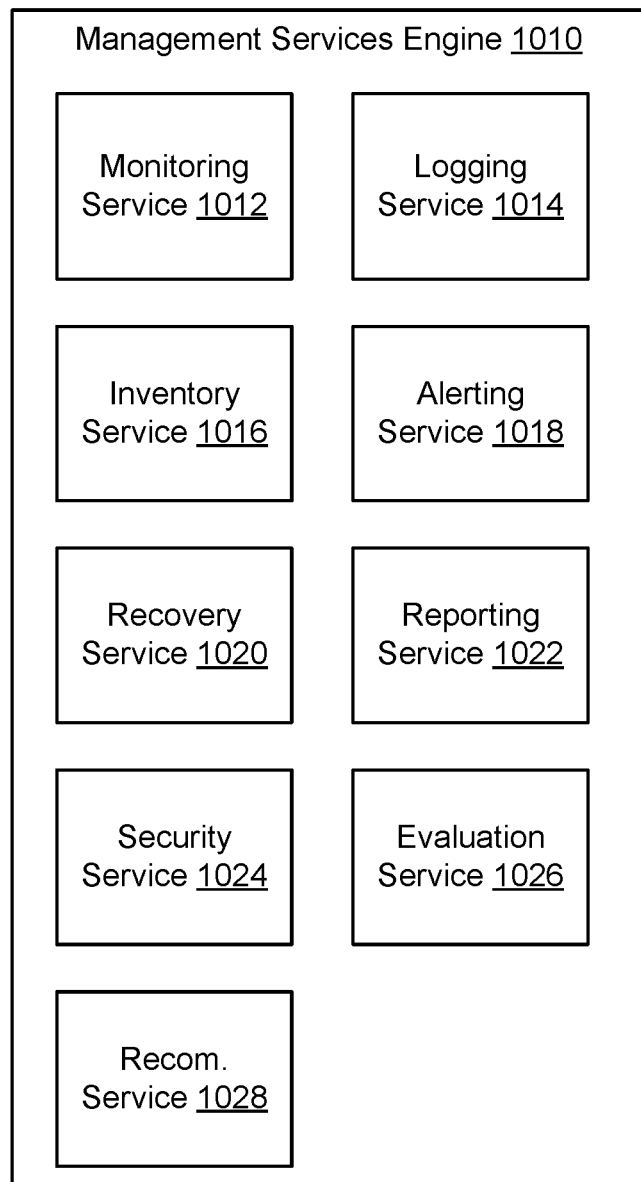
FIG. 10 illustrates an example of a management service engine of a TMP, according to embodiments of the present disclosure.

FIG. 10 illustrates an example of a management services engine 1010 of a TMP, according to embodiments of the present disclosure. Generally, the management services engine 1010 can manage the execution of a management service based on the execution result(s) of program codes (e.g., smart contracts, etc.). To do so, the management services engine 1010 can include multiple components, each of which can be implemented as executable program code that represents a set of algorithm implementations. These components provide different functionalities and include a monitoring service 1012, a logging service 1014, an inventory service 1016, an alerting service 1018, a recovery service 1020, a reporting service 1022, a security service 1024, an evaluation service 1026, and a recommendation service 1028. An account of a user (e.g., an owner of a digital token, such as a test digital token, etc.) at the TMP can include setting information to sign up and/or trigger the functionalities.

Many management services may leverage one or more networking monitoring protocols, possibly including SNMP via which the TMP can send or receive notifications. For example, OpenNMS (see URL opennms.org) provides open source tools for managing networking solutions. However, OpenNMS is also modular. Thus, the inventive subject matter includes providing digital token or digital asset management agents that are able to interface to the OpenNMS infrastructure. The agents may be installed on corresponding TMP processing nodes and interface with OpenNMS data collection frameworks. More specifically, the TMP can comprises "minions" (to use the OpenNMS parlance) to collect SNMP syslog information, which can then be transmitted to the OpenNMS core, which can then present the data via one or more dashboards. Therefore, the dashboards can present monitored event, alerts, notifications, inventory information, logs, recovery actions or options, reports, security measures, or other information triggered by similarity score analysis of the digital tokens or digital assets. This can be achieved by mapping NFT, smart contracts, notarized ledgers, or other objects and their corresponding events to SNMP MIBs or SNMP events which then can be logged and observed.

In an example, the monitoring service 1012 can monitor the use of a digital asset associated with a digital token of the user across multiple domains and/or platforms. The monitoring service 1012 can also monitor the use of a similar digital asset and/or a similar digital token across multiple domains and/or platforms. The similarity can be determined by a scoring engine. The monitoring service 1012 can also execute enforcement procedures included in or indicated by a program code (e.g., a smart contract, etc.). For instance, a violation of a smart contract (e.g., a violation of terms and conditions, verified illicit or illegal activity, counterfeiting, copyright violation, etc.) can cause the monitoring service 1012 to burn an NFT. Of course, other enforcement procedures can be invoked depending on the execution results of program codes and hierarchical controls of the execution results.

In another example of an enforcement procedure, a conflict resolution service may be implemented. This may be needed as burning or destroying another users'/owners' token can be in violation of the user's/owners' rights. And other actions may be needed such as notifying users and allowing users to go ahead and preform the action anyway with a warning. To illustrate, consider the following three scenarios. A company claims a very wide range of ownership of a certain video character (or any other type of asset). This range would be too far reaching and might not be fair for all other user wanting to mint anything similar to this asset. A photo may have a very high requirement for similarity excluding anything remotely close. This requirement would not allow any user to post from these events and reporters will have very similar photos of political speeches, natural disasters, sport events etc. On the other hand, a musical concert, or a magic show does not allow recording, and a user may attempt to post a video of this event where this posting may not be legal. In these scenarios, a conflict resolution service can be triggered.

The logging service 1014 can log any interaction with the digital token. For instance, an ownership transfer of the digital token can be recorded as a transaction in a block of a blockchain associated with the digital token. Other types of interactions can also be logged, such as a view of the digital token or the underlying digital asset (e.g., via a browse, a search functionality of the TMP, a generic search engine, etc.).

The inventory service 1016 can provide inventorying service to the account. For instance, this service 1016 can return query results indicating the number and the specific digital tokens associated with the account, account balances, and the like. Inventory can also be used to manage collections of tokens for example. In more specific embodiments, gaming for example, inventory service 1016 may maintain a listing, possibly in real-time, of the status or disposition of all gaming NFTs (e.g., characters, weapons, skins, etc.). Such services would be useful for game developers or publishers, and may be useful for game players to establish communities around their collectible assets.

The alerting service 1018 can send notifications to one or more user devices associated with the account and stores such notifications in the account. A notification can be triggered by the monitoring service 1012 (e.g., upon a detection of an unauthorized use, etc.), the logging service 1014 (e.g., a recorded interaction, etc.), or the inventory service 1016 (e.g., a balance update, etc.).

The recovery service 1020 can be configured to perform a recovery procedure for recovering a digital token. Different types of recovery are possible. In one example, if an unauthorized use is detected, a legal procedure can be invoked (e.g., by generating cease and desist letters, complaints, and/or notifying the relevant legal representatives, etc.). If an ownership transfer needs to happen, the recovery service 1020 can update the ownership (e.g., in a block of the relevant blockchain, block in a notarized ledger, etc.). The update can be for reverting or rolling back ownership should a fault be found. If a digital token was burned, the recovery service 102 can include generating a new digital token based on previously stored information about the burned digital token. In yet another example, rather than burning a digital token, different operations are possible. These operations can include notifying the owner or all relevant parties to flag that an action related to the digital token is needed, updating ownership of the digital token temporarily, attaching an additional token to the existing token (e.g., essentially encapsulating it avoiding changing any data or history of the existing token as not to affect its uses, etc.), etc. The type of the used operation(s) can vary based on the type of asset, cost of the action, and the use of the token.

The reporting service 1022 can provide reports about the account and/or digital tokens. For instance, the reports can include inventorying information (that may be pulled using the inventory service 1016), interaction information (that may be pulled using the logging service 1014), a status of a recovery procedure (that may be pulled using the recovery service 1020), and the like.

The security service 1024 can provide different layers for securing a digital token. For instance, the security service 1024 can use multi-factor authentication for accessing the account. Further, in case of off ledger technology, the security service 1024 can maintain a copy of a digital token (or other information about the digital token, such as a hash) to help against determining whether an unauthorized copy (e.g., a hack, a counterfeit, etc.) of the digital token exists or not. The copy can also be used as part of a recovery procedure (even in the case of using a blockchain technology). The security service 1024 can also provide digital watermark management by, for instance, including watermarks in a digital asset associated with the digital token and/or in the digital token. Security service 1024 may also be leveraged to encored privacy policies, possibly to support HIPAA compliance among others.

The security service 1024 may have locks. Such locks may be put in place by users, organizations, or companies for operations on tokens (e.g., selling, trading, transferring, minting, etc.). If these locks are in place and not removed prior to attempting an operation, the operation can be halted and the token maybe suspended and the owner and/or lock holder notified. This use of locks can support token rights. For instance, a company can own and assigns tokens to employees and contractors to preform work, get access to data, get access to events, etc. But the individuals may not have the rights to sell or trade the tokens. Different levels of token rights are possible.

The evaluation service 1026 can generate a value of a digital token (or a digital asset). As indicated herein above, the value can depend on the uniqueness of the digital token (or digital asset). The more unique (e.g., the smaller a similarity score of this digital token or digital asset to other ones, etc.), the higher the value can become. Further, the higher the volume of interactions with the digital token is (e.g., the more browsing or searching for it, etc.), the larger the value can become. The evaluation service 1026 can also identify and indicate a collection of digital tokens and/or digital assets depending on multiple factors, such as similarity scores, authorships, ownerships, etc. The evaluation service 1026 can also be used to determine if a digital asset is associated with a digital token (e.g., is indicated in an NFT, etc.). If unassociated, the evaluation service 1026 can recommend doing so depending on the uniqueness of the digital asset.

The recommendation service 1028 can provide recommendations to the account. The recommendations can relate to browsing, searching, or discovering digital tokens and/or digital assets that are not associated with the account. Such digital tokens and/or digital assets may, but need not be similar, to ones associated with the account. In certain situations, a digital token can have a public and a private version. Generally, the private version can include additional information relative to the public version. For instance, a public NFT can indicate that a digital asset by a particular author will be available at a certain date without necessarily indicating the digital asset itself. The private NFT can be made available on the certain date and can indicate the digital asset. In this way, the public NFT can advertise for the release of the private NFT. In certain other situations, the private version can be held in reserve or in escrow (e.g., not accessible unless to the owner or upon permission of the owner, etc.). The recommendation service 1028 can include the public version in its recommendations.

The recommendation service 1028 can suggest selling, auctioning, or exchanging tokens between different users that would benefit both users, not just additional purchases. Different use cases for such suggestions are possible. One illustrative use case is video games. For example, if one player's character is a human warrior and they acquire an ultra-rare wand, and another player's character a gnome mage acquired an ultra-rare two handed sword. Both players have very rare items that they cannot pair with their characters. The TMP could offer to put both players in touch to see if they would be interested in some kind of trade. This can be achieved through metadata or attribute namespaces, which can then be compared to trigger suggestions when a match is detected. For example, the gaming service could register one or more agents or listeners with the TMP. When the TMP detects a match, the TMP can then invoke the corresponding registered gaming agents.

As such, the digital management services engine 1010 may provide management services related to digital assets and digital tokens to an account. Such services can be provided as a dashboard, possibly via OpenNMS as discussed above, of the TMP such that the TMP is a centralized infrastructure for all sorts of executable actions pre, during, and post creation of a digital token.

The TMP can enable management of branded works by an agency (or any type of entity that has an account with the TMP). A brand can be protected with a digital token and can become a manageable object. The agency can receive a portion of revenue from the brand (e.g., via cryptocurrency updates to its account, etc.). Features of a trade dress or "look and feel" may be quantified or otherwise determined. The collection of such features may then be minted as an NFT. For example, a user interface trade dress might include distinguishing colors, lines, font, and curves. In such cases, the colors (e.g., RGB values, histograms, etc.), the edges (e.g., Canny edge descriptors, etc.), font name or shapes, and curves (i.e., edges) form the foundations of distinguishing features of the trade dress. An image of a new user interface can be submitted to the TMP, which can then determine if a corresponding token exists for the trade dress. This approach provides for the utility of ensuring user interfaces maintain consistency if the user is associated with the trade dress owner, or excluding use of the user interface if the user is not associated with the trade dress owner. Further, the user may be presented in information or suggestions on how to modify their user interface to better align with or differentiate from the existing trade dress NFT.

Agency's rights to digital token commissions can be time-based to ensure equity between author and agency. For instance, when an NFT is minted, ownership information or the agency and metadata stored in the NFT can indicate a time period during which proceeds of using the NFT can be allocated to the author, after which all proceeds can be allocated to the agency. The length of the time period can be changed. As such, the TMP can allow the agency to obtain a return on investment while binding nor binding the author to a specific time frame. Such parameters can be defined in a smart contract, or by parameters defined when the NFTs are created and then possibly passed to a smart contract, by using a sliding scale (potential value expected over time versus realized value over time).

The TMP can also recommend paths for auctions, investing, or otherwise generating value from digital tokens. For instance, the TMP can offer or sell options for a digital token, with a minimum sell process or a minimum resell price. This can be achieved by triggering recommendation paths based on the similarity score via one or more rules, lookup tables, or other techniques.

The TMP can manage a similarity gap between a new digital token and existing digital token, which can be used to form a quantified boundary around intangible assets (e.g., copyrights, art work, trade dress, patents, etc.). For instance, the new digital token may be matched to an existing digital token. When no management procedure has been defined for the new digital token (e.g., a value, a sale path, etc.), a management procedure of the existing digital token can be recommended or used. For example, implementations of recognition algorithms may present a closest match (e.g., tree search, KNN, etc.). That is, the closest match simply represents a digital token having the best score or satisfaction level of the similarity criteria. To be clear, the "closest match" does not have to be similar, it is simply the one that scores the best. The management procedures for the closet match (or matches) may be provided as recommendations to a user. The opposite is also true where a new token may fall within a quantified boundary of an existing digital token, in which case the new token may be restricted from instantiation or might be considered too close for infringement purposes.

The TMP can also suggest or recommend possible pairings of digital tokens together. For instance, if an agency is looking to acquire or license a digital token, similar digital tokens can be determined and recommended to be also acquired or licensed. The TMP can also enable communications between different authors and owners of digital tokens. Pairings may be determined from a review of common attributes in a namespace or ontology, possibly including brand names, character information, market segment information, or other types of classification data.

The TMP can also enable a community-based approach to valuating or scoring a digital token. For instance, referring to a sports event, the TMP can track the reaction of fans to the sports event over social media platform in real-time. The sports event can be captured in a video file and the video file can be minted as a digital token. The fan reaction can be used as a distinguishing feature and compared to previously recorded reactions of sports events. If similar, the valuation of the digital token can then be made similar to the valuation of another sports event (e.g., if the two sports events are unique, the value would be high, etc.). Alternatively, the minting of the digital token can depend on the fan reaction and the possible valuation. If valuable (e.g., the to-be-minted token is unique or similar to a rare sports event for which there was a large fanbase reaction, etc.), the TMP can mint the video file in near real-time and advertise the minted digital token via the social media platforms.

The TMP can also manage an account of an entity. For instance, the TMP may trigger or provide periodic reminders for maintenance fees (e.g., annuity fees, subscription fees, etc.) to keep a digital token alive or to, otherwise, burn it. Doing so can help increasing scarcity or rarity over time by, for instance, removing less valuable digital tokens. The TMP can also allow an owner to sell their tokens automatically before their maintenance fees are due, unless the owner otherwise specifies. These funds from the sales can be used to pay maintenance fees on other tokens that the owner wishes to keep, or be left as a crypto balance of a give currency in their wallet.

The TMP can also support trade secret (TS) management, or even management of other intellectual property (e.g., patents, trademarks, trade dress, copyrights, etc.). For instance, an NFT can be used as a digital token representing a trade secret. The NFT can include a hash of the trade secret information (e.g., of a source code, etc.) that represents the TS at a point in time of the life cycle of the trade secret information or source code. Additionally, or alternatively, the trade secret information can be protected with a public address (e.g., a public cryptographic key, etc.) of the trade secret owner's account. A homomorphic workspace may also or alternatively be used to verify a trade secret violation. For example, the trade secret can be stored in or represented by the homomorphic workspace. An NFT can be generated and used a key to unlock access to this workspace, possibly triggered by the satisfaction of similarity criteria or corresponding score.

The TMP can also support a context-based access to or ownership of a digital token. A context can be location, time, circumstances, etc. For instance, the ownership can be tied to the location (e.g., address, Google Plus Code, zip code, S2 cell, geofence area, etc.), time, circumstances, etc. of when the underlying digital access is created. Access can also be controlled via, for instance, any of these parameters. For instance, the digital token can have access rights tied to a location (e.g., where these rights can be defined in a smart contract, etc.). When an authorized user (e.g., the owner, etc.) is at that location (e.g., based on a user authentication via a user device followed by a determination of GPS location of the user device, etc.), only then the authorized user can view the digital token and/or the underlying digital asset. In such cases, NFTs (or other digital token) may be bound with corresponding location information (e.g., S2 cell identifiers, GPS coordinates, geo-fence identifier, zip code, Google Plus code, address, etc.).

The TMP can also the use of digital tokens for game assets. Such digital tokens can be made available to guild members (e.g., a guild or group owns an NFT, an affiliation owns the NFT, an eSport team owns the NFT, etc.). Such an approach provides several advantages. First, guild-owned assets may be temporarily assigned to guild members via smart contract, possibly in exchange for a guild lease fee (e.g., in game gold, etc.). If the guild member dies or the lease is up, the NFT can be reassigned back to the guild coffers or to a new member, possibly as an inheritance triggered manually or automatically via a game plug-in interfacing with the TMP and/or smart contracts. Second, a guild can generate a guild style that may be enforced when new NFTs are generated to ensure the new NFT, based on similarity to the style, adheres to the style. Of particular interest in this use cases, the style itself may be minted as an NFT. Thus, the inventive subject does not require the TMP to compare NFTs of the same type (e.g., image to image, sound to sound, etc.), but also supports comparing one NFT type (e.g., a weapon, a skin, etc.) another type (e.g., a style, a look and feel, etc.). The two disparate NFT types can still be compared because they have similar distinguishing characteristics. To be clear, as in this case, the distinguishing characteristics do not have to be inherent in the NFT's digital asset, but simply bound to the NFT. For example, a style NFT might comprises a collection or an N-tuple of distinguishing features stored as attribute-value pairs.

The TMP can also allow the creation a digital token for a utility-based function (e.g., the underlying digital asset is the utility function, etc.). Time sharing of the digital token can be supported via co-ownership, where a user can subscribe or lease the utility function by, for instance, co-owning the digital token for a period of time.

The TMP can also devaluate a digital token. For instance, the TWIT' can decrease its value (e.g., potentially to zero, etc.) in a marketplace. When devaluated, an entity associated with the digital token can be authorized to drop the digital token's management, or possibly causing the token to be burned through invoking the corresponding smart contract.

The TMP can manage ownership transfer of a digital based on death of a current owner. For instance, the TMP can receive user input indicating the death. The TMP can then request the identification of a new owner and update the digital token to reflect the new ownership. Until the new ownership information, the TMP can update the digital token or a status associated therewith to indicate that the ownership is in flux. More specifically, gaming digital tokens may be assigned ownership to groups of players (e.g., guilds, team mates, etc.) in addition to individual characters. Such an approach provides an advantage such that should a team member's character die, their equipment may revert back to another team member without loss to unknown third parties. Further, a "will and testament" service may be implemented in game systems according to a fee schedule to access such valuable services via smart contract invocation. Naturally, such inheritance services can be extended beyond game worlds and apply to real-world assets such as property, money, jewelry, or other estate assets.

The TMP can have instructions what to do with tokens upon an owner's death and can perform operations based on such instructions. The operation can be any or a combination of the following: transferring ownership of the tokens automatically to a new owner, donating the token, burning the tokens, selling the tokens and assigning the proceeds to a new owner or beneficiary, etc. Such transfers can be affected by use of bearer tokens or based on techniques adapted from U.S. co-owned patent application Pub. Ser. No. 17/590,291 to Witchey et al. titled "Token-Based Digital Private Data Exchange Systems, Methods, and Apparatus," filed Feb. 1, 2021, and referenced above. For example, one or more NFTs may be minted representing inheritance. An additional bearer token may be minted and granted to an attorney. Upon death, the attorney may activate the bearer token to gain access to the minted NFT inheritance tokens. The attorney may then transfer ownership of the inheritance tokens to the beneficiary.

A token can have a clause in its smart contract that may take priority or other directions, such as being returned the original creator of the token or the entity that created the asset, or even be donated to a museum for public display. This may be triggered based on a type of ownership, such as when the owner is a company that sets a trigger after a set amount of time, or the owner is an individual indicating an operation on the token after a set amount of time (e.g., 10 years, 20 year, 50 years, etc.). This operation can include no longer transferring, trading, or selling the token, but the owner gets to keep it till they pass away. At that point, returning the token is triggered.

The TMP described in the present disclosure supports multiple use cases. Herein below are illustrative non-limiting use cases.

In one use case, an NFT can be an anchor point for content. The content can be video game content. For instance, the NFT can be a dungeon tile (see US 2021/0052976; e.g., areas for games, virtual racetracks sections, components for game levels, dungeon pieces, etc.), virtual and/or real-world game content, an artificial intelligence (AI) code for a game play, training data for AI system, or a game play through a video game (e.g., a speed run, etc.). The use of the NFT can support a leaderboard. Speed run of the video game can be recorded as an event and this event can be reported to the TMP (e.g., in real-time, etc.). At the moment of completion, the TMP can mint an NFT for the speed run and associate with the video game player (e.g., the owner of this NFT, etc.). Such NFTs may be managed by their distinguishing features, which may also be encoded on physical assets such as a trading card, a toy, or other item. In such cases, an image of the physical asset can be transmitted to the TMP, which then triggers processing (e.g., similarity checks, smart contract invocation, validation or authentication services, etc.).

Non-video game uses are also possible. For instance, the TMP enables commercial use, where an NFT can represent a coupon, a prize, an offering, a membership, a promotion, proof of purchase, etc. owned by an entity and redeemable via a ledger. In a healthcare context, the TMP can mint an NFT for a data owner (e.g., a patient, etc.), where the NFT represents medical data (e.g., an alcohol level, a drug test, an X-ray, medical history, sensor data, etc.), contextual information about the device (e.g., when was the device serviced, when the device was calibrated, etc.) that collected the data, etc. The smart contract can govern the privacy management of such data. This data being minted for a patient can be provided directly to the TMP from the devices capturing the data, not allowing any manipulation to the data. In addition, this data can include other information provided by doctors and other medical staff and attached to the token but preserving the original token. The contextual information can be useful for validating data when multiple devices are not in agreement. For example, if a heart monitoring device and an EKG device generate conflicting or not similar enough data, a determination can be made as to the root cause and such determination can be captured in the token (e.g., a re-calibration of one of the two devices is needed, etc.).

Event management is also supported. For instance, minting of sports events, fund raiser, memberships, and the likes is possible where an NFT represents such events collectively or individually. As a more specific example, an NFT could be minted to commemorate a person's graduation or an athlete's gold medal win. Consider a case of a sporting event. During the event, the TMP can, possibly via user instructions or automatically, compile moments in time via video snap shots. A user or other entity may curate the moments in time into a set of digital tokens (e.g., NFTs, collectibles, etc.). During or after the event, the digital tokens may be minted just-in-time and release to the public, especially individuals already in the sporting arena. Thus, using location data as a distinguishing feature can trigger smart contracts to provide the just-in-time or real-time event tokens to co-located individuals.

In other contexts, given the nature of the NFT, the TMP can enable minting of law enforcement evidence as NFTs. For instance, an NFT can represent forensics, drug tests, surveillance (part of suspect tracking) and associates with a law enforcement agency or individual officer. Such an approach is advantageous because the minting of such NFTs may occur on immutable ledgers which lends credence to the law enforcement evidence. All sensors, cameras, radars can be connected to generate NFTs including device locations, when a device is turned on/off/reset and more. All speed logs of vehicles, radar guns, GPS location, and more can be save to different NFTs giving law enforcement all the tools and indisputable evidence as proof including all location data off all parties.

The TMP can also enable NFTs for automotive products and/or other types of products. For instance, an NFT can represent a warranty and/or can be used for warranty tracking. Tracked uses can be recorded (e.g., in blocks of a blockchain, data structures in ledgers, etc.) and audited for anomalous use detection. Further, based on similarity measures, counterfeit products may be identified or flagged.

Legal agreements can also be minted a NFTs. For instance, the TMP supports an ERC-996 standard-based minting. In this use case, each sub-token represents an obligation. Such tokens can be exchanged when an obligation is met. The collection of tokens can show an overall compliance to the legal agreement through invocation of corresponding APIs in the NFT smart contracts.

The TMP can also support a product state management. For instance, a product can be a computer, and the product state can be a program state. The program state or life cycle can be minted as an NFT. Such abilities may be achieved through adapted the statement management capabilities as discussed in U.S. Pat. No. 10,923,215, to Witchey et al. titled "Sample Tracking via Sample Tracking Chains, Systems, and Methods," filed on Sep. 19, 2017. Rather than tracking a biological sample state during processing, one can track a program state, development stage, or snap shot as a function of time, for example. Further such techniques can be augmented by the disclosed techniques by leveraging similarity measures. One state may likely be very similar to the next state, but minor differences. If the minor difference aligns with expectations (i.e., satisfying state change criteria), product production or management may move to the next state.

The TMP also supports version controls. For instance, each version corresponds to a code release and can be minted as an NFT. The collection of NFTs provides an audit trail. Also, a program code can be sectioned into sub-codes. Each sub-code can be minted as an NFT. These techniques may be integrated into version control software (e.g., CVS, Subversion, Perforce, etc.) to track progress of the code, to provide for copyright protection, or for other reasons. Further, in some embodiments, if the similarity criteria indicates that differences between releases or version is too great (i.e., similarity score(s) indicate lack of similarity to some level), then additional regression tests may be triggered to ensure the code maintains stability.

The TMP can be used for network administrations. For instance, an access control list and/or a set of permissions to access a set of resources and/or a set of subnets of the network can be minted as an NFT, and the owner thereof can be set as a network administrator. Further anomalous behavior can be minted as NFT, which can then be used to compare to known problems or event known network attack signatures. For example, known attacks may be quantified via vectors of behaviors as described in U.S. Pat. No. 8,683,591 to Wittenschlaeger at al. titled "Vector-Based Anomaly Detection," filed Feb. 9, 2011. Such vectors can then be minted as NFTs and can be used for similarity comparison against new observed behaviors.

The TMP can support mystery NFTs. A mystery NFT can be one that is not available to the public but that is indicated to the public as being available to the public as a future data. The TMP can mint the mystery NFT as a private NFT and the publication information as a public NFT. Alternatively, the TMP can mint the mystery NFT and advertises its availability date. The mystery NFT can be any of the above, including program code, artwork, music, patent, a video game code, etc.

The TMP can also mint icons, trademarks, tattoos, symbols, emojis, emotions or personalized emoticons represented by NFTs. Such items may be best characterized by digital edge descriptors, for example.

In athletics, the TMP can support of event data related to a sports event. Such event data can be a game play captured via video and/or audio, can be a game summary, can be fanbase comments and/or reactions, and the like. Returning to the example of "just-in-time" minting of NFTs, when the TMP observes a recognized action via implementations of recognition algorithms, the corresponding video clip may be minted as an NFT or other digital tokens. Techniques that may be adapted for recognizing actions in video are disclosed in U.S. Pat. No. 10,572,724 to Wnuk et al. titled "Activity Recognition Systems and Methods," filed Feb. 25, 2019.

In science, the TMP can support the science community to mint NFTs for drug development or a drug itself and attribute the work to particular scientist(s) and/or organization. This minting can extend to each step of data taking or experimental step and even to a process or a patent claim. Such minted NFT provide utility by way of comparison to similar drugs or identification of similar experimental data, or even identifying existing rights to the drug via patent rights.

At a personal use level, the TMP can support the minting of a person's diary entries as NFTs, or the entire diary as an NFT. In certain uses cases, an agency can be used to chronicle a person's life. The agency becomes hub of a social media platform around people's moments. NFT(s) can be bound to a specific object(s). Such approaches can be offered to social media influencers to auto create NFTs and/or be integrates with different platforms (e.g., social media platforms, gaming platforms, streaming platforms, sports platforms, etc.). Further, the social media platforms (e.g., TikTok, Facebook, Instagram, Pintrest, SnapChat, etc.) can leverage the disclosed techniques to identify similar minted NFTs and making recommendations or suggestions regarding potential new contacts.

The TMP can also support studio production of audio and/or visual work (e.g., movies, etc.). During production, assets of the production (e.g., a graphics generated for a scene, etc.) can be minted as an NFT. This graphic can be used in other movie/asset productions. Different features or properties related to a product asset can also be minted including, for example, art, camera setting, camera software filters, augmented reality tracking data of the camera, objects on stage, and more.

Figure 11:
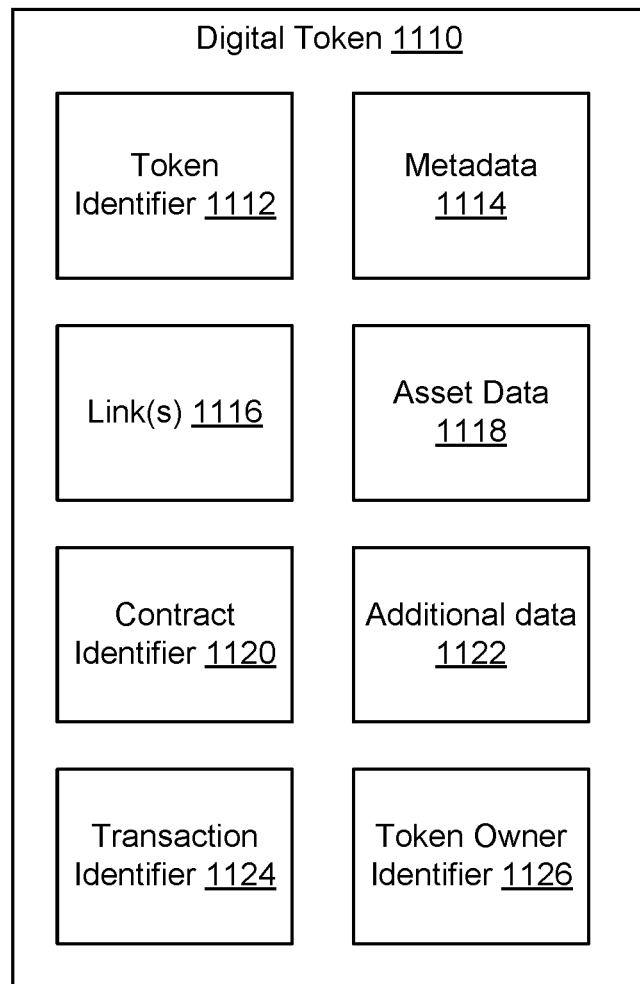
FIG. 11 illustrates an example of a digital token, according to embodiments of the present disclosure.

FIG. 11 illustrates an example of a digital token 1110, according to embodiments of the present disclosure. The digital token 1110 can be considered a data structure that at least associates a digital asset with ownership information and can be governed by a program code. With respect to the Ethereum blockchain, the program code can be a set of programs (i.e., software instructions) referred to as smart contracts that can be written in the smart contract language Solidity (see URL soliditylang.org). The smart contracts can execute of Ethereum virtual machine (EVM) computing nodes. Further, many existing smart contract programs, including NFT smart contracts, are available for use or modification from OpenZepplin (see URL openzeppelin.com/contracts and github.com/OpenZeppelin/openzeppelin-contracts).

In some embodiments, the digital token 1110 is a manifestation of interactions with a smart contract as recorded or chronicled on a notarized ledger as discussed above. Typically, interactions comprise transactions that are then encoded within the notarized ledger. The digital token 1110, for example, can comprise an NFT that possibly adheres to the Ethereum NFT standard ERC-721 (see URL eips.ethereum.org/EIPS/eip-721), which defines a standardized API for tracking or transferring NFTs. More specifically, when the digital token 1110 is or comprises an NFT, then the digital token 1110 represents a non-fungible right to access the corresponding private data values.

Still, the digital token 1110 could comprise or be a part of a multi-token set representing one or more rights. In such cases, more than one the digital token 1110 could be minted to provide rights to more than one entity. An acceptable standard for multi-token sets includes the Ethereum multi-token standard ERC-1155 (see URL eips.ethereum.org/EIPS/eip-1155). Yet further, the digital token 1110 could comprise multiple sub-tokens or even part of a supra-token. Said differently, the digital token 1110 could be a token that itself is made of other tokens or the digital token 1110 could be an individual token combined with other to give rise to a new token. Each compound token and its individual component tokens could be NFTs. Ethereum Composable Non-Fungible Token Standard ERC-998 (see URL eips.ethereum.org/EIPS/eip-998) represents a possible composable token structure standard.

One familiar with Ethereum might wonder about use of a fungible token, possibly based on ERC-20 (see URL ethereum.org/en/developers/docs/standards/tokens/erc-20). ERC-20 outlines an interface through which one can create a set of tokens that are essentially indistinguishable from each other. Examples include skill points in a game, currency, a counter, or other types of fungible tokens. While it is technically possible to create a version of the digital token 1110 that operates as a basis for fungible tokens, it is considered less preferable. One reason is an NFT or tokens having limited fungibility provide for high fidelity management of access rights. Each time a token owner obtains an NFT or uses the NFT, the corresponding transaction is recorded on the notarized ledger thereby creating an audit trail of who does what and when with the data. Fungible tokens are less trackable because it is not possible to tell the difference between one token and another. However, fungible tokens may operate as a currency within the TMP ecosystem. Disclosed services could be performed in exchange for a fee paid in the form of a corresponding fungible token.

Although the digital token 1110 is illustrated as a single data construct, the digital token 1110 is typically deployed as a token within the context of a smart contract. As such, the digital token 1110 may be recorded on a notarized ledger as a transaction that adheres to the protocols, requirements, or standards of the target ledger technology and the smart contract as alluded to above. For example, the digital token 1110 may be recorded on the Ethereum blockchain as a non-fungible token following an ERC-721 standard compliant smart contract interface. In which case, when the digital token 1110 is minted (i.e., a minting transaction) as an NFT, the transaction of minting of the NFT is recorded on the notarized ledger rather than the token itself. Further, when such NFTs are transferred to a new owner, the transaction of the transfer is recorded on the notarized ledger. The purpose of recording the transaction in the ledger rather than storing the actual token on the ledger is to reduce the overall storage burden of the notarized ledger on the various participating nodes (e.g., virtual machines, computers, etc.) in the ledger. Still, it is possible to store the actual token data on the notarized ledger, but such storage incurs additional costs (e.g., transaction fees, etc.) and additional storage burden. Typically, the token data itself would be stored off ledger, on a web server, cloud-based system, or a remote file system for example. In such cases when the NFT transaction is recorded, the transaction may include a link such as URI, URL, hash address, or other link that points to where the token data resides on the network.

From an implementation perspective, the digital token 1110 can be instantiated or otherwise created as a standalone data object. In some embodiments, the digital token 1110 could be built according to one or more object-oriented class definitions, possibly in binary format in memory. Still, in more preferred embodiments, the digital token 1110 can be serialized via a markup language so that the content of the digital token 1110 can be digitally stored, transmitted, processed, or otherwise managed. For example, the digital token 1110 can be created using XML, JSON, YMAL, or other type of markup language to encode the various features of the digital token 1110. Thus, the digital token 1110 can comprise a set of hierarchically organized sets of data for ease of reading or processing.

The digital token 1110 is illustrated as having many features to support management via a corresponding notarized ledger as well as to support the above described functionalities. Several features include a token identifier 1112, a token owner identifier 1126, and possibly token link 1116. These specific features aid in managing the digital token 1110 on the corresponding notarized ledger. One should appreciate that some of these features may change with time. For example, the token owner identifier 1126 could change as a token owner transfers ownership of the digital token 1110 to another owner.

The token identifier 1112 typically is a data value or object that identifies a specific digital token 1110 on the target notarized ledger. In some embodiments, the token identifier 1112 comprises a unique identifier (e.g., GUID, UUID, URI, hash, SHA-256 hash, Keccak-256 hash, address, etc.), which may be a single value (e.g., a hash, a number, etc.) or multi-valued (e.g., JSON data set, etc.). However, it is also possible the token identifier 1112 could comprises other values as required or desired by the minter of the token (e.g., a name, a number, a place, etc.). For example, a data owner could mint successive tokens simply using sequential token identifiers of 1, 2, 3, 4, and so on. As a more concrete example, consider a scenario where a hospital wishes to provide access to private data in exchange for a fee. Each the digital token 1110 they mint could be based on the hospital's owner NFT smart contract. Each time a digital token 1110 is minted as an NFT, the token identifier can be incremented by 1. The digital token 1110 would be identified by the smart contract name (e.g., the hospital's name; see smart contract engine 216, etc.) and incremented token identifier. For the purposes of this discussion, the reader may assume the token identifier 1112 comprises a unique value so that the digital token 1110 may be distinguished from other tokens on the ledger. Still, the reader should be aware that in some embodiments the token identifier 1112 could be used to represent a token set (e.g., an ERC-998 token, ERC-1155 token, etc.).

The token identifier 1112 could be generated algorithmically based on the content of the private data or other data associated with the digital token 1110. For example, the token identifier 1112 could be generated via execution of an implementation of a hash algorithm (e.g., SHA256, Keccek-256, MD5, etc.) on various data of the digital token 1110 (e.g., such as a hash of the underlying asset and ownership information, etc.). This approach is considered advantageous because the resulting hash unifies the digital asset. Such hashes can then be used at a future date during an audit or as a method of verifying the ownership of the underlying asset.

In a somewhat similar vein, the token owner identifier 1126 is a data value that specifically, and preferably uniquely, identifies the current token owner of the digital token 1110. When the digital token 1110 is transferred to a new owner, a corresponding transaction is recorded on the ledger with the updated the token owner identifier 1126. Thus, the ledger chronicles the chain of custody of the digital token 1110 from one transaction to another. For the Ethereum blockchain, a token owner identifier 1126 would comprise an address of the token owner, which typically is the last or least significant 20 bytes of a hash (e.g., Keccak-256, etc.) of the public key of the new token owner. In many embodiments, the token identifier 1112 and the token owner identifier 1126 form a unique pair that represents the token, which can then be found on the corresponding notarized ledger. Thus, the ledger can also chronicle a chain of custody of the private data.

The digital token 1110 can be considered the product of a smart contract (e.g., Ethereum Solidity contract, Solana Token Program, etc.). The digital token 1110 may also include information related to the corresponding smart contract. Such information is represented by contract identifier 1120. The contract identifier 1120 enables the TMP to call back into the specific smart contract interfaces. While the contract identifier 1120 typically is based on an address, an Ethereum contract address for example, it is also contemplated that the contract identifier 1120 could also be other forms of addresses including a URL, URI, DOI, IPv4, IPv6, network addresses, internal APIs, or other types of address. An especially interesting the contract identifier 1120 can also comprises an HOI. Further, the contract identifier 1120 can include or can point to additional information regarding the corresponding contract under which the digital token 1110 is instantiated. For example, the prefix of a HOI could comprise the smart contract address while the suffix might point to a corresponding block or even to a corresponding API. Additionally, or alternatively to including contract identifier 1120, the digital token 1110 can include some or all of the data objects of a smart contract.

Asset data 1118 and metadata 1114 can also be included in the digital token. The asset data 1118 can include or indicate one or more digital assets and/or one or more other digital tokens. The metadata 1114 can indicate various properties of the underlying digital asset(s), such as its time and/or location of creation, the used tool, the used account, etc. The metadata 1114 can also include a batch identifier to indicate the digital token 1110 is a member of a larger group of tokens. For example, a data owner may wish to make a collection of digital assets available to multiple parties of interest; collectible cards or game items for example. In such cases, the digital token 1110 might be a member of a batch of tokens that include a token for each part. In such embodiments, one or more of batch identifier may be used for multi-token sets that may adhere to ERC-1155. The batch identifier may be considered optional in support of larger token management. For example, the batch identifier could comprise the name of the type of tokens, the name of an entity making the tokens, a sequence number indicating the request being serviced, or other types of identifiers. In a similar vein, the batch identifier may also represent a composable token according to ERC-998. Said in a different way, the batch identifier may include a root identifier that can be used for the set of individual tokens that compose the digital token 1110.

Additional data 1122 can also be in the digital token 1110. For example, the additional data 1122 can include parameters that control execution of certain aspects of a smart contract. Such parameters can indicate a time frame for royalty-free use, number of uses, authorized users, permitted uses, and the like.

A transaction identifier 1124 can also be included in the digital token 1110 and represents an identifier associated with any transactions associated with the digital token 1110. Typically, such identifiers would likely be stored on the ledger and may be a hash value or derived from a hash value associated with the digital token 1110 or a corresponding block in which the digital token 1110 transaction resides. For example, the transaction identifier 1124 can could comprise a ledger block identifier portion and a specific transaction identifier portion within the block.

The link(s) 1116 may also be associated with the digital token 1110. The link(s) 1116 also provides a mechanism by which the digital token 1110 may be coupled with external data. Typically, say for ERC-721 NFTs on the Ethereum blockchain infrastructure for example, the link(s) 1116 may be stored on the ledger itself along with or in the corresponding transaction where the link comprises a URI (e.g., URL, HOI, DOI, etc.). Thus, the transaction as recorded can point to other data for example stored off the ledger. In more preferred embodiments, the link(s) 1116 is a link to a more permanent or secured network storage device where additional data (e.g., audio, video, executables, games, etc.) can be found and accessed upon authentication.

FIG. 12 illustrates an example of a flow implemented by a TMP for managing at least an aspect of a digital token lifecycle, according to embodiments of the present disclosure. The flow includes a set of operations that may be implemented as part of program code that is stored in at least one computer readable memory of the TMP and executed by at least one processor of the TMP. The TMP represents a digital token management system. Although the operations are illustrated in a particular order, the order can be changed and/or some of the operations can be omitted. Some of the operations maybe executed multiple times and, in any order, such as in the case of referencing smart contracts, a token made up of more than one token, etc. In an example, the TMP includes or has access to a digital token database (e.g., the database 120 of FIG. 1, etc.) storing indexed information related to digital tokens including distinguishing features of the digital tokens. The digital tokens are at least partially indexed by the distinguishing features. Different database and/or storage technologies are possible including ledger, IPFS; look-up tables, hash tables, SQL, and/or search tree (e.g., KNN, etc.) technologies.

In an example, the flow includes operation 1202, where the TMP receives a test digital token and stores the test digital token in the at least one computer readable memory. The test digital token represents a digital token that is being processed for similarity reasons. In another example, rather than receiving the test digital token, a test digital asset may also or alternatively be received.

In an example, the flow includes operation 1204, where the TMP generates a set of token distinguishing features via execution of a set of recognition algorithm implementations on the test digital token. This set of recognition algorithm implementations can depend on the type of the test digital token (and/or the test digital asset) and can be implemented by an indexing engine of the TMP, as described in FIG. 7.

In an example, the flow includes operation 1206, where the TMP obtains a token result set via querying the digital token database based on the set of token distinguishing features. For instance, the TMP generates a query using the distinguishing features and sends this query to the digital token database. The token result can identify matched target digital tokens (and/or, similarly, target digital assets). The query itself can include the distinguishing features or features derived therefrom. The token result could indicate zero or more tokens. A NULL token result indicates that the test digital token is unique.

In an example, the flow includes operation 1208, where the TMP derives at least one token similarity score based on the token result set and the set of distinguishing features. When the token result is a null, the similarity score can just be "0" or indicate that no similar target digital asset and/or target digital token is found. The meaning of the similarity score can be defined as desired; thus, a 0 could be defined as least similar or most similar. The similarity comparison and similarity scoring can be implemented by a scoring engine of the TMP as described in FIG. 8. For example, if Euclidean distance is used as a similarity score, then the closer the score is to 0 would indicate two tokens are similar (i.e., they are close together in the similarity space) and the further from 0 would indicate the two tokens are dissimilar (i.e., far apart in the similarity space).

In an example, the flow includes operation 1210, where the TMP invokes a smart contract interface associated to the test digital token and associated with a notarized ledger based on the at least one token similarity score. For instance, a target digital asset and/or a target digital token are determined to be similar to the test digital token (and/or the test digital asset). The relevant smart contract(s) is identified and an API call thereto is made. Such functionalities can be implemented by a smart contract engine of the TMP as described in FIG. 9.

In an example, the flow includes operation 1212, where the TMP facilitates a management action. For instance, depending on the execution result of a smart contract and, possibly, a hierarchy between the execution results of multiple smart contracts, the test digital token can be recorded (or if a test digital asset is indicated, the test digital token can be minted), burned, published, etc. Such functionalities can be implemented by a management services engine of the TMP as described in FIG. 10.

The digital token database comprises at least in part one of the following: a cloud database, a notarized ledger, a blockchain, a hash graph, a server, and a distributed file system. The digital token database may, but need not, actually store the test digital token itself. Instead, it may reference the digital token via an address or an identifier.

The set of recognition or feature detection algorithm implementations comprise implementations of one or more of the following: image recognition algorithms, audio recognition algorithms, video recognition algorithms, data recognition algorithms, edge detection algorithm, machine learning algorithms, text recognition algorithms, and the like.

The set of token distinguishing features comprises features related to at least two different modalities. For example, set of token distinguishing features comprises features related to at least three different modalities such as text, audio, and graphics, or time, location, and temperature.

The set of token distinguishing features comprises at least one of the following: a time, an absolute time, a relative time, a date, a location, a position, an orientation, a user attribute, an owner attributes, an object property, descriptors, metadata, digital watermarks, a smart contract that created the token, and/or other attributes as described herein above.

The token result set can comprise zero digital tokens. This result indicates that there is nothing indexed based on features indicating the token is new or not similar to known tokens. In this case, the at least one token similarity score represents there are no digital tokens similar to the test digital token in the digital token database. For instance, the similarity score could be "0," NULL, NaN (i.e., Not a Number), or just that no result, outside thresholds, satisfies similarity criteria.

The at least one token similarity score comprises at least one of the following: a Euclidean distance value, a Hamming distance value, a multi-valued score, a single value score, an average, a standard deviation, a confidence level, a p-value, a number of criterion satisfied, and/or a multi-dimensional vector, or other metrics described herein. For example, the similarity score can be multi-valued in an embodiment where each individual criterion in similarity criteria can be measured. In a simple case, individual criteria might have a corresponding value of 1 to represent TRUE or 0 to represent FALSE. Then, the similarity score could be a vector comprising the individual criterion's values. In addition to or alternatively, each criterion might have other values including text (e.g., "TRUE", "FALSE", "YES", "NO", etc.), real numbers, integer numbers, or other digital values. This approach is advantageous because it provides for high fidelity mapping from conducting similarity operations to determining which smart contracts or other types of program code to invoke. For example, each criterion or set of criterions might trigger invocation of specific APIs. Thus, a vector of criterion satisfaction values could also comprise pointers for each member of the vector to the corresponding APIs, pointers for sets of members to the APIs, or other combination.

The test digital token comprises a non-fungible token or its corresponding digital assets. Alternatively, the test digital token is a member of a digital token set. For instance, the digital token set comprises a limited-edition token set. One should appreciate, the digital token could be distinct from its corresponding digital assets or could comprise the corresponding digital assets.

In an example, the test digital token comprises a collectible digital token. Collectible digital tokens may be generated, minted, instantiated, or other created according to a rarity schedule. In some embodiments, the collectible digital tokens may be procedurally generated according to one or more probability tables or according to wave function collapse rules (i.e., a form of procedural generation typically used in video games) where each digital token is built from a set of primitives (e.g., images or graphics, sounds, text, etc.). While procedurally generated digital tokens may all be unique NFTs, some of their individual features may be more common than others. In additional embodiments, the collectible digital token be part of sets, say an ERC-1155 set, but also adhere to the rarity schedule (e.g., common, uncommon, rare, ultrarare, legendary, mythic, etc.), similar to how baseball cards or trading card games are produced. For example, the TMP may permit a common collectible digital token to be duplicated a large number of times, say 100,000 times, while a rate collectible digital token in the same say may only be duplicated a small number of times, say 100 times.

In another example, the test digital token comprises a utility-based digital token. A utility-based digital token offers additional capabilities beyond just representing digital assets. For example, a utility-based digital token can represent a right to access data, executable code, a membership, a subscription, a protocol, a game, or other types of digital constructs that give rise to functionality. One should appreciate utility-based digital tokens can also be collectible digital tokens, NFTs, and so on. The reverse is also true.

The smart contract interface invokes at least one of the following notarized ledger actions: create a new token based on the test digital token, delete the test digital token, trade the test digital token, sell the test digital token, buy the test digital token, publish the test digital token, authenticate the test digital token, validate the test digital token, store the test digital token, pay a royalty associated with the test digital token, copy the test digital token, move the test digital token, modify the test digital token, secure the test digital token, and/or other actions as described herein above.

The notarized ledger includes at least one of the following: a blockchain, a hash graph, a private ledger, a public ledger, a semi-public ledger, a centralized ledger, and/or other technology-based ledgers.

The test digital token represents at least one of the following: a digital document, a document, a subscription, an enablement of a feature (e.g., enabling heated seats in a vehicle, enabling an auto pilot feature, enabling fast charging feature, etc.), a warranty, a game object, a healthcare object, medical data, electronic medical records, an eSports object, a real-world object, a physical object, a work of art, a publication, a toy, a right, a property, experimental data, a process, a state of a process or product, a manufacturing status, a supply chain state, and/or other digital assets that corresponds to digital data or a physical property.

In an example, the TMP also indexes the test digital token in the token database based on the set of distinguishing features. By doing so, the TMP can monitor the test digital token, inventory digital tokens including the test digital token, generate alerts related to test digital token, secure the test digital token, log activities associated with the test digital token, recover the test digital token, and/or report on the test digital token. The TMP may also similar and exact digital tokens based on the set of features to check. Different features may have different requirements, certain feature maybe ignored, or required to be the same, similar, different, or even have specific thresholds or criteria.

The TMP can also perform at least one of: invalidating the test digital token, restricting creation of a new digital token based on the test digital token, and/or perform other actions as described herein above.

Beyond the above disclosure, there are many variations associated with the inventive subject matter. The following discussion provides additional color and examples to the inventive subject matter.

In some embodiments, the ecosystem's economy may be based on one or more cryptocurrencies. For example, the TMP might provide its services based on a custom cryptocurrency or third-party cryptocurrencies (e.g., Bitcoin, Ethereum, Solana, Wax, etc.). In such cases, the TMP may exchange digital tokens (e.g., NFTs, etc.) for cryptocurrency. Such exchanges may occur when a digital token is used, when tested, when burned, or when other transactions take place. Such a system may also be used when recycling an NFT (i.e., place back into a pool for others to purchase) or when the NFT is dissolved/burned. For example, when a test NFT is found to similar to an existing NFT, the TMP may charge the use a cryptocurrency fee according to a royalty smart contract and transfer at least a portion the cryptocurrency fee to the account of the smart contract owner. Further, such fees may be distributed across multiple accounts as dictated by the smart contracts. Yet, further, fees may include multiple cryptocurrencies distributed across multiple accounts thereby creating a many-to-many fee/account management infrastructure. This can be achieved by an account management or fee management matrix indicating which cryptocurrencies are to be used and to which accounts the transfers should be made.

It is easy for one to focus on image-based digital tokens due to the initial releases NFTs (e.g., Crypto Punks, Crypto Kitties, etc.). However, it should be appreciated digital tokens like NFTs can represent other modalities as discussed herein. Consider a use-case centered on music. When an artist, or even an AI system, creates a new track, the new track can be checked via the TMP for existing tracks. If nothing similar is found, the artist may mint the new track as an NFT. The new track can couple with a corresponding smart track where the artist may define royalty terms or other terms of service of the smart contract. As time passes, if the TMP discovers new digital tokens that incorporate the same track or similar tracks, the original artist may receive a notification, royalty fees, or enjoy other benefits.

The TMP and digital token management system describe herein has numerous use cases with respect to video games. Consider scenarios where computer-based games may be instrumented or otherwise provisioned with interfaces to one or more TMP, possibly via a network interface calls (e.g., RESTful APIs, RPCs, proprietary interfaces, etc.). In such cases, a game published can create one or more NFTs representing not only virtual elements in the game (e.g., characters, weapons, skins, AIs, vehicles, etc.), but also specific features or game play. More specifically, the publisher may create a set of digital tokens, say NFTs for this use case, via the interface to the TMP where the NFTs represents specific features. For example, the NFTs can couple with one or more digital assets that represent signatures of game play, which is similar to the network signatures discussed previously above. The signatures may be stored as a data structure outlining a vector of attributes with corresponding values that represent a game play state or states (e.g., number of players, key strokes, kills, high scores, version numbers, controller information, etc.), where the data structure may be stored as a file, possibly via the IPFS.

From a cheating perspective, a publisher could create a set of digital tokens, NFTs for this example, representing known cheating signatures. Cheating signatures may include a list of banned third-party software or hardware, use of known exploits, problematic character movement, extreme or suspected input speeds, or other types of data that may indicate cheating or indicate suspect behaviors. As gamers play, the game or a cheating service that may be running on the TMP can observe the player's or game's behaviors and collect them according to cheat identification rules. Once the cheating service compiles suspect data according to the cheating service rules, the suspect data can be submitted to the TMP. In this case, if the suspect data is found to be similar to the known cheating NFTs, a new cheating NFT may be minted and assigned to the player as a cheater. In such a scenario, the new cheating NFT would be a badge of dishonor. Such techniques are useful in eSporting events to identify, track, or otherwise manage cheating.

With respect to badges or leader boards, similar techniques may also be employed to tracking events in a game. Significant events may be identified based on game play behaviors or sensed player behaviors. For example, a publisher might create one or more digital token representing badges for achievements. A "World First" badge might be an NFT (an ERC-721 like token) and awarded to the first player that achieves a specific goal in the game. In this case, the TMP might use the game data as digital assets for comparison to the World First NFT signature data. Rather than creating a new NFT from the player data (which could also be done), upon detection of the similarity between the player's data the World First NFT distinguishing features, the World First NFT may be transferred to the player via the corresponding smart contract API. Further, for subsequent players that achieve the goal, new collectible digital ledger tokens (an ERC-1155 like token) may awarded to the subsequent player. In this case, the collectible digital ledger tokens for such a badge could be the same.

Badges, digital tokens, NFTs, or other awards may be triggered based on key performance indicators (KPIs) in a game. In some embodiments, third parties such as game players could create such tokens, possibly as part of the game or part of the game's community. The third-party entity could define the KPIs that form the signature for the corresponding event and mint the corresponding tokens as discussed previously. The third-party might also create a contest around the events. Players may pay to participate in the contest and win any rewards in the form of the minted tokens, cryptocurrency, badges, or other awards when the player's gameplay data is found similar to the minted tokens. In such embodiments, the corresponding smart contracts may include rules to pay royalties to the game publisher, contest runner, or other entity as desired.

Both from a gaming and healthcare perspective, KPIs could also comprise biometric data associated with individuals. While biometric data can represent healthcare status of an individual and can align with healthcare signatures, the biometric data could also relate to game play. For example, if a player maintains a low heart rate during a tense game event, say the first time the player engages with a boss and wins, the TMP could mint a "Fearless" NFT for the player to commemorate event. Alternatively, if the player fails to maintain engagement during a scary situation, a "Scaredy Cat" or "Quitter" NFT could be minted and transferred to the player. In an embodiment, an NFT representative of the number of deaths (e.g., total in the game, for a character, for an account, for a match, etc.) may be minted and transferred to the player. Such a death indication may be a badge of honor and/or help other players target a certain player (e.g., establish a bounty). Thus, the inventive subject matter is considered to including managing digital ledger tokens via invocation of smart contracts based on KPIs.

Beyond single player interactions, the disclosed approaches may also apply to group interactions. Groups may include guilds, affiliations, families, clans, or other groups of individuals. The group may work collectively to achieve goals to earn digital tokens as rewards. One difference between a group oriented KPIs and individual KPIs is that the group KPIs can include information collected across the individuals of the group, including cases where no single individual has a set of observed or sensed behavior KPIs to satisfy similarity criteria to the requirements of the goal digital tokens. However, the collective KPIs from across the individuals could satisfy the similarity criteria to the goal digital tokens. In some embodiments, a game may be created that specifically leverages group goals and corresponding digital tokens. For example, a game might represent an instance of building an empire where all players work together to create the empire and maximize its capabilities (e.g., economy, military strength, population happiness, colonizing space, etc.). When the final goal of the game is achieved, the game resets back to its original state. However, all players the worked together may receive one or more corresponding NFTs to commemorate the game's achievements, including the end-game goal. Such approaches may used in massive on-line games such as EVE-online or other games with massive player bases to commemorate events or enable new functionality related to unlocking features via ledger digital tokens. There are also many use cases beyond gaming. Consider an Internet-of-Things (IoT) environment where many devices may exist proximate to a consumer or other user. In such use cases when a user's context or signature matches that of a digital token registered with the TMP or digital token management system, the user may be notified via their phone a corresponding digital token many be available. For example, a kiosk offering information about a local attraction, say at a museum or natural park, might have numerous digital tokens available for purchase. When a user is nearby the kiosk, the user's location or the user's device location be used as a distinguishing feature to match features for the kiosk's tokens. In response, the user's phone may vibrate, open an app, or take other actions. The kiosk's tokens may be provided to the user for purchase, or even simply transferred to the user to commemorate their attendance at the local attraction. These techniques may be extended to other use cases as well including offering utility-based NFTs that may unlock content or grant access to functions, possibly including IoT devices (e.g., sensor data, network equipment, appliance, automobiles, vehicles, etc.).

The disclosed subject matter may also apply to educational environments. For example, a TMP may be leveraged to create digital tokens representing student work, exams, text books, or other educational items. These digital tokens may then be used to track student performance or cheating. If a student drafts an essay and it is found to be novel (i.e., non-similar to existing tokenized content), the student may be granted a corresponding token indicating the student did indeed perform the work properly. On the other hand, if the essay or portions of the assay are found to be similar to existing digital tokens, then the essay may be considered suspect. Such an approach is considered advantageous in environments where auditing performance is critical (e.g., publishing, academics, work environments, etc.).

The disclosed subject matter may also apply to environment where satisfaction of goals and objectives are being monitored. As an example, contractors for a construction site may be given an NFT representing their attendance, their work quality, and/or their timeliness in completing their duties, etc. In such a case, the contractors may be able to use their NFTs as a type of badge to market themselves for future work, promotions, etc.

The discussed techniques can be extended to military training, physical training, job training, sports training, or other types of environments. Still further tokens may be generated to represent machine learning training data sets, which may be used restrict access to the training data or verify work done on the training data set is indeed valid.

In some embodiments similar to the educational example above, the inventive subject matter is considered to include techniques for managing certification or standards digital management. For example, the disclosed systems and methods may be adapted to compare similarity of a token to be created relative to a set of criteria rather than relative to an existing token. More specifically, a token to be created, may reflect the results of a certification process or inspection. The digital data of the results may then be compared to the requirements for the certification process or inspection. Should the digital data of the results be considered sufficiently similar, then the digital data may be compiled into a digital token (e.g., an NFT, etc.) and minted to indicate the owner of the NFT has indeed received proper certification. Consider a computer-based digital certification management system similar to the TMPs disclosed in FIGS. 1-6. Such digital certification management systems may be used to manage digital data associated with various certification processes including educational certifications or testing, military certifications, inspections, government agency inspections (e.g., CLIA certification, FIPS certification, etc.), copyright infringement analysis, smog checks, a ratification, an accreditation, or other types of certifications. Digital management certification systems may include one or more of a certification database storing one or more tokenized certification standards, where a standard's requirements or criteria has been compiled into a token. Thus, each tokenized certification standard may include or point to the standard's one or more certification criteria defined based on certification data attributes (e.g., features, values, geo-locations, descriptors, text, audio features, time stamps, metadata, names, version numbers, etc.). Further each tokenized certification standard may be indexed, possibly multi-indexed, in the certification database according to values of the certification data attributes. In more preferable embodiments, at least some of the certification data attributes correspond to features that may be extracted from digital data or digital representations via one or more digital feature extraction algorithm implementations (e.g., OCR, SIFT, OpenCV implementations, NLP, etc.) stored in a computer readable memory.

One or more processors of the digital certification management system executes operations to manage digital certifications based on software instructions stored in the memory. For example, the system may receive digital test token data representing a request for certification. The digital test token data may include many different data modalities depending on the nature of the certification to be undertaken. Consider smog testing as an example, he digital test token data may include sensor data reflecting the gas emissions of a vehicle. Alternatively, for copyright infringement analysis, the digital test token data may include image data, video data, text data, or other types of data modalities reflecting an original or derivative work.

Once the digital test token data is available. The processors may extract a set of distinguishing features via executing the implementations of the feature extraction algorithms. The set of distinguishing features may include features or descriptors corresponding to the digital data modalities targeted by the algorithms and preferably, at least in part, mirror the type or nature of the certification data attributes. In some embodiments, both the distinguishing features and certification data attributes adhere to a common attribute space (e.g., namespace, ontology, hierarchy, etc.) to ensure the two types of data may be compared to each other in a meaningful manner.

The processor may leverage the set of token distinguishing features by constructing one or more queries targeting the certification database where the queries include search criteria defined based on at least some of the distinguishing features. The certification database can then return a result set identifying one or more tokenized certification standards having certification data attributes that satisfy the queries. In cases where no standards satisfy the query, a NULL set may be returned. In such cases, a similarity score may be determined to be NULL, zero, or other appropriate value indicating there is no similarity that can be assessed between the digital test token data and the certification standards.

As noted previously, each tokenized certification standard may include or point to one or more certification criteria. Therefore, the certification criteria for each of the identified tokenized certification standards may be obtained for further use. The certification criteria define the requirements, features, or conditions the digital test token data must pass in order for the digital test token data to pass or fail certification. Thus, the processor derives or otherwise establishes a satisfaction level of the digital test token data by comparing the values of the features in the set of distinguishing features to the conditions or requirement rules in the certification criteria. One should appreciate each criterion in the certification criteria may be simple or complex depending on the requirements. For example, the rule for a criterion may require a certain number of matches between text in the digital test token data and the certification standard, an acceptable set of sensor values that satisfy threshold conditions, a sufficient number of matching image descriptors, or other rule types. As discussed previously, the satisfaction level may be single valued, multi-valued, or provide an indication of PASS or FAIL. In some scenarios, providing satisfaction levels that exist on a spectrum (e.g., 0 to 1, 1 to 100, etc.) provides for determining levels of certification according to the rules of the certification criteria, levels such as platinum level certification, gold level, silver level, bronze level, six sigma, nine sigma, or other levels. Each level may map to the values or satisfaction of the criteria rules. The levels may be implemented in different ways. For example, the mapping may be implemented as a look up table based on the satisfaction level values as an index where the lookup table returns a certification level. Alternatively, or in addition to, the mapping may be implemented as a programmatic function which accepts the criteria that are satisfied as input and then maps to the certification level.

One should appreciate that the satisfaction level can, in a very real sense, be considered to represent how similar the digital test token data is to the requirements of the tokenized certification standard. When there is sufficient similarity (e.g., the satisfaction level indicates the certification requirements are met, etc.), the digital test token data passes the certification. Further, where there is a lack of similarity (e.g., the satisfaction level indicates the certifications requirements are not met, etc.), the digital test token data fails the certification.

The system may use the satisfaction level and the digital test token data to invoke a smart contract interface associated with at least one notarized ledger. The invocation may take different forms. Typically, the invoked API can be a minting function that instantiates a non-fungible token (NFT) that encapsulates the state of the digital test token data relative to the requirements of the tokenized certification standard. Thus, the NFT can represent the event as passing or failing the certification and may include information related to the degree of the pass or fail. While it is possible to store the entire event information on the notarized ledger (e.g., a blockchain, a hash graph, a private ledger, a public ledger, a semi-public ledger, a centralized ledger, etc.), more efficient versions may store reduce information to memorialize the ownership of the NFT along with a pointer to off ledger storage where the more complete information may be found as discussed previously. For example, the pointer to the off-ledger storage may point to the raw digital test token data. Although the example references an NFT (e.g., an ERC-721 like token for Ethereum, etc.), the invocation of the smart contract may mint other types of tokens to encapsulate the certification process (e.g., composable token, token collection, etc.). The instantiated tokens on the notarized ledger, assuming they have passed certification, may be referred to as a certified token (e.g., a c-NFT, etc.). Once created, the c-NFTs may be indexed according to their distinguishing features for later retrieval or comparison in the future.

The tokenized certification standards can also take on different forms. In more preferred embodiments, a tokenized certification standard may be instantiated as a digital token on the same notarized ledger as the c-NFTs or may be instantiated on a second, different ledger. For example, the tokenized certification standard may be instantiated as an NFT on a public ledger, say Ethereum, available to the public for review once the standard has been ratified by a corresponding governing body. Further, the c-NFTs could be instantiated on a separate private, possibly standard-specific ledger, to record or notarize the information for auditing purposes. In view that the tokenized certification standards may be stored on a ledger, one should appreciate that in some embodiments to certification database could comprise one or more of a cloud database, a notarized ledger, a blockchain, a hash graph, a server, a distributed file system, or other type of data store.

Beyond minting the c-NFT or other digital tokens, the smart contracts may support other digital token notarized ledger management features. In view the c-NFT may be owned by an entity, the c-NFT may then be considered an asset of the entity; a CLIA certification or accreditation for example. Thus, the smart contract interface can support transfer of the ownership of the c-NFT to another entity. Additional actions that the smart contract may take include creating a new token on the first notarized ledger, deleting a token, trading a token, selling a token, buying a token, publishing a token, authenticating a token, validating a token, storing a token, paying a royalty associated with a token, copying a token, moving a token, modifying a token, securing a token, or other actions just to name a few.

There are numerous additional considerations of interest that arise due the nature of the inventive subject matter presented thus far. The following additional considerations augment the disclosed inventive subject matter in various ways.

In some embodiments, the disclosed TMPs may offer one or more services that enable for establishing one or more "mutations" to a digital token to ensure the digital token lacks similarity or has greater similarity to existing tokens or standards. The test digital token data may be mutated via procedural generation algorithms, GANs, genetic algorithms, LLMs, or other computational approaches. The mutations may take the form of one or more changes to one or more data modalities of the digital tokens until a desired result is achieved or until a desired similarity score is achieved. Once the mutations are complete, the digital token may be instantiated. One should appreciate generating token mutations may also be applied to existing tokens that may already be minted in order to create a new, derivative work that may be used to create a new token (e.g., NFT, etc.) that is dissimilar enough for use. The token mutation service may be provided in real-time and/or for a fee. For example, the fee may be paid to the original artist who may establish a fee schedule defining the cost to allow others to leverage their original token relative based on the similarity (or dissimilarity). The cost to generate a mutated token that is similar to the original token may be higher than the cost to generate a mutated token that is highly dissimilar.

Yet another area for consideration includes leveraging the disclose techniques for token life time management. As time passes, the underlying data associated with a minted token may change. For example, patient data associated with a token may change to reflect the patient's health, conditions, treatment, age, or other factors. Therefore, the token may need to be updated to reflect the new state of the patient. In such cases, when the updated patient's data indicates a sufficient deviation from the patient's previous state, the patient token may be updated. This can be achieved by minting a new NFT to reflect the new state, or could by updating the NFT's off ledger data. In some embodiments, the NFT stored on the ledger may have a field representing the state of the NFT, which could be updated via invocation of an update API in the NFT's smart contract. Still further, as the NFTs life cycle continues it may grow similar to existing tokens, which may trigger an alert. Returning to the patient data example, when the patient's token appears similar to patient data from one or more different patients, then an alert can be created to notify the patient or other healthcare stakeholders of a "patient like me" along with tokenized outcomes. In certain embodiments, when the patient's token appears similar to a token associated with the patient that is representative of previous health indicators, the similarity may represent that the patient is relapsing, getting better, becoming sick again, etc.

In an alternative example, an NFT may represent a piece of digital content, a player character in a game, for example. As the player character evolves, their NFT may be updated. However, in some cases, if the player character becomes too similar to other, existing characters represented by corresponding NFTs, then a notification can be created to warn the player of encroaching on another player's uniqueness.

The disclosed techniques may also be leveraged for Internet of Things (IoT) management. An NFT or other digital tokens may be created to represent IoT device roles, services, APIs, functionality, code, capabilities, or other features of the device. When a new device is to be deployed within a context (e.g., a collection of distinguishing features, geo-location, known roles, etc.), the context may be used to identify existing tokens having similar contexts. In such cases, the new device may be instrumented or provisioned with the same functionality of other devices, possibly by licensing, subscribing, or leasing access to the existing devices' NFTs. Once licensed or leased, the corresponding NFT code or functionality may be downloaded to the new device. Lifetime management also plays an important role with respect to IoT management. As the code base changes or updates are made, the corresponding NFTs may be updated to trigger existing IoT devices to download or to be provisioned with the updates. Corresponding smart contracts may be triggered through one or more listeners that invoke the smart contract APIs when the listeners triggering criteria is satisfied by the digital test token data and/or similarity scores.

Use of similarity among digital tokens, especially tokens that representing computing device functionality, can give rise to a concept coined by the inventors called "token fusion." Token fusion can be considered binding or combining two or more tokens together to give rise to greater capability. For example, each token may have a set of expected inputs and a set of possible outputs. When a first token with possible outputs are similar to a second token's set of expected inputs, the two tokens can be bound together, possibly as a new composable token having the set of expected inputs from the first token and the possible outputs of the second token. Such capabilities may be used to bind the functionality of IoT devices together (e.g., sensors bound to appliances, etc.) to create a chain of operations or workflow. The use of token fusion may allow leasing, subscribing, or otherwise accessing micro functionality to generate a synergetic new system.

In another example of token fusion, a video game may be capable of causing token fusion. For example, recipes may be involved in a video game for crafting items. A first recipe may use a first item and a second item as input to create a third item and a fourth item as output. Further, a second recipe may take the third item and the fourth item as input to create a fifth item as output. Thus, token fusion may occur to bind the token to one another. Token fusion may not be limited to two tokens, as shown in the example. In an embodiment, three or more tokens may be fused together. In an embodiment, token fusion may be undone. In an embodiment, tokens that have been fused cause a new token to be minted and the original tokens to be burned.

Yet another interesting use case afforded by the disclosed inventive subject matter is leveraging NFTs to represent personal digital assistants or virtual companions. An NFT or other digital token may be minted or otherwise instantiated to represent the personal assistant and may reflect the personal nature of the assistant. Thus, as new personal assistants are created their corresponding NFTs may be compared to each other to determine similarity or lack thereof. Consider a case where a celebrity has trained an AI model on their own works (e.g., ChatGPT, LLMs, etc.). The celebrity may monetize their AI by offering a license, subscription, lease, or other access to their trained AI model. Should another person attempt to create a similar AI model, the similar AI model may be restricted from being minted as an NFT due to its similarity to the original AI model, possibly unless a fee is paid to the celebrity.

Further, trained LLMs may offer a starting point for a personal assistant, which can be represented as an NFT. An individual could purchase the model, via an NFT or another token, and as they continue to use it, the model may be retrained based on the individual's interactions. As the LLM evolves over time, the individual's LLM NFT may also change state per the discussion regarding life cycle management. When the new LLM NFT becomes dissimilar enough relative to the original LLM, then the individual may be able to monetize their own LLM NFT.

Further, the interactions among such virtual companions may be stored on a notarized ledger to give rise to an auditable and very credible AI training data set, which in turn can be represented by an NFT on a ledger.

In a somewhat similar vein, NFTs may be leveraged to represent non-copyrightable works, possibly content created by AI models (e.g., generative models). Such an approach is considered advantageous because ownership can be established via the NFTs. Further, as discussed extensively above, the disclosed system may permit or restrict derivative works from being minted or otherwise created.

Accordingly, the techniques described herein may improve data integrity and help reduce fraud. For example, the techniques described herein may be capable of reducing the ability of fraud to occur by representing ownership of property, certifications, etc. as NFTs on a blockchain. Thus, embodiments may reduce the ability of a malicious actor to alter others' or their digital certifications and/or assets. Similarly, a notarized ledger storing transactions related to the discussed NFTs may also add redundancy to systems that traditionally keep track of certifications, property, etc., thereby increasing data availability and reducing cyber threats. Further, certain embodiments may allow for NFTs to be tracked on a public blockchain thereby allowing others to trace the origin and transactions associated with an NFT (e.g., a c-NFT) and verify the authenticity of NFTs.

Embodiments may achieve benefits over conventional blockchains and asset management, such as by offering ways to more effectively authenticate ownership, chain of custody, objective similarity, and/or certification. Further, embodiments may offer improved techniques for verifying ownership of assets and the authenticity of the assets compared to traditional systems that may unknowingly operate with assets that could be corrupted and/or purposefully altered without authority.

The techniques describe herein may also be capable of restricting the use of software, property, and certifications without permission from a proper licensing authority (e.g., owner of an NFT, author of an NFT, certification authority).

Figure 13:
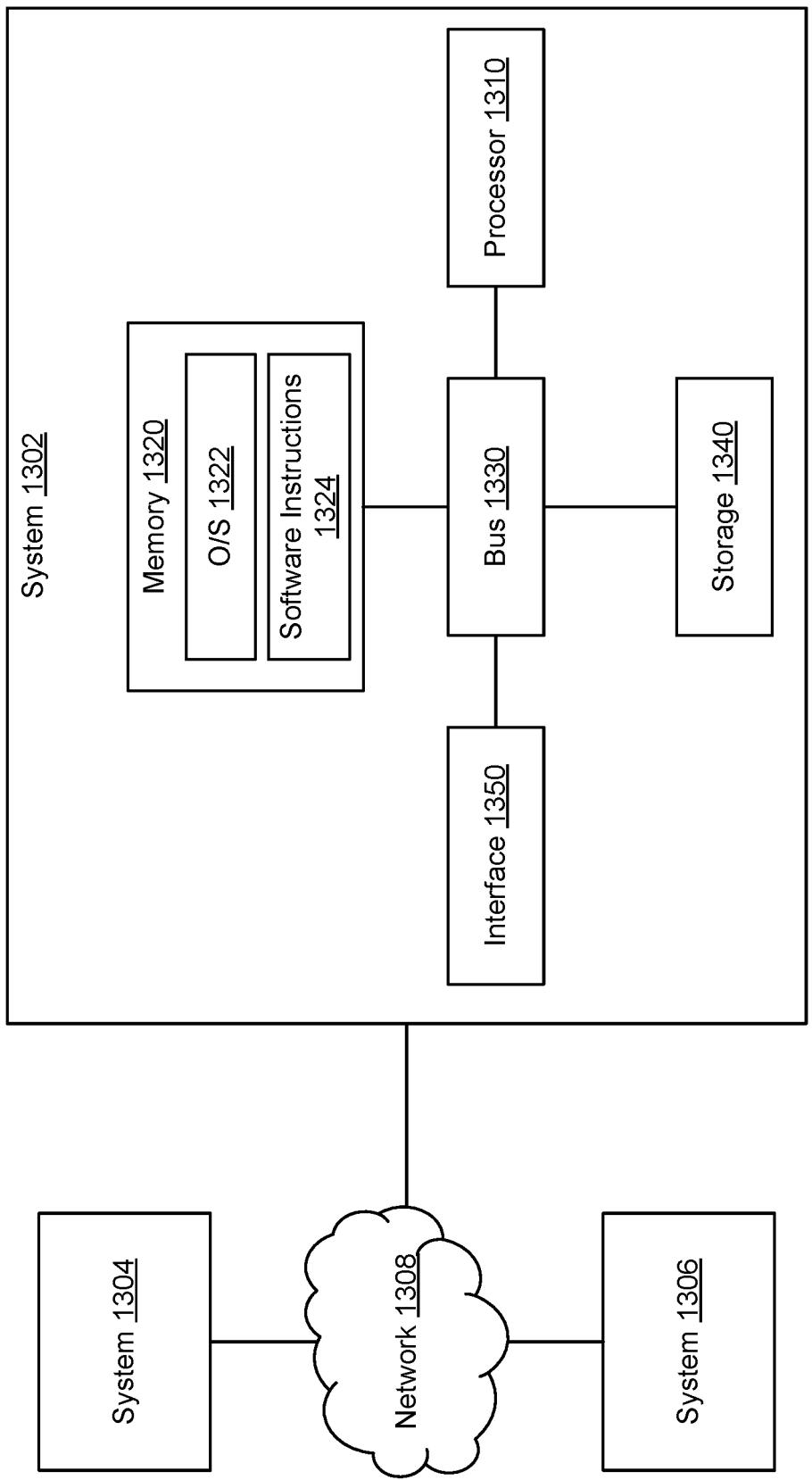
FIG. 13 is block diagram of a distributed computer system usable to implement embodiments of the present disclosure.

FIG. 13 is block diagram of a distributed computer system 1300 usable to implement embodiments of the present disclosure. Various aspects and functions described herein may be implemented as hardware, software executing on hardware, or a combination of hardware and software executing on one or more computer systems. Aspects in accord with the present disclosure may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions.

The distributed computer system 1300 of FIG. 13 includes three computer systems 1302, 1304 and 1306 (although a different number of computer systems is possible). The computer systems 1302, 1304, 1306 can be operated by different entities and/or can be computing nodes of a blockchain network. As shown, the computer systems 1302, 1304 and 1306 are interconnected by, and may exchange data through, a communication network 1308. The network 1308 may include any communication network through which computer systems may exchange data. To exchange data via the network 1308, the computer systems 1302, 1304, and 1306 and the network 1308 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services. The communication network may further employ one or more mobile access technologies including 2nd (2G), 3rd (3G), 4th (4G), 5th (5G) generation radio access for cellular systems, WLAN, Wireless Router (WR) mesh, and other communication technologies. Access technologies such as 2G, 3G, 4G and LTE and future access networks may enable wide area coverage for mobile devices.

Computer systems 1302, 1304 and 1306 may include clients and servers. In various embodiments, to ensure data transfer is secure, the computer systems 1302, 1304 and 1306 may transmit data via the network 1308 using a variety of security measures including TSL, SSL or VPN, among other security techniques.

Various aspects and functions may be implemented as specialized hardware or software executing in one or more computer systems including the computer system 1302 shown in FIG. 13. As depicted, the computer system 1302 includes a processor 1310, a memory 1320, a bus 1330, an interface 1350 and a storage system 1340. The processor 1310, which may include one or more microprocessors or other types of controllers, can perform a series of instructions that manipulate data. As shown, the processor 1310 is connected to other system placements, including a memory 1320, by the bus 1330.

The memory 1320 may be used for storing programs and data during operation of the computer system 1302. Thus, the memory 1320 may be a relatively high performance, volatile, random access memory such as a dynamic random access memory (DRAM) or static memory (SRAM). However, the memory 1320 may include any device for storing data, such as a disk drive or other non-volatile storage device, such as flash memory or phase-change memory (PCM). Various embodiments in accord with the present disclosure can organize the memory 1320 into particularized and, in some cases, unique structures to perform the aspects and functions disclosed herein. The memory 1320 may store program code of an operating system 1322 and software instructions 1324 for a TMP.

Components of the computer system 1302 may be coupled by an interconnection element such as the bus 1330. The bus 1330 may include one or more physical busses (for example, busses between components that are integrated within a same machine) and may include any communication coupling between system placements including specialized or standard computing bus technologies such as IDE, SCSI, PCI and InfiniBand. Thus, the bus 1330 enables communications (for example, data and instructions) to be exchanged between system components of the computer system 1302.

Computer system 1302 also includes one or more interfaces 1350 such as input devices, output devices and combination input/output devices. The interface devices 1350 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 1350 allow the computer system 1302 to exchange information and communicate with external entities, such as users and other systems.

Storage system 1340 may include a computer-readable and computer-writeable nonvolatile storage medium in which instructions are stored that define a program to be executed by the processor. The storage system 1340 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 1310 or some other controller may cause data to be read from the nonvolatile recording medium into another memory, such as the memory 1320, that allows for faster access to the information by the processor 1310 than does the storage medium included in the storage system 1340. The memory may be located in the storage system 1340 or in the memory 1320. The processor 1310 may manipulate the data within the memory 1320, and then copy the data to the medium associated with the storage system 1340 after processing is completed. A variety of components may manage data movement between the medium and the memory 1320, and the disclosure is not limited thereto.

Further, embodiments of the present disclosure are not limited to a particular memory system or storage system. Although the computer system 1302 is shown by way of example as one type of computer system upon which various aspects and functions in accord with the present disclosure may be practiced, aspects of the disclosure are not limited to being implemented on the computer system. Various aspects and functions in accord with the present disclosure may be practiced on one or more computers having different architectures or components than that shown in FIG. 13. For instance, the computer system 1302 may include specially-programmed, special-purpose hardware, such as for example, an application-specific integrated circuit (ASIC) tailored to perform a particular operation disclosed herein. Another embodiment may perform the same function using several general-purpose computing devices running the operating system 1322.

The operating system 1322 may manage at least a portion of the hardware placements included in computer system 1302. A processor or controller, such as processor 1310, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

In various embodiments, processor 1310 and operating system 1322 together define a computing platform for which application programs in high-level programming languages may be written. These component applications may be executable, intermediate (for example, C # or JAVA bytecode) or interpreted code which communicate over a communication network (for example, the Internet) using a communication protocol (for example, TCP/IP). Similarly, functions in accord with aspects of the present disclosure may be implemented using an object-oriented programming language, such as Python, Solidity, JAVA, C++, or C #(C-Sharp), among others. Other object-oriented programming languages may also be used. Alternatively, procedural, scripting, or logical programming languages may be used.

Additionally, various functions in accord with aspects of the present disclosure may be implemented in a non-programmed environment (for example, documents created in HTML, XML or other format that, when viewed in a window of a browser program, render aspects of a graphical-user interface or perform other functions). Further, various embodiments of the present disclosure may be implemented as programmed or non-programmed placements, or any combination thereof.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A computer-based digital certification management system;
   a certification database storing tokenized certification standards, wherein each tokenized certification standard comprises at least one certification criteria defined based on certification data attributes, and wherein the tokenized certification standards are indexed by at least some of the certification data attributes;
   at least one computer readable memory storing digital token management software instructions; and
   at least one processor coupled with the at least one computer readable memory and with the certification database, and that performs the following operations upon execution of the digital token management software instructions:
   receiving digital test token data;
   extracting a set of token distinguishing features from the digital test token data via execution of a set of digital feature extraction algorithm implementations;
   identifying at least one tokenized certification standard from the certification database having certification attributes satisfying a query defined using at least a portion of the set of token distinguishing features;
   deriving at least one satisfaction level based on the set of token distinguishing features with respect to the at least one certification criteria of the identified at least one tokenized certification standard;
   determining a smart contract interface of a first notarized ledger to invoke from a plurality of smart contract interfaces, the smart contract interface associated with the digital test token data; and
   invoking the smart contract interface based on the satisfaction level and the digital test token data.

2. The system of claim 1, wherein the tokenized certification standards comprise digital tokens recorded on a second notarized ledger.

3. The system of claim 2, wherein the tokenized certification standards comprise non-fungible tokens recorded on the second notarized ledger.

4. The system of claim 2, wherein the second notarized ledger comprises the first notarized ledger.

5. The system of claim 1, wherein the certification database comprises at least in part one of the following: a cloud database, a notarized ledger, a blockchain, a hash graph, a server, and a distributed file system.

6. The system of claim 1, wherein the set of digital feature extraction algorithm implementations comprise implementations of one or more of the following: an image recognition algorithm, an audio recognition algorithm, a video recognition algorithm, a data recognition algorithm, or an edge detection algorithm.

7. The system of claim 1, wherein invoking the smart contract interface includes minting a certified non-fungible token (c-NFT) on the first notarized ledger based on the digital test token data and the satisfaction level.

8. The system of claim 7, wherein the operations further include indexing the c-NFT in a token database based on the set of token distinguishing features.

9. The system of claim 7, wherein the c-NFT comprises a pointer to off ledger token information related to the digital test token data.

10. The system of claim 9, wherein the token information comprises at least some of the digital test token data.

11. The system of claim 1, wherein the satisfaction level comprises a similarity score derived from the at least one certification criteria of the identified at least one tokenized certification standard and the set of token distinguishing features.

12. The system of claim 11, wherein the similarity score comprises multiple values.

13. The system of claim 1, wherein the certification attributes and the set of token distinguishing features adhere to a common attribute space.

14. The system of claim 13, wherein the common attribute space comprises an ontology or a namespace.

15. The system of claim 1, wherein the identified at least one tokenized certification standard comprises at least one of the following: an educational standard, a test standard, an inspection standard, a lab standard, a health standard, a military standard, a physical therapy standard, a ratification, and an accreditation.

16. The system of claim 1, wherein the digital test token data represents at least one of the following: an educational event, a test event, an inspection event, a lab event, a health event, a military event, a mechanical part, a game event, a work event, and a sporting event.

17. The system of claim 1, wherein the first notarized ledger includes at least one of the following: a blockchain, a hash graph, a private ledger, a public ledger, a semi-public ledger, or a centralized ledger.

18. The system of claim 1, wherein the smart contract interface invokes at least one of the following notarized ledger actions: create a new token on the first notarized ledger, delete a token, trade a token, sell a token, buy a token, publish a token, authenticate a token, validate a token, store a token, pay a royalty associated a token, copy a token, move a token, modify a token, or secure a token.

19. The system of claim 1, wherein the smart contract interface invokes transferring a certified non-fungible token (c-NFT) from a first owner to a second owner, the second owner different than the first owner.

20. The system of claim 1, wherein the satisfaction level indicates a failure of the digital test token data to satisfy the at least one certification criteria of the identified at least one tokenized certification standard.

* * * * *